(12) United States Patent
Meredith et al.

(10) Patent No.: US 7,055,142 B2
(45) Date of Patent: May 30, 2006

(54) PERMUTATION NUANCES OF THE INTEGRATION OF PROCESSES AND QUERIES AS PROCESSES AT QUEUES

(75) Inventors: L. Gregory Meredith, Seattle, WA (US); Steve Bjorg, Redmond, WA (US); David Richter, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 10/303,445

(22) Filed: Nov. 22, 2002

(65) Prior Publication Data

US 2003/0212540 A1 Nov. 13, 2003

Related U.S. Application Data

(60) Provisional application No. 60/379,864, filed on May 10, 2002.

(51) Int. Cl.
*G06F 9/45* (2006.01)
(52) U.S. Cl. ............... 717/136; 717/139; 717/140; 717/141; 719/314; 707/3; 707/4
(58) Field of Classification Search ........ 717/136–140, 717/135, 139, 143, 141; 707/3, 4, 5, 2, 103 R, 707/102, 6; 719/314
See application file for complete search history.

(56) References Cited

U.S. PATENT DOCUMENTS

| | | | | |
|---|---|---|---|---|
| 5,274,821 A | * | 12/1993 | Rouquie | 717/139 |
| 5,664,173 A | * | 9/1997 | Fast | 707/4 |
| 5,732,274 A | * | 3/1998 | O'Neill | 717/143 |
| 5,826,269 A | * | 10/1998 | Hussey | 707/10 |
| 5,899,997 A | * | 5/1999 | Ellacott | 707/103 R |
| 5,950,196 A | * | 9/1999 | Pyreddy et al. | 707/5 |
| 5,991,754 A | * | 11/1999 | Raitto et al. | 707/2 |
| 6,128,612 A | * | 10/2000 | Brereton et al. | 707/4 |
| 6,182,061 B1 | * | 1/2001 | Matsuzawa et al. | 707/2 |
| 6,523,026 B1 | * | 2/2003 | Gillis | 707/3 |
| 6,523,027 B1 | * | 2/2003 | Underwood | 707/4 |
| 6,598,169 B1 | * | 7/2003 | Warwick et al. | 713/320 |
| 6,766,330 B1 | * | 7/2004 | Chen et al. | 707/102 |
| 6,826,555 B1 | * | 11/2004 | Nunez | 707/2 |
| 6,826,562 B1 | * | 11/2004 | Leung et al. | 707/4 |
| 6,845,507 B1 | * | 1/2005 | Kenton | 719/314 |
| 6,910,068 B1 | * | 6/2005 | Zintel et al. | 709/220 |
| 6,944,184 B1 | * | 9/2005 | Miller et al. | 370/467 |

OTHER PUBLICATIONS

Title: Extensible Query Processing in Starburst, author: Haas et al, ACM, Jun. 1989.*

(Continued)

*Primary Examiner*—Chameli C. Das
(74) *Attorney, Agent, or Firm*—Christensen O'Connor Johnson Kindness PLLC

(57) ABSTRACT

A program that includes expressions written in a process-based language for representing protocol-based applications as processes is disclosed. A process kernel executes the expressions in the program. The process kernel parses an expression to obtain syntactical elements that represent a queue, a set of queue delimiters, a query, a sequence delimiter, and other actions. The process kernel further translates the expression as a process whose first action is submitting the query as another process to the queue and after which the process continues with other actions. The query includes an organization scheme formed from a customizable, tag-based language that contains data and describes data.

52 Claims, 36 Drawing Sheets

OTHER PUBLICATIONS

Title: Using Java Reflection to Automatic Extension Language Parsing, author: Parson IEEE, Dec. 1999.*

Title: Query Processing with Description Logic Ontologies Over Object-Wrapped Databases, author: Peim et al, IEEE, Jul., 20002.*

Title: A Robust, Optimization-Based Approach for Approximate Answering of Aggregate Queries, author: Chaudhuri et al, Date: May 2001, ACM.*

Abramsky, S., "Computational Interpretations of Linear Logic," *Theoretical Computer Science I I I*(1-2):3-57, 1993.

Berger, M., et al., "Sequentiality and the π-Calculus,"in Abramsky, S. (ed.), *Proceedings: Typed Lambda Calculi and Applications, 5th Int'l Conference,* Krakow, Poland, May 2-5, 2001.

Milner, R., "The Polyadic π-Calculus: A Tutorial," *Proceedings: Int'l Summer School on Logic Algebra of Specification,* Marktoberdorf, Germany, 1992.

Yoshida, N., et al., "Strong Normalisation in the π-Calculus," *MCS Technical Report,* 2001/09, Mar. 2001.

\* cited by examiner

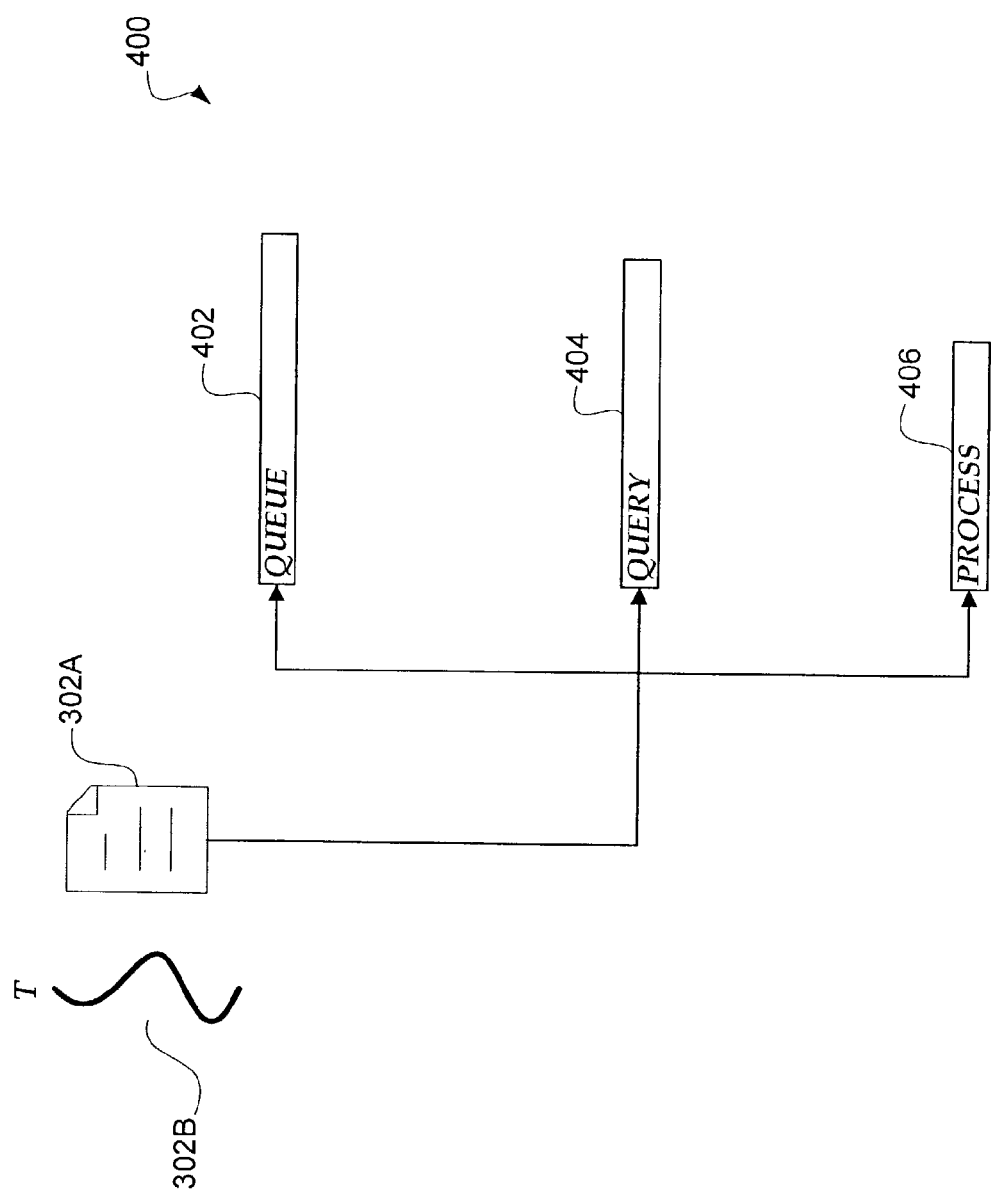

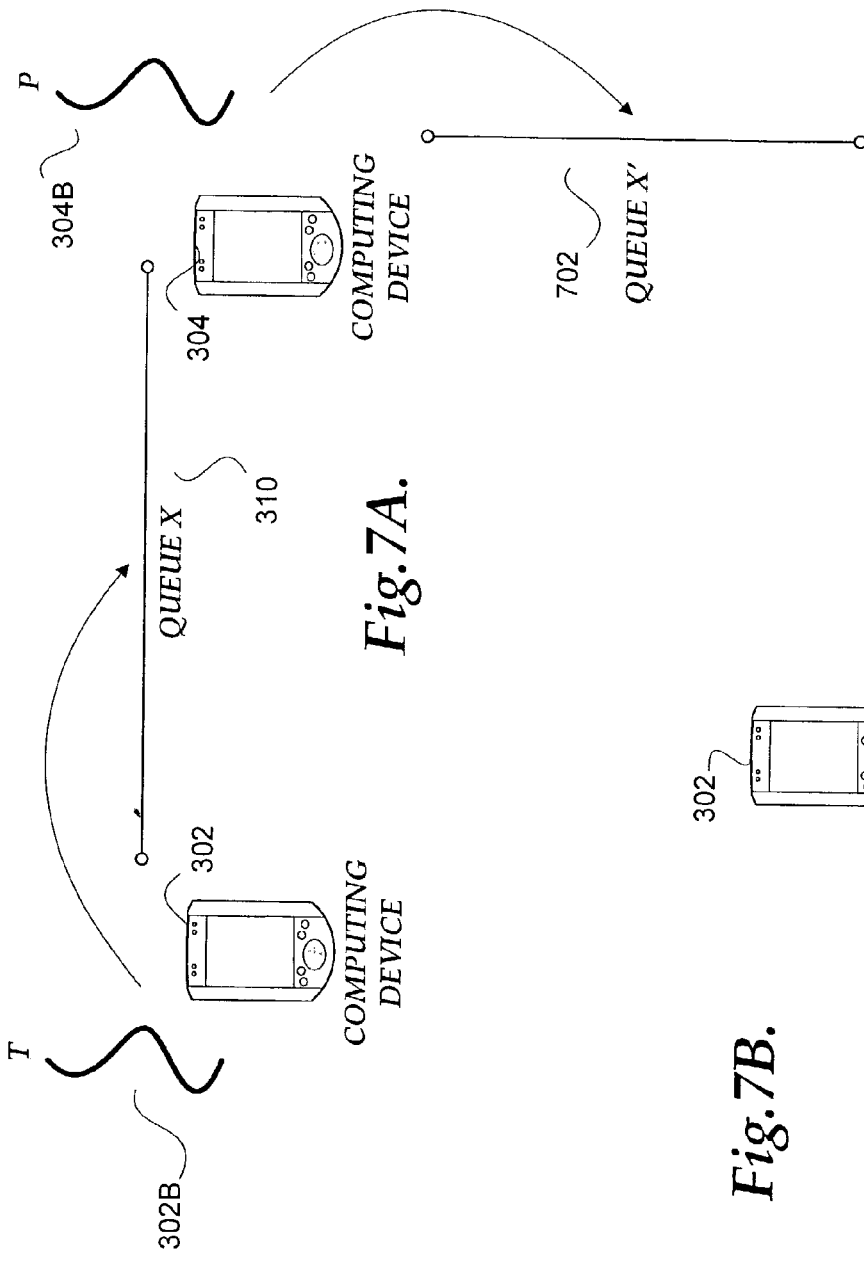

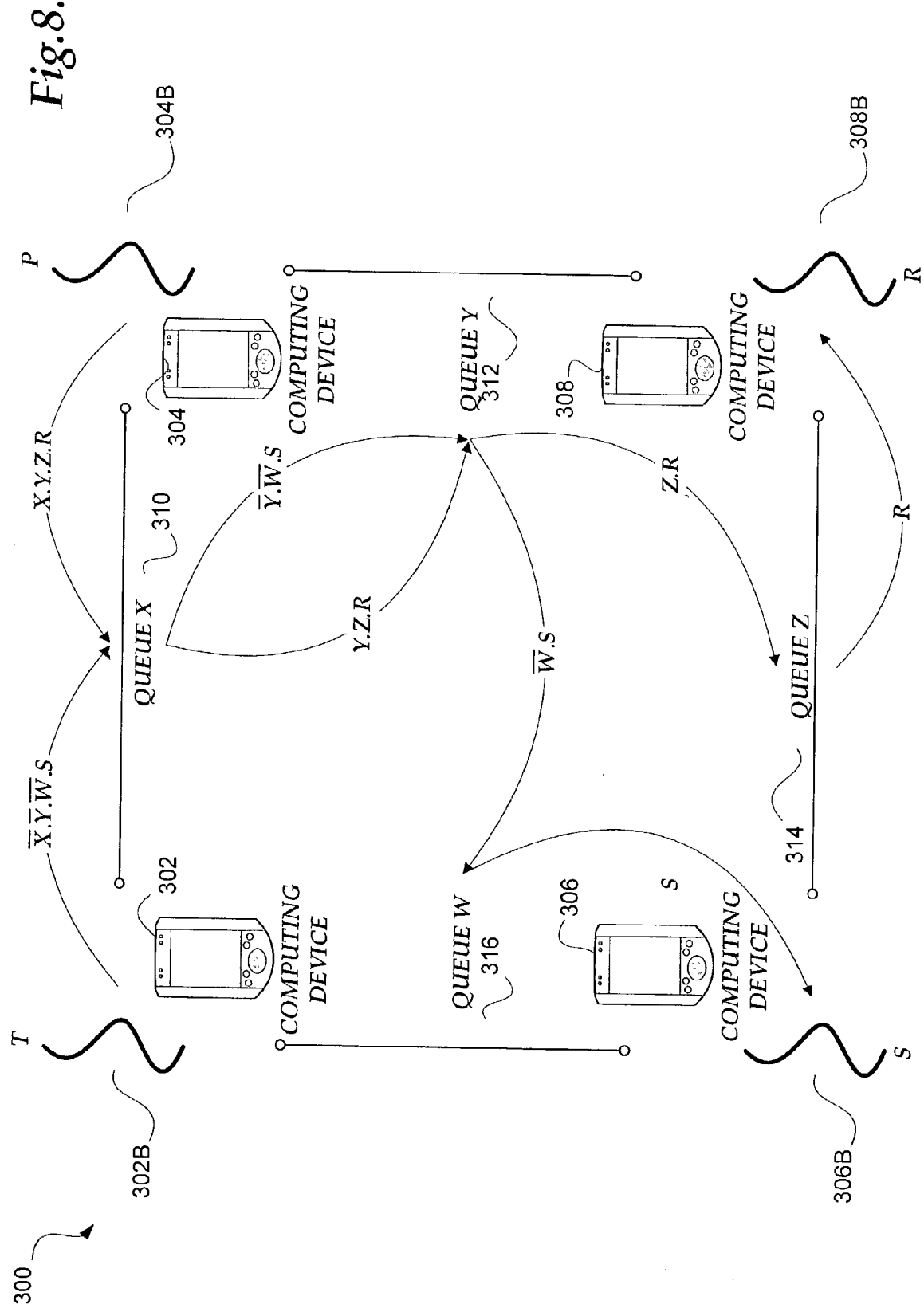

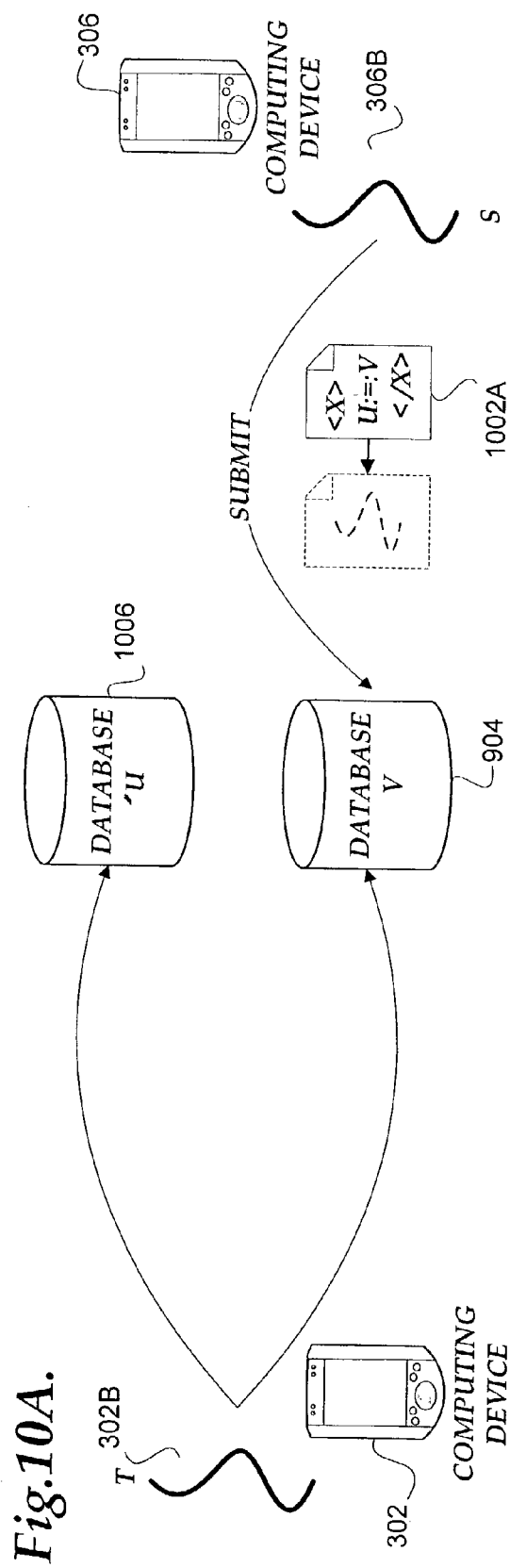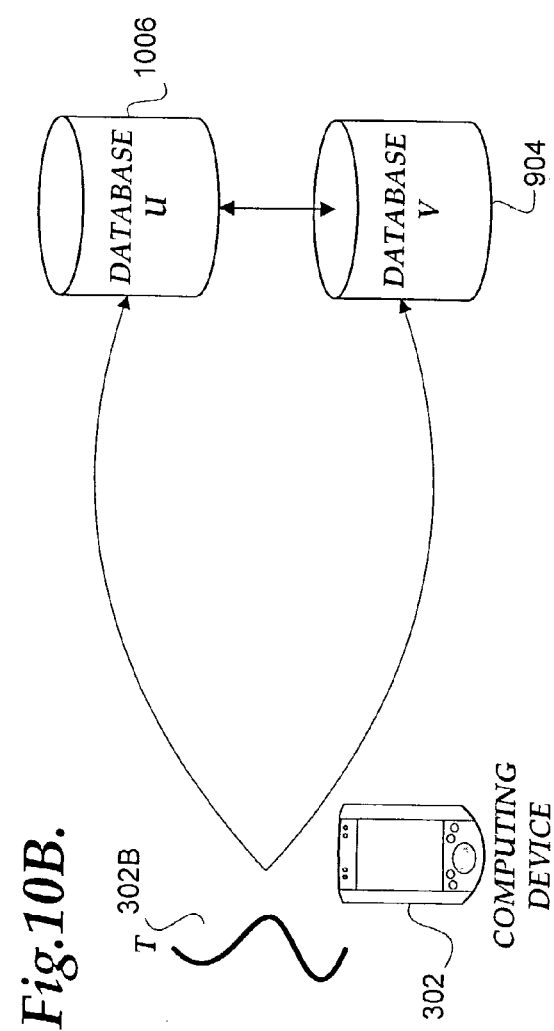
Fig.10A.
Fig.10B.

PERMUTATION NUANCES OF THE INTEGRATION OF PROCESSES AND QUERIES AS PROCESSES AT QUEUES

CROSS-REFERENCE TO RELATED APPLICATION

This application claims the benefit of U.S. Provisional Application No. 60/379,864, filed May 10, 2002, entitled "Process Programming Language," which is expressly incorporated herein by reference.

FIELD OF THE INVENTION

The present invention relates generally to an artificial language, and more particularly, to a programming language that can be used to define a sequence of instructions that can ultimately be processed and executed by a concurrent, distributed network of computing resources.

BACKGROUND OF THE INVENTION

Natural language is a language spoken or written by humans, as opposed to a programming language or a machine language. A programming language is any artificial language that can be used to define a sequence of instructions that can ultimately be processed and executed by a computer. Defining what is or is not a programming language can be tricky, but general usage implies that the translation process—from the source code which is expressed using the programming language, to the machine code, which is the code that the computer needs to work with—be automated by means of another program, such as a compiler. Both natural languages and programming languages are systematic means of communicating information and instructions from one entity to another, such as man to man or man to machine. Unfortunately, prior programming languages have been an imperfect way of communicating information and instructions from man to machine.

For example, early in the computing era, assembly languages were used to form low-level programming languages. Assembly languages use abbreviations or mnemonic codes in which each statement corresponds to a single machine instruction. Along with the advantage of high efficiency due to direct programmer interaction with system hardware and resources came the undesirable consequence of having to manually update ad hoc organizational schemes, such as data structures, when even slight changes were made to an assembly language program. The high-level languages of today, which provide a level of abstraction above the underlying machine language, evolved from assembly languages. High-level language statements generally use keywords (usually in English) that are translated into more than one machine-language instruction. High-level languages have built-in support for data structures and define a set of syntactic and semantic rules that define the structure of the language. When a slight change is made to a program written in a high-level language, a compiler, which transforms the program into object code by following a predetermined set of syntactic and semantic rules, either reflows the object code as necessary to correspond with the change made to the program or unabashedly informs a programmer of the apparent programming error.

Programmers have leveraged the ability of a compiler to detect errors in the invocation of application programming interfaces (APIs) by checking the signature of an invoking API against the corresponding signature of a defined API. An API is an interface of a program that defines the sort of inputs the program will accept to perform a desired task and the sort of outputs the program will return after the performance of the desired task. APIs allow programs to cooperate together to provide greater functionality than each could provide alone.

An API only specifies what must be provided to the API and what will be returned from the API—not the behaviors of the program underlying the API. For example, to properly cooperate, an "initialization" program must be called before a "do work" program is called, and correspondingly, the "do work" program must be called before a "clean up" program is called. APIs do not capture this ordering idea, or any other ideas that express how programs should cooperate. As a result, like the laborious tasks of maintaining the assembly programs of yesteryear, programmers must once again fit square pegs into round holes by working within the limit of the expressiveness of present high-level languages to ensure that programs correctly cooperate.

The foregoing problem is exacerbated with the proliferation of Web services, which are basically programs located on any number of computing devices interconnected by the Internet. Whereas the specification and the laborious verification of the cooperation of programs within a single computing device can be undertaken—albeit arduously—the task of verifying the intricate ballet associated with the cooperation of multiple Web services (which send multiple messages from multiple computing devices) is an insurmountable problem because of the lack of the expressiveness of present high-level languages. What is needed is a programming language that can express the cooperative dimensions of programs or services, such as ordering and timing, among other things, so that such cooperative dimensions can be programmatically verified.

One partial solution is the use of $\pi$-calculus, which is a mathematical language for describing processes in interactive, concurrent systems, such as a system 100 shown in FIG. 1. The system 100 includes a client 102, which is a computer that accesses shared network resources being provided by another computer, such as a server 106, on a local area network or a wide area network, such as the Internet 104. A number of Web services 108, 116 are statically stored as programs on the client 102 and the server 106.

Early operating systems allowed users to run only one program at a time. Users ran a program, waited for it to finish, and then ran another one. Modern operating systems allow users to execute (run) more than one program at a time or even multiple copies of the same program at the same time. A thread is the basic unit used by the operating system to allocate processor time to a program. A thread can include any part of the programming code, including parts currently being executed by another thread. A processor is capable of executing only one thread at a time. However, a multi-tasking operating system, i.e., an operating system that allows users to run multiple programs, appears to execute multiple programs at the same time. In reality, a multi-tasking operating system continually alternates among programs, executing a thread from one program, then a thread from another program, etc. As each thread finishes its sub-task, the processor is given another thread to execute. The extraordinary speed of the processor provides the illusion that all of the threads execute at the same time.

While the terms multi-tasking and multi-processing are sometimes used interchangeably, they have different meanings. Multi-processing requires multi-processors. If a machine has only one processor, the operating system can multi-task, but not multi-process. If a single machine has multiple processors or there are multiple machines (the client 102 and the server 106), each of which has a processor, the operating system of the single machine or the operating systems of multiple machines can both multi-task and multi-process. Both a single machine having multiple processors and multiple machines, each having a processor, define a concurrent system. This is an object of interest for π-calculus.

The core of π-calculus consists of systems of independent, parallel processes (such as Web services 108, 116) that communicate via links (such as a link 124). Links can be any of the following: APIs that become as remote procedure calls; hypertext links that can be created, passed around, and removed; and object references (e.g., "rose") passed as arguments of method invocations in object-oriented systems. The possibilities of communication for a process with other processes depends on its knowledge of various different links. Links may be restricted so that only certain processes can communicate on them. What sets the π-calculus apart from other process languages is that the scope of a restriction (the context in which a link may be used) may change during execution. For example, when the Web Service 116 sends a restricted name, such as an API previously known only to the Web Service 116, as a message to the Web service 108, which is outside the scope of the restriction, the scope is expanded (or extruded in the mathematic idiom of π-calculus). This means that the scope of the API is enlarged to embrace the Web service 108 receiving the API. In other words, the Web service 108 can now invoke the function represented by the API whereas before the Web service 108 had no knowledge of the API, hence was unable to invoke the API. This procedure allows the communication possibilities of a process to change over time within the framework of π-calculus. A process can learn the names of new links via scope extrusion. Thus a link is a transferable quantity for enhancing communication.

What has been central, foundational, and unchanging about π-calculus is its intense focus on names, such as "rose," and the passing of names as messages over links. In particular, π-calculus places great emphasis on pure names, each of which is defined to be only a bit pattern. One example of a pure name is the 128-bit space GUID (Globally Unique Identifier) that uniquely identifies an interface or an implementation in the COM component model. Another example of a pure name is a function signature or an API as described above. For additional emphasis, consider the above-discussed problem in this light: suppose there are three APIs ("initialization," "do work," and "clean up") sent to the Web service 108 from the Web service 116, but the Web service 116 must invoke these three APIs only in a particular order (e.g., "initialization" and then "do work" and then "clean up"). While existing π-calculus and its variants allow the three APIs to be sent over the link 124 to reach the Web service 108 from the Web service 116, the existing π-calculus and its variants lack a way for the Web service 116 to express to the Web service 108 the particular order in which the three APIs are to be invoked. In this sense, existing π-calculus and its variants cannot completely express the cooperative dimensions of programs or services, such as ordering and timing, among other things, so that such cooperative dimensions can be programmatically verified.

One Elizabethan poet succinctly provided this adage, metaphorical in form but embodying a timeless observation: "What's in a name? That which we call a rose by any other name would smell as sweet." This observation made long ago precisely points to a present problem of π-calculus and its variants—a lack of tolerance for the passage of structured data on named links (such as the link 124). In fact, π-calculus unfavorably refers to structured data as "impure names," which is a negative linguistic construction. Pureness is desirable while impurity is abhorred. Thus impure names in the context of π-calculus are data with some kind of recognizable structure, such as an extensible markup language (XML) document. In practice, it is useful (and at times necessary) for one process to communicate structured data to another process.

Without a flow of data, it is difficult to facilitate communication between processes—except in a very indirect way—to represent mobility or dynamism among processes. To solve this problem, computer scientists have investigated the possibility of allowing processes to flow in communication over links. For example, a process 110 may send to the process 118 a message which represents a third process (not shown). This is known as higher-order π-calculus. Because of the rigidity with which π-calculus handles pure names, instead of sending a process over a link, even higher-order π-calculus variants send a name, which gives access to a desired process, instead of sending the process itself.

Sending a name, rather than a process, can be likened to the traditional programming technique of passing by reference, i.e., passing an address of a parameter from a calling routine to a called routine, which uses the address to retrieve or modify the value of the parameter. The main problem with employing the passing by reference technique in higher-order π-calculus variants is that the technique can inhibit the ability of a concurrent system to become distributed. There are many implementations of π-calculus, namely PICT, Nomadic PICT, TyCO, Oz, and Join, among others. However, these other implementations are either not distributed (PICT) or are not higher-order forms of the π-calculus (Nomadic PICT, TyCo, Oz, and Join).

Thus there is a need for better methods and systems for allowing processes in concurrent, distributed computing networks to interact while avoiding or reducing the foregoing and other problems associated with existing π-calculus and its variants.

SUMMARY OF THE INVENTION

In accordance with this invention, a method and computer-readable medium for processing programs written in a process-based language is provided. In accordance with this invention, a method form of the invention comprises parsing the expression to obtain syntactical elements that represent a queue, a set of queue delimiters, a query, a sequence delimiter, and other actions. The method translates the expression as a process whose first action is submitting the query as another process to the queue and after which the process continues with other actions. The query includes an organization scheme formed from a customizable, tag-based language that contains data and describes data.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a block diagram illustrating major syntactical categories of an exemplary programming language, which is an artificial language that can be used to define a sequence of instructions that can ultimately be processed and executed by the exemplary computing device in a concurrent, distributed network of computing resources.

FIGS. 7A–7B are block diagrams illustrating a technique for fusing two queues for enhancing communication between two processes in a concurrent, distributed system formed in accordance with this invention.

FIG. 8 is a block diagram illustrating an exemplary system formed in accordance with this invention for fusing two queues to enhance communication among processes in a concurrent, distributed system formed in accordance with this invention.

FIGS. 10A–10C are block diagrams illustrating an exemplary system formed in accordance with this invention for discovering a name that can be used to access multiple databases by a process in a concurrent, distributed system formed in accordance with this invention.

DETAILED DESCRIPTION OF THE PREFERRED EMBODIMENT

Figure 1:
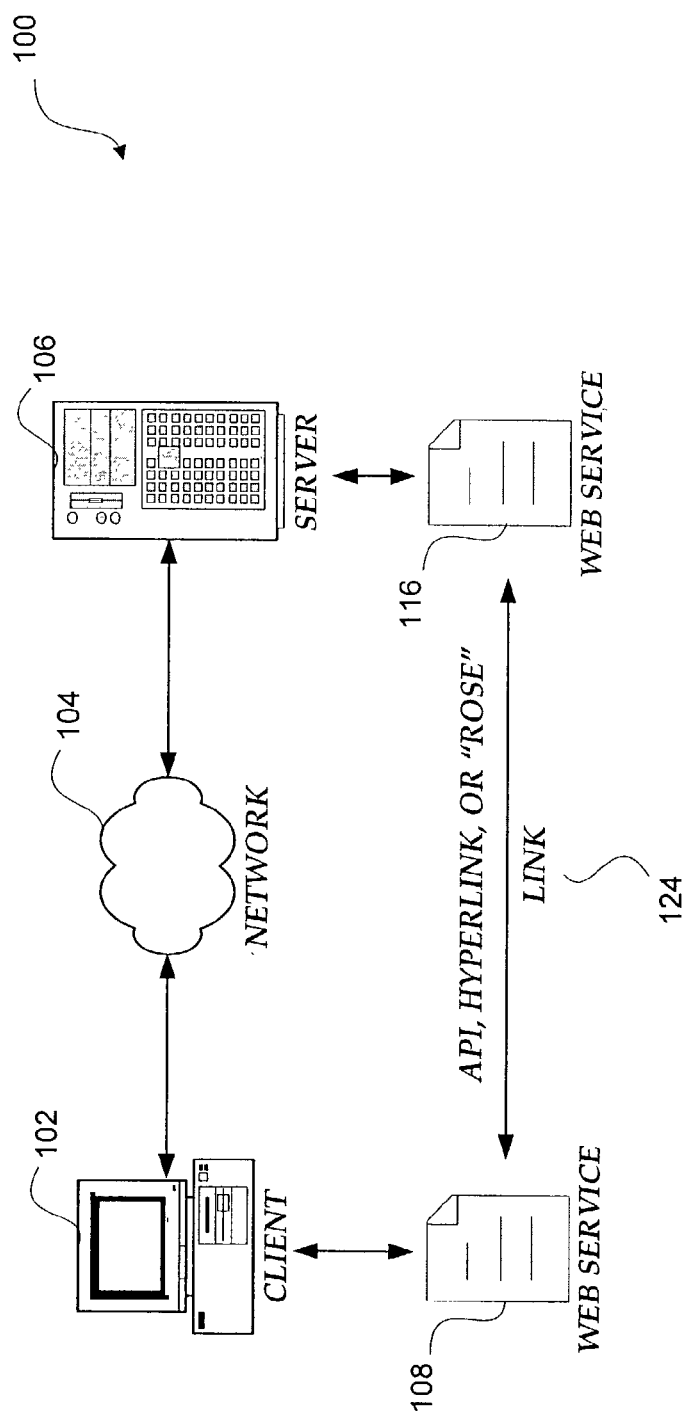
FIG. 1 is a block diagram illustrating a conventional, concurrent system using π-calculus for passing a name, such as an API, on a link between two Web services.
Figure 2:
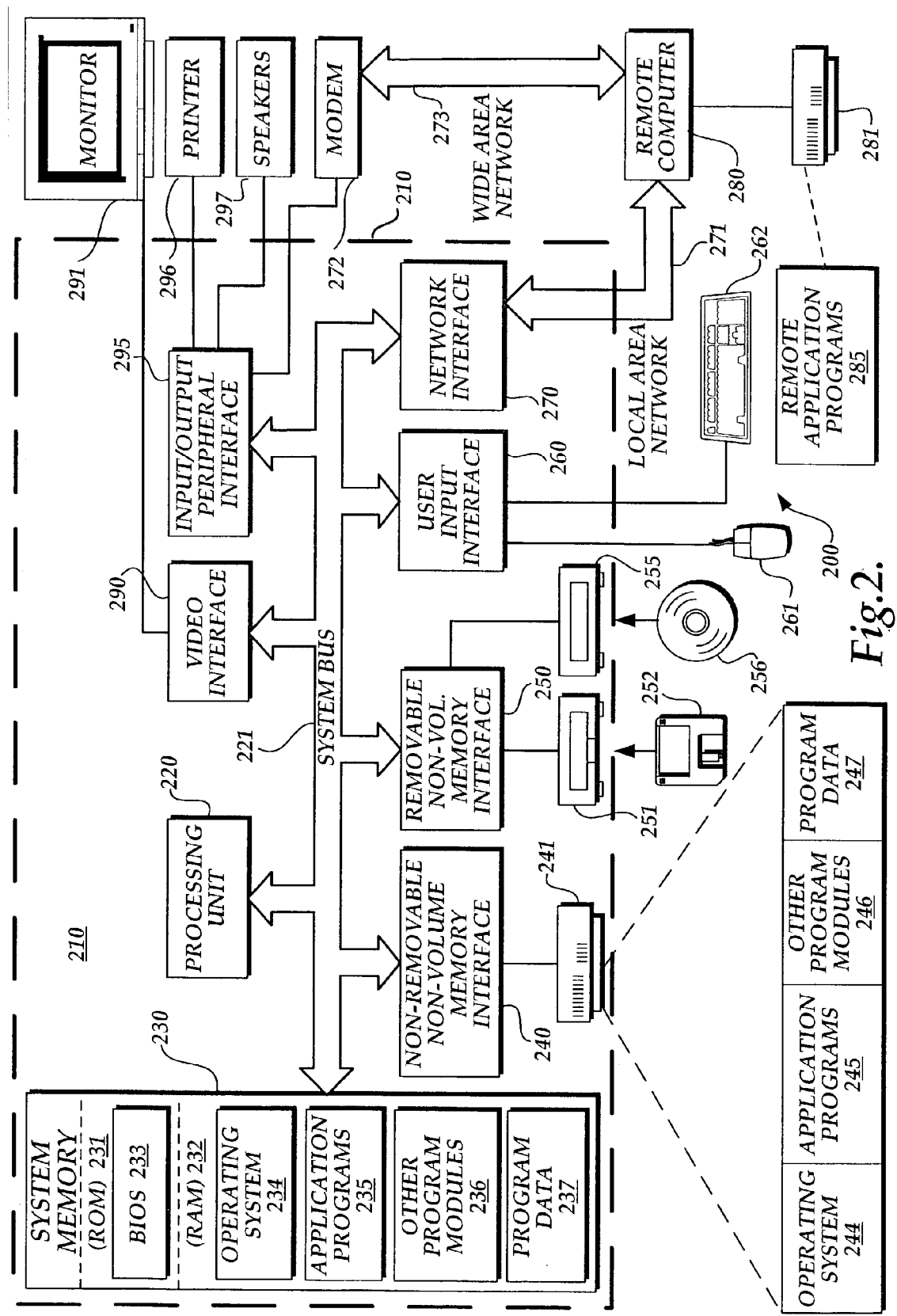
FIG. 2 is a block diagram illustrating an exemplary computing device.

FIG. 2 illustrates an example of a suitable computing system environment 200 for practicing certain aspects of the invention, such as processing queries, queues, and processes generated in accordance with the invention and/or executing the hereinafter described process kernel. The computing system environment 200 is only one example of a suitable computing environment and is not intended to suggest any limitation as to the scope of use or functionality of the invention. Neither should the computing environment 200 be interpreted as having any dependency or requirement relating to any one or combination of the illustrated and described components.

The invention is operational with numerous other general purpose or special purpose computing system environments or configurations. Examples of well-known computing systems, environments and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention is described in the general context of computer-executable instructions, such as program modules being executed by a computer. Generally, program modules include routines, programs, objects, components, data structures, etc., that perform particular tasks or implement particular abstract data types.

The invention may also be practiced in distributed computing environments where tasks are performed by remote processing devices that are linked through a communications network. In a distributed computing environment, program modules may be located in both local and remote computer storage media, including memory storage devices.

The computing system environment illustrated in FIG. 2 includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures, including a memory bus or memory controller, a peripheral bus, and a local bus using any of a variety of bus architectures. By way of example, and not limitation, such bus architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

Computer 210 typically includes a variety of computer-readable media. Computer-readable media can be any available media that can be accessed by computer 210 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media include, but is not limited to, RAM, ROM, EEPROM, flash memory or other memory technology, CD-ROM, digital versatile disks (DVD) or other optical disk storage, magnetic cassettes, magnetic tapes, magnetic disk storage or other magnetic storage devices, or any other computer storage media. Communication media typically embody computer-readable instructions, data structures, program modules or other data in a modulated data signal, such as a carrier wave or other transport mechanism that includes any information delivery media. The term "modulated data signal" means a signal that has one or more of its characteristics set or changed in such a manner as to encode information in the signal. By way of example, and not limitation, communication media include wired media, such as a wired network or direct-wired connection, and wireless media, such as acoustic, RF infrared, and other wireless media. A combination of any of the above should also be included within the scope of computer-readable media.

The system memory 230 includes computer storage media in the form of volatile and/or nonvolatile memory, such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates the hard disk drive 241 that reads from or writes to non-removable, nonvolatile magnetic media, the magnetic disk drive 251 that reads from or writes to a removable, nonvolatile magnetic disk 252, and an optical disk drive 255 that reads from or writes to a removable, nonvolatile optical disk 256, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital videotapes, solid state RAM, solid state ROM, and the like. The hard disk drive 241 is typically connected to the system bus 221 through a non-removable memory interface, such as interface 240, and the magnetic disk drive 251 and optical disk drive 255 are typically connected to the system bus 221 by a removable memory interface, such as interface 250.

The drives and their associated computer storage media discussed above and illustrated in FIG. 2 provide storage of computer-readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices, such as a keyboard 262 and pointing device 261, the latter of which is commonly referred to as a mouse, trackball, or touch pad. Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port, or universal serial bus (USB). A monitor 291 or other type of display device is also connected to the system bus 221 via an interface, such as a video interface 290. In addition to the monitor, computers may also include other peripheral output devices, such as speakers 297 and printer 296, which may be connected through an input/output peripheral interface 295.

The computer 210 may operate in a networked environment using logical connections to one or more remote computers, such as a remote computer 280. The remote computer 280 may be a personal computer, a server, a router, a network PC, a peer device, or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such network environments are commonplace in offices, enterprise-wide computer networks, intranets, and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the input/output peripheral interface 295, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are for illustrative purposes only and other means of establishing a communication link between the computers may be used.

Figure 3A:
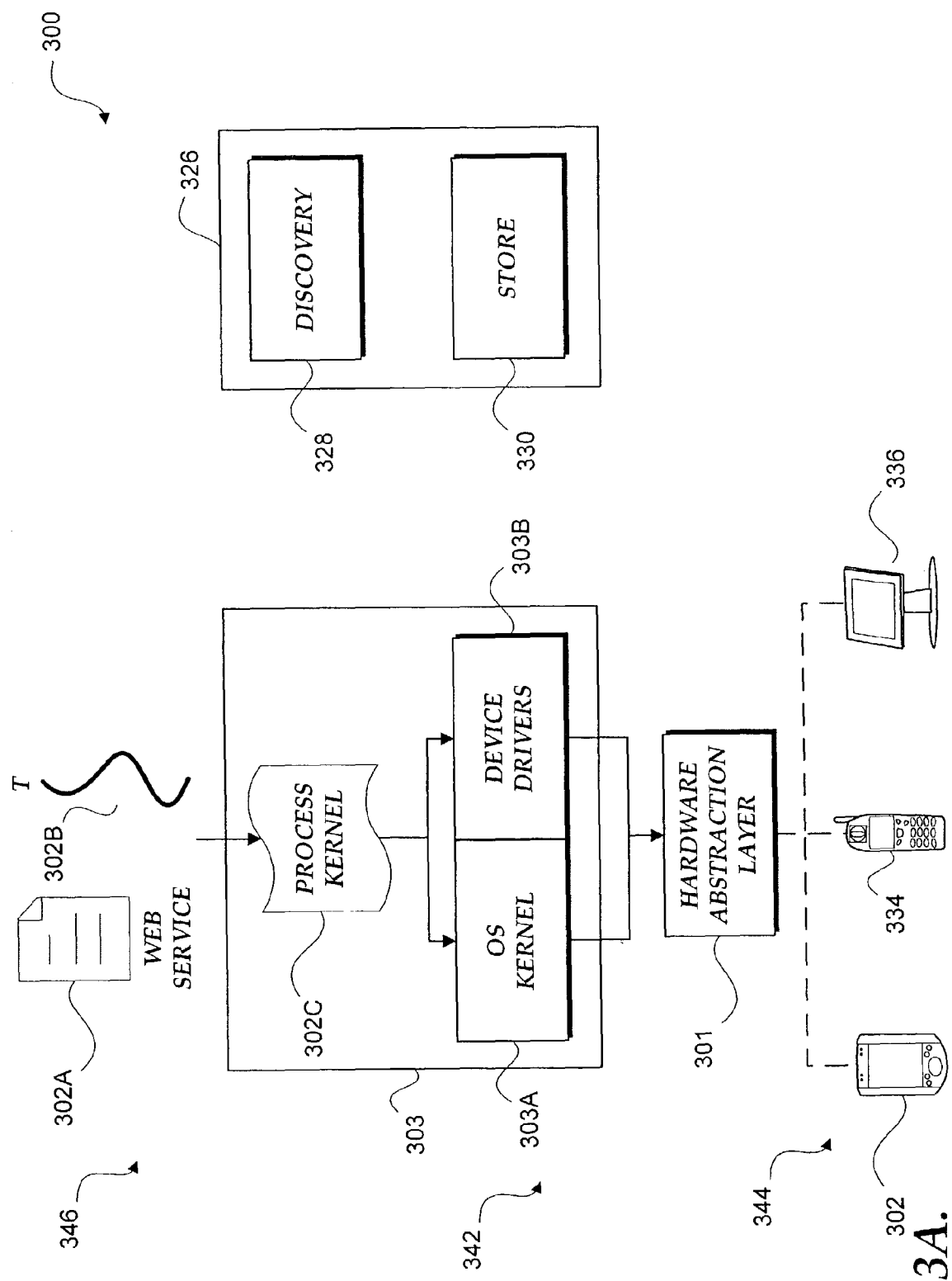
FIGS. 3A–3C are block diagrams illustrating an exemplary concurrent, distributed system formed in accordance with the invention for communicating structured messages among multiple processes.

A system 300, which is a collection of component elements that work together to perform one or more computing tasks, is illustrated in FIG. 3A. One example is a hardware system 344, which can comprise a number of computing devices, such as a personal digital assistant 302, a cellular phone 334, and a desktop computer 336, each comprising a microprocessor, its allied chips and circuitry, input and output devices, and peripheral devices (not shown). For ease of illustration, the only depicted computing devices in subsequent figures are personal digital assistants (PDAs).

The system 300 includes an operating system 342, comprising a set of programs and data files, such as an operating system kernel 303A, one or more device drivers 303B, and a process kernel 302C. Subjacently coupled to the operating system 342 is a hardware abstraction layer 301. The hardware abstraction layer 301 is an application programming interface for use by programmers to access devices of the hardware system 344 (such as the computing device 302, the cellular phone 334, and the desktop computer 336). The operating system kernel 303A is the core of the operating system 342 and is designed to manage memory, files, and peripheral devices (via the hardware abstraction layer 301); maintain the time and date; launche applications, such as a Web service 302A; and allocate system resources. Device drivers 303B are separate components that permit the Web service 302A to communicate with a device, such as the computing device 302. The process kernel 302C represents the Web service 302A as a process 302B, manages the process 302B, and facilitates the communication of the process 302B with other processes (described below). The operating system kernel 303A, the device drivers 303B, and the process kernel 303C reside in the kernel-mode portion of the operating system 342 while the Web service 302A and the process 302B reside in a user-mode portion 346 of the operating system 342. Alternatively, the process kernel 303C can reside in the user-mode portion 346 when it is superjacently coupled to other system software components 305, 307 (FIG. 3B), such as COM (Component Object Model).

The term "process" used in accordance with the present invention means a dynamic representation of one or more computation entities that have the capability to evolve by performing actions or that allow other processes to evolve. In other words, the term "process" represents one of a duality of natures of a computation entity. When a computation entity is at rest, it can be examined, such as by viewing a program. When a computation entity is mobile (as a process), it cannot be seen, but its behaviors can be expressed and verified by a programming language 400 formed in accordance with the present invention (described below).

The Web service 302A is designed to specialize in a certain service. To obtain greater functionality, the Web service 302A can enlist the help of other Web services that can provide services not within the scope of the Web service 302A. To track down other Web services, the Web service 302A can communicate with a directory framework 326. The directory framework 326 is a platform-independent piece of software (a directory framework) that provides a way to locate and register Web services on the Internet. The directory framework 326 includes a store 330 containing a number of registered Web services and including detailed technical information about these Web services. A discovery component 328 of the directory framework 326 acts as a broker between the process 302B and the store 330 to locate a desired Web service.

Figure 3B:
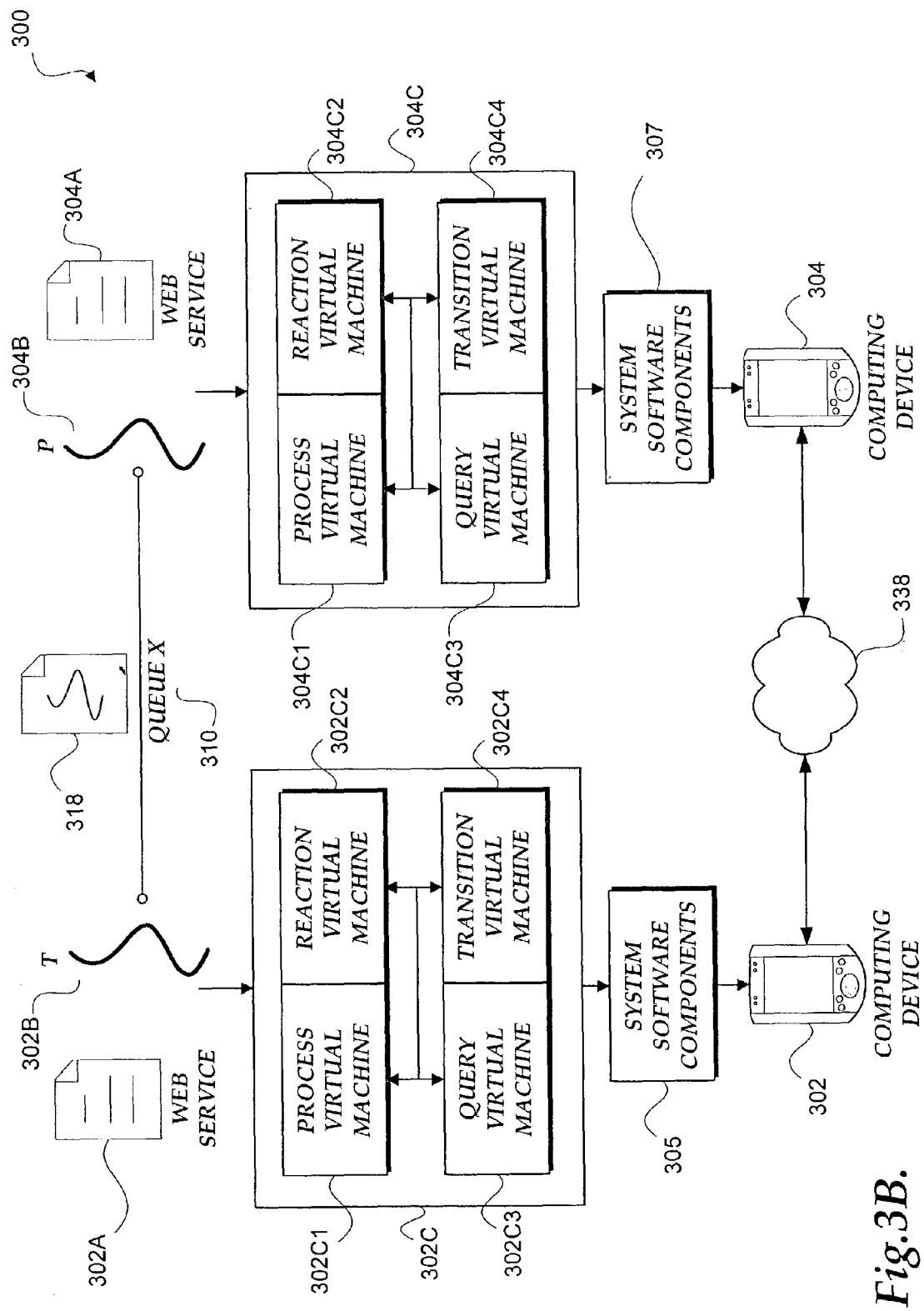

Once the directory framework 326 finds an appropriate Web service requested by the Web service 302A, the Web service 302A can begin to interact with the discovered Web service to accomplish a desired task. FIG. 3B illustrates a discovered Web service 304A. The process kernel 304C represents the Web service 304A as a process 304B, which interacts with the process 302B over a communication means, such as a queue 310, to accomplish tasks of Web services 302A, 304A.

The queue 310 through which processes communicate can take various forms, such as databases, channels, or other suitable structured stores. Because the computing devices 302, 304 can be located at geographic locations well away from each other, processes 302B, 304B cannot communicate via shared memory. Suitable communication means, such as the queue 310, include technology that enables processes 302B, 304B while running at different times to communicate across heterogeneous networks and systems that may be temporarily offline. Processes 302B, 304B send messages to communication means, and read messages from communication means. Communication means can provide guaranteed message delivery, efficient routing, security, and priority-based messaging. Additionally, communication means can be used to implement solutions for both asynchronous and synchronous scenarios requiring high performance. As indicated above, specific examples of suitable communication means include channels, queues, or databases, among other structured stores. When the queues 310–316 are databases, they are files composed of records, each containing fields together with a set of operations for searching, sorting, recombining, and other processing functions, organized in multiple tables, each of which are data structures characterized by rows and columns, with data occupying or potentially occupying each cell formed by a row-column intersection.

The internal architecture of process kernels 302C, 304C include process virtual machines 302C1, 304C1, which contain software components for defining processes and for governing interactions among processes; query virtual machines 302C3, 304C3, which contain software components for defining queries and for governing the interactions among queries and queues; reaction virtual machines 302C2, 304C2, which contain software components for governing the interactions among queries, queues, and processes; and transition virtual machines 302C4, 304C4, which contain software components for isolating the process kernels 302C, 304C from the specifics of system software components 305, 307 (such as COM and the operating system, among others) on computing devices 302, 304.

Computing devices 302, 304 interact, communicate, and exchange information over a local area network, wide area network, or wireless network 338. Processes 302B, 304B communicate over a queue 310 to exchange messages, such as a message 318. Unlike prior systems implementing π-calculus and its variants, the system 300 formed in accordance with the invention allows messages, such as the message 318, to be represented as processes by process kernels 302C, 304C in the exchange between processes 302B, 304B. This allows cooperative dimensions of programs or Web services, such as the invocation ordering of APIs, among many other things, to be expressed between processes 302B, 304B.

Figure 3C:
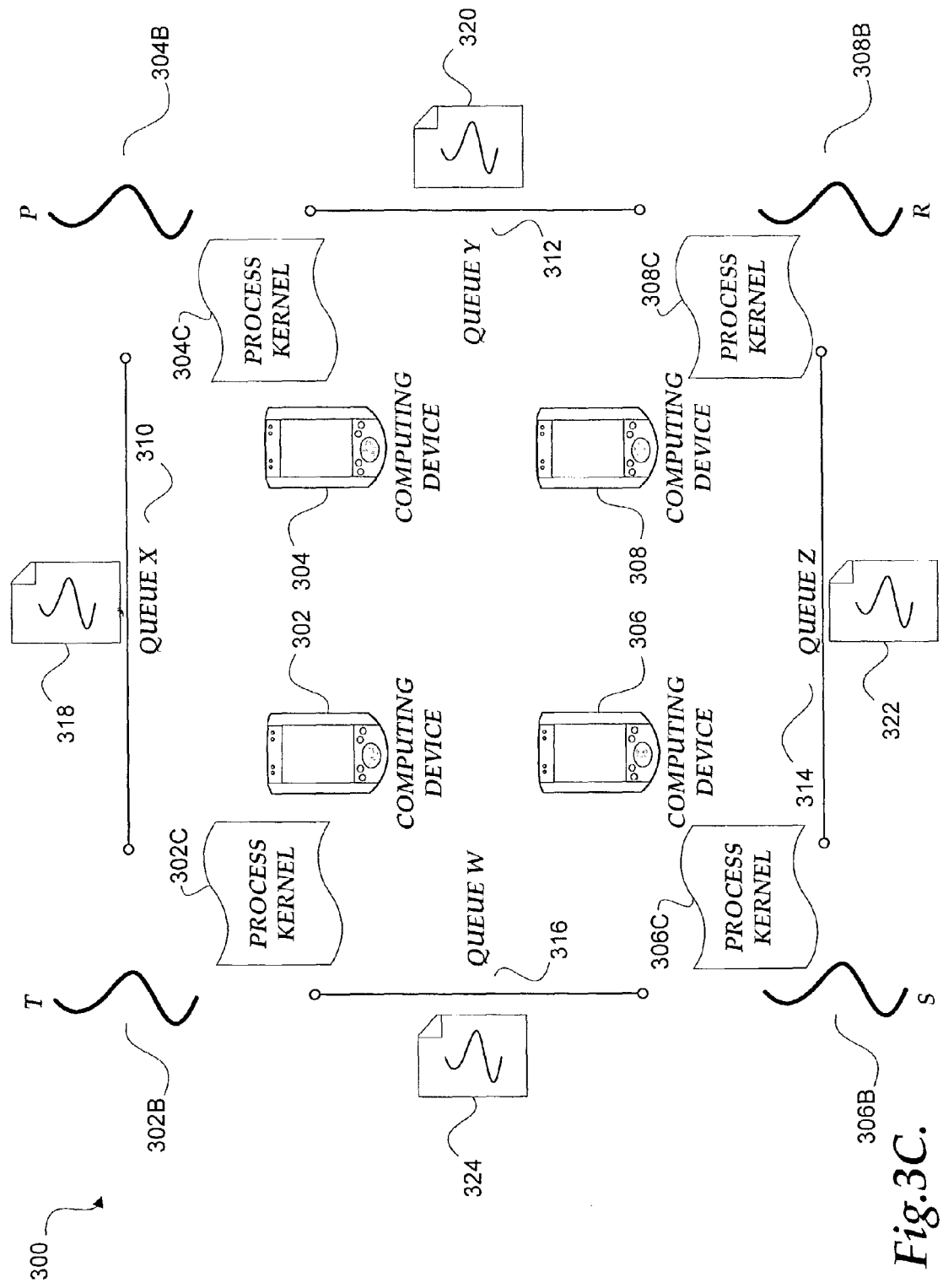

FIG. 3C illustrates the system 300 as a non-centralized network comprising numerous computing devices 302, 304, 306, 308 that can communicate with one another and that appear to users as parts of a single, large, accessible "storehouse" of shared hardware, software, and data. The system 300, in the idiom of computer scientists, is a distributed system, which is conceptually the opposite of a centralized, or monolithic, system in which dumb clients connect to a single, smart central computer, such as a mainframe. The system 300 is a dynamic network topology in which highly distributed, concurrent processes 302B, 304B, 306B, 308B interact in parallel on computing devices 302–308.

Processes 302B–308B cooperate to express to each other information sent as messages or queries to queues 310–314. Pieces of information sent over a communication means include ordering of execution, timing of data, quality of service, and passing of, among processes 302B–308B, an organizational scheme formed from a customizable, tag-based language that contains data and describes data in such a way as to facilitate the interpretation of data or the performance of operations on data. While one suitable customizable, tag-based language is extensible mark-up language (XML), the invention is not limited to this language. Other customizable, tag-based languages can be used.

Cooperative communication between processes 302B–308B is provided by the programming language 400 (FIG. 4) formed in accordance with this invention. The language 400 is a high-order variant of the π-calculus. In other words, the language 400 is a process-based language. More specifically, in addition to other properties discussed below, the language 400 has the ability to programmatically detect "liveness." Liveness is an indication that a process is alive. This quality needs to be programmatically verified in order for a program to be trusted to do the things it is designed to do. A program, such as the Web service 302A written in the language 400 can be programatically verified for "liveness." Other properties include the ability to analyze the security of processes 302B–308B and resource access run-time errors. Security problems include the protection of computing devices 302–308 and their data from harm or loss. One major focus of security, especially for non-centralized networks, such as the system 300, that are accessed by many people through multiple queues 310, 312, 314, 316, is the prevention of access by unauthorized individuals. The Web service 302A written in the language 400 can be verified to detect security problems induced by untrustworthy Web programs or untrustworthy computing devices.

The formal mathematical definition of the language 400 is given in the Appendix. The language 400 includes the grammar, the rules for structural equivalents, and the rules for operational semantics. The grammar of the language 400 is the system of rules that define the way in which the syntactical elements of queries and processes are put together to form permissible programming statements. In other words, unless one can express correctly in the grammar of the language 400, one cannot communicate concepts, such as the invocation of APIs, from one process to another process. Once an expression is correctly formed, the rules of semantics connect the expression with meanings. Because processes are dynamic, the language 400 uses operational semantics to couple meanings to processes. In other words, processes evolve by acting or interacting with other processes. Understanding the meaning of an expression of the language 400 relates directly to understanding its operations. The rules for structural equivalence allow the operational semantics of the language 400 to be simplified in that an expression can be likened to another expression. Thus, the number of rules for operational semantics can be kept small since these rules can be applied to permutations of expressions.

The language 400 has several major syntactical categories: a queue syntax 402, which represents queues, databases, communication channels, or any structured stores that allow processes running at different times or at the same time to communicate via messages; a query syntax 404, which represents instructions written in a data manipulation language to assemble and disassemble messages, manipulate structured stores represented by the queue syntax 402, and detect message patterns; and a process syntax 406, which represents a dynamic aspect of a computation entity that can exchange not only names, such as an API, but also processes as messages over structured stores represented by the queue syntax 402. The queue syntax 402, the query syntax 404, and the process syntax 406 together form the major syntactical elements of the language 400. Syntactical elements 402-406 of the language 400 can be used alone or can be combined in permutations to express cooperating nuances among processes, such as processes 302B–308B. The syntactical rules (described in detail with reference to FIG. 11C–12F and Section 1.1 of the Appendix), the structural equivalent rules (discussed in greater detail below with reference to FIG. 11J and section 2.1 of the Appendix), and the operational semantics rules (discussed in greater detail below with reference to FIGS. 11O–11R and section 3.1 of the Appendix) in connection with queries are placed in the query virtual machines 302C3, 304C3. The syntactical rules (described in detail with reference to FIG. 11G–11I and Section 1.2 of the Appendix), the structural equivalence rules (discussed in greater detail below with reference to FIGS. 11K–11N and section 2.2 of the Appendix), and the operational semantics rules (discussed in greater detail below with reference to FIGS. 11S–11V and section 3.2 of the Appendix) in connection with processes are placed in the process virtual machines 302C1, 304C1. The reaction virtual machines 302C2, 304C2 contain operational semantics rules that define a method by which queues, queries, and processes react to each other.

The programming language 400 allows expressions to be formed for describing processes, such as processes 302B–308B, that run in parallel and interact over communication means, such as the queues 310–314. Mathematically, if T and P are processes, the expression T|P describes that processes T, P are running in parallel, possibly communicating with each other or with the outside world along communication means.

Queues 310–314 are represented by names (which correspondingly, are "X," "Y," "Z," and "W."). The programming language 301 allows the passage of certain classes of processes, such as processes 318–324, among other things, to be expressed as messages over queues 310–314. The processes 318–324 embody an organizational scheme formed from a customizable, tag-based language that contains data and describes data in a way that facilitates the interpretation of data or the performance of operations on data. One exemplary organizational scheme includes a query. Another exemplary organizational scheme includes a message. A further exemplary organizational scheme includes an XML document.

A query contains data and information to manipulate data. Consider this example: the computing device 302 represents a computer at a publisher and the computing device 304 represents a computer at a bookstore. Both the publisher and the bookstore have the independent ability to define, in XML, their own tags for information about authors, titles, and publication dates of books. Such book information can be organized into XML documents with appropriate tags. The information is exchanged by the computing device 302 at the publisher or the computing device 304 at the bookstore transforming the XML documents into queries, which is represented by process kernels 302C–30C as processes, such as the process 318 to be communicated over the queue 310 between the process 302B and the process 304B.

Prior π-calculus variants do not allow structured information, such as XML documents, to be communicated over communication means, such as the queue 310. However, the actual performance of applications at times requires some exchange of structured information. A case in point includes structured information that expresses the invocation ordering of APIs. Another case in point is the example discussed above between the publisher and the bookstore. The programming language 400 allows multi-dimensional data (data structures) to be embodied in processes, such as processes 318–324, to be communicated as messages passed among processes 302B–308B. The language 400 allows the creation of an environment for facilitating the exchange of an organizational scheme (which is expressed in a customizable, tag-based language that contains data and describes data in such a way as to facilitate the interpretation of data or the performance of operations on data) among processes over queues in a non-centralized network that is concurrent and distributed.

Figure 5:
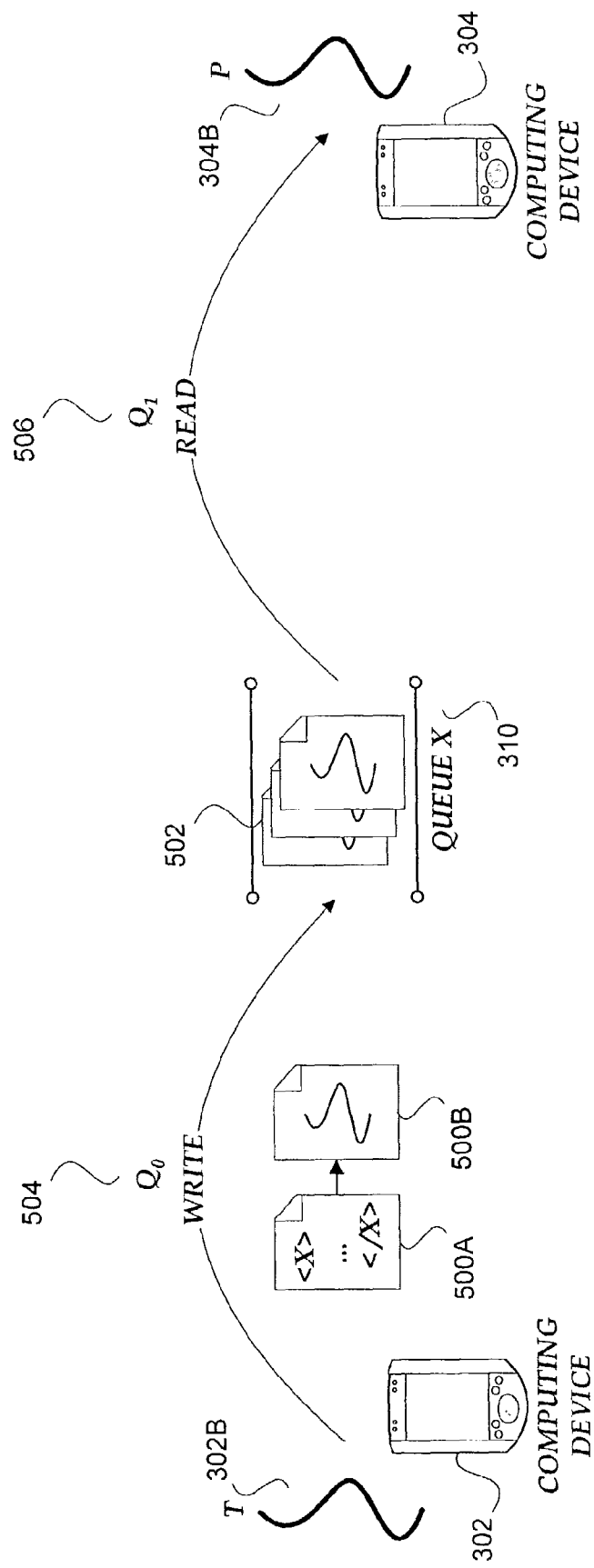
FIG. 5 is a block diagram illustrating in greater detail an exemplary queue formed in accordance with the invention for storing processes as messages for communication between the two processes.

FIG. 5 visually illustrates syntactical expressions that relate a queue 310 (X), queries 504, 506 ($Q_0$, $Q_1$), and processes 302B, 304B (T, P). Stored in the queues 310–316 are one or more queries 502, which are processes embodying structured data or names with no apparent structure. To communicate a structured data file, such as an XML document 500A from the process 302B to the process 304B via the queue 310, the process 302B converts the XML document 500A into a query 500B and then writes the query 500B into the queue 310. The query 5001B is treated as a process by the process kernels 302C–308C. Unlike prior variants of π-calculus, the programming language 400 allows processes, such as the query 500B, to pass through communication means, such as the queue 310. The query 500B contains more than a pure name in that the query 500B also contains the structured contents of the XML document 500A. To obtain the query 500B, the process 304B reads the queue 310.

The programming language 400 provides a set of query operations that are used to assemble and disassemble queries, manipulate queues, and detect patterns in queries. Other query operations are used to put messages into queues, get messages from the queues, and build new messages from existing messages. A query comprises two portions: a head and a body. The head of a query defines a set of parameters and their corresponding types. The body is a set of bindings. A query is invoked by binding its parameters to arguments and activating its sets of bindings. A binding defines a relation between two terms. Not all terms can be bound together. A valid binding exists when the binding binds a term of some type to a term of its complementary type. A query can be likened to a traditional procedure; the head of the query is like the signature of the procedure; the body of the query is like the set of programming statements of the procedure; and each binding is a programming statement that uses the data stored in the parameters of the signature of the procedure or places data into the parameters of the signature of the procedure.

Mathematically, the relationship among the queue 310, a query 500B, and a process 304B can be syntactically expressed as $X[Q_0].P$, where X is the queue 310; $Q_0$ is the query 500B; and P represents the process 304B, which is a point of continuation after the query $Q_0$ has been written to the queue X. Thus linguistically, the mathematical expression $X[Q_0].P$ describes the process of depositing the query 500B at the queue 310 after which the process is continued with the execution of the process 304B. In the framework of the programming language 400, both $Q_0$ and P are processes in the mathematical notation $X[Q_0].P$. The programming language 400 identifies a subset (or certain classes) of processes that can be passed as messages over the queue X. This subset contains queries, each of which is correlated to customizable, tag-based data structures, such as those contained in XML documents.

One major aspect of the language 400 is its collection of equational laws for determining structural equivalence among queries and processes. The process of determining structural equivalence with these equational laws of the language 400 disencumbers minor differences between two programmatic documents, such as two programs or two software specifications, to ascertain whether they conform in every relevant respect. These laws of structural equivalence allow the operational semantics of the language 400 to be simplified as described above.

Figures 6A, 6B:
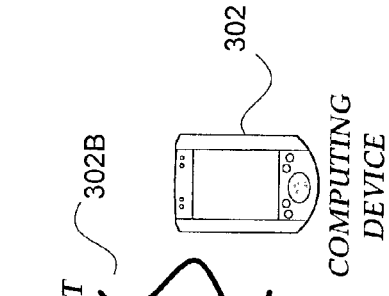
FIGS. 6A–6B are block diagrams illustrating a technique for determining structural equivalence between two programmatic documents formed in accordance with the invention.

FIG. 6A shows a program 602 written in a language suitable for this illustration. The program 602 includes a main( ) function which is the starting point of execution for certain languages, such as C or C++. Nesting between the first set of curly brackets is an IF statement containing a test condition (A==7). The test condition determines whether a variable A is equal to the value 7. If the test condition is true, programming statements contained within the second set curly of brackets are executed. There are two programming statements inside the second set of curly brackets. The first programming statement invokes a fork( ) function that takes a variable P0 as an argument. fork( ) functions in certain languages initiate a child process in a concurrent system after a parent process has been started. In this case, the child process is represented by the argument P0. After this invocation of the fork( ) function, the child process P0 runs in parallel with the parent process executing the program 602. The second programming statement also contains an invocation of the fork( ) function, but instead of taking the variable P0 as an argument, the second invocation of the fork( ) function takes a variable P1 as an argument. Another child process represented by the argument P1 is initiated with the invocation of the second fork( ) function. Child processes P0, P1 run in parallel with each other at the egress of the program flow from the closing curly bracket of the second set of curly brackets.

Another program 604 is similar to the program 602 in many respects, but there are some differences. One difference is the test condition of the IF statement of the program 604, which contains a variable B instead of the variable A. Another difference is that the child process P1 is initiated with the first invocation of the fork( ) function before the invocation of the child process P0. Despite these differences, the logic flow in both programs 602, 604 will ultimately reach the fork( ) statements of both programs 602, 604 if the test conditions of both IF statements are true. Thus the difference in the names of the variables A, B are negligible, and do not affect the logic structure of programs 602, 604. Moreover, because child processes P0, P1 run in parallel, the sequence of their invocation is also negligible.

The program 602, as discussed above, can be written by many different programming languages, each containing different and diverse grammatical constructions that hinder structural equivalent analysis. Using the language 400, the program 602 can be expressed by a quality apart from the grammatical specifics of the program 602. For example, the essence of the program 602 is the execution of child processes P0, P1 in parallel. This essence can be expressed by the language 400 by translating the program 602 into a specification 602A. The parallel execution of processes P0, P1 is expressed in the program 602A as "P0|P1." The statement "P0|P1" is nested between a tag <I_DO> and its corresponding ending tag </I_DO>.

Suppose the process 302B requires a service in which the child process P0 is desired to be executed in parallel with another child process P2. This requirement is captured by a statement "P0|P2" as indicated in a specification 302D written in the language 400. The statement "P0|P2" is situated between a tag <I_NEED> and its corresponding ending tag </I_NEED>. Suppose further that the process 302B obtains the specification 602A from the discovery component 328 to determine whether the program 602 is suited for the task that the process 302B wishes to accomplish. Using structural equivalence analysis, the process 302B can quickly determine that the program 602A will not be able to provide the requested service as specified by the specification 302D. This is the case because the program 602 executes child processes P0, P1 in parallel whereas the process 302B requires child processes P0, P2 running in parallel instead.

One equational law from the set of equational laws of the language 400 allows seemingly separate queues to be fused so that one queue can be substituted for another queue in operation. This is called substitution equivalence in section 2.2 of the Appendix. As shown in FIG. 7A, the process 302B uses the queue 310 (queue X) for sending and receiving messages (or writing and reading queries). Instead of using the queue 310, the process 304B communicates with a queue 702 (queue X') for sending and receiving messages (or writing and reading queries). Suppose a query is placed at the queue 702 in which the name X is bound to the name X' (name X:=:name X'), where the operator := is a binding operator, in the idiom of the language 400. This denotes that the queue 310 is essentially fused with the queue 702, hence allowing processes 302B–304B to operate or communicate on the same queue, such as the queue 310. See FIG. 7B. Using the equational laws of the language 400, processes 302B, 304B can discover a new way of accessing a queue (or database, or channel, among other structured stores).

The input/output mechanism (I/O) of prior variants of π-calculus is asymmetric. Consider the following mathematical example: $\overline{U}X.P|U(Y).Q$, where $\overline{U}$ and U refer to the same link, but $\overline{U}$ denotes that the link is outputting something, such as X, and U denotes that the link is inputting something, such as Y; X is output data; Y is input data; and P, Q are processes, which continue after the expressions $\overline{U}X$ and $U(Y)$ have been executed. The asymmetry arises from the fact that X as output data is not bound to the channel U whereas Y as input data is bound to the channel U. The term "bound" means that the operative scope of Y is restricted to the link for which Y is bound. In other words, after the Web service 116 (U) has communicated to the Web service 108 the API with which the Web service 108 is to invoked, the Web service 116 lost its knowledge of the API . Asymmetric I/O inhibits the formation of a distributed network topology, such as the system 300. The present invention overcomes or reduces the above problems by providing symmetric I/O.

FIG. 8 illustrates the symmetric I/O aspect of the system 300 formed in accordance with the present invention. Suppose the process 302B is mathematically defined as T=$\overline{X}.\overline{Y}.\overline{W}.S$, where T is the process 302B; $\overline{X}$ refers the queue 310 while it is outputting something; $\overline{Y}$ refers to the queue 312 while it is outputting something; $\overline{W}$ refers to the queue 316 while it is outputting something; and S refers to the process 306B. Suppose further that the process 304B is defined mathematically as follows: P=X.Y.Z.R, where P is the process 304B; X refers to the queue 310 while it is inputting something; Y refers to the queue 312 while it is intputting something; Z refers to the queue 314 while it is inputting something; and R refers to the process 308B. Suppose the process T is executed in parallel with the process P, or mathematically, T|P. In execution, the process $\overline{X}.\overline{Y}.\overline{W}.S$ is deployed to the queue 310 (X) and the process X.Y.Z.R is also deployed to the queue 310. After these two processes, $\overline{X}.\overline{Y}.\overline{W}.S$ and X.Y.Z.R, have reacted at the queue 310, processes $\overline{Y}.\overline{W}.S$, Y.Z.R are deployed to the queue 312 (Y). Suppose at this point, at the queue 312, a query is issued in parallel with the running processes, which binds the queue 316 to the queue 314, or mathematically <>(W:=:Z). With the issuance of such a query, the queue 316 (W) is fused with the queue 314 (Z). Any input or output at W will be communicated to Z, and correspondingly, any input or output at Z will be communicated to W, hence forming a distributed network topology. From the channel 312, another subprocess $\overline{W}.S$ is deployed to the queue 316 (W) and another subprocess Z.R is deployed to the queue 314 (Z). From the queue 316, the process 306B (process S) is deployed as a point of continuation and executed. From the queue 314, the process 308B (process R) is also deployed as another point of continuation and executed.

Figure 9A:
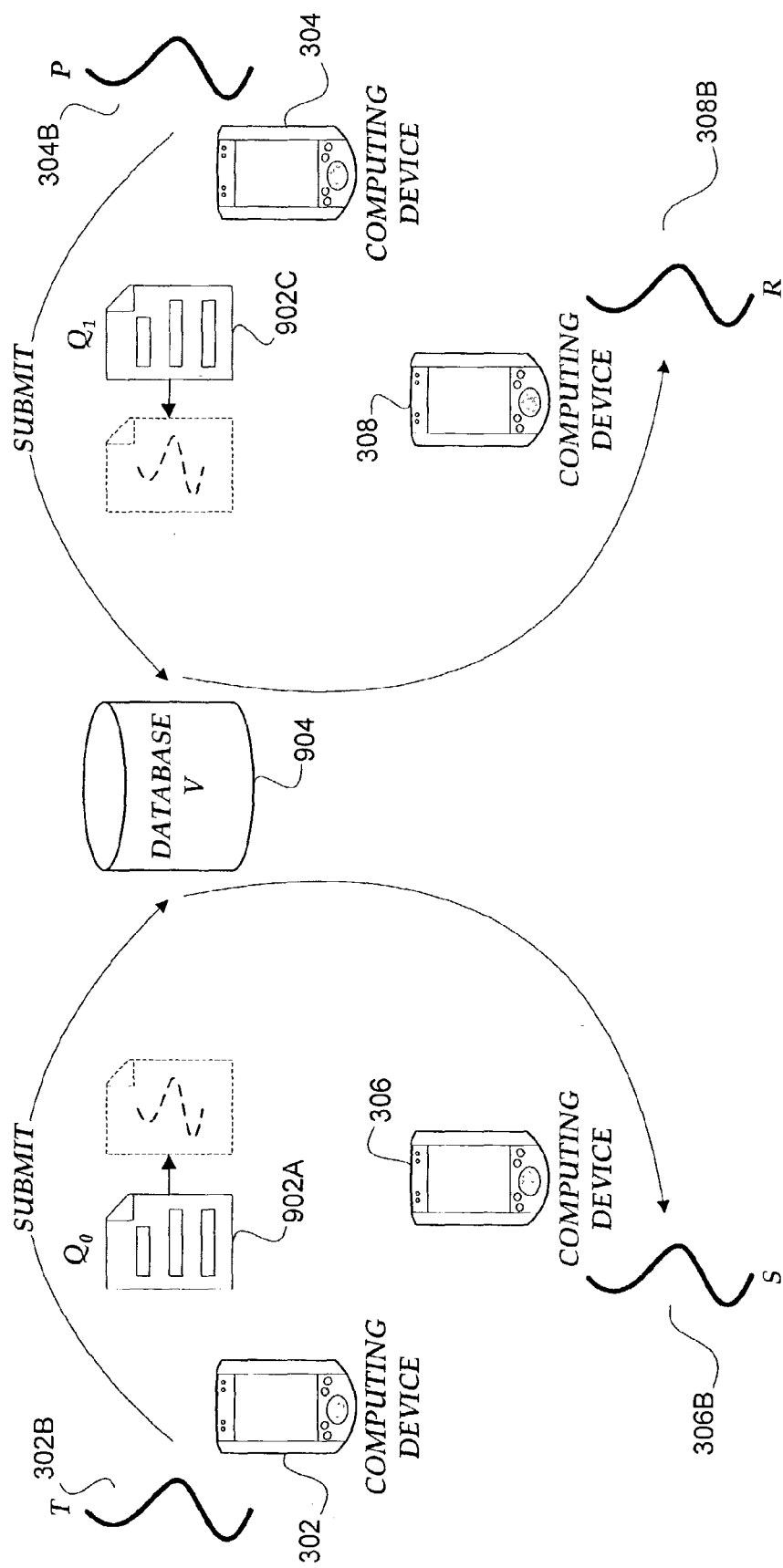
FIGS. 9A–9B are block diagrams illustrating an exemplary system for reducing two database forms allowing two separate processes to communicate in a concurrent, distributed system formed in accordance with this invention.
Figure 9B:
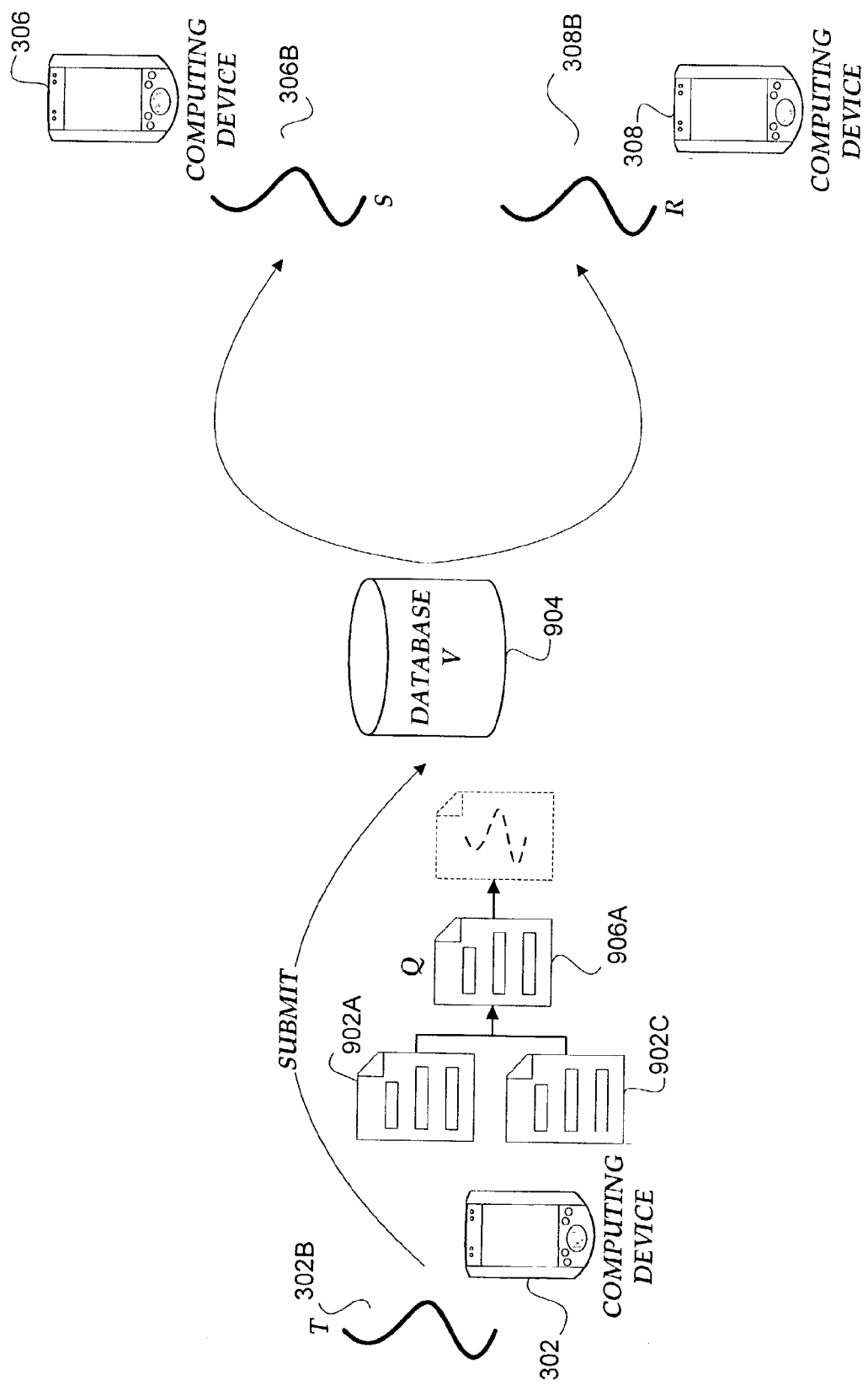

The language 400, in addition to its syntax, has a set of rules for describing the evolution of processes. In other words, these rules define the operational semantics of the language 400. The operational semantics of the language 400 describe the relationship between the syntactical elements 402–406 and their intended meanings. Thus a program statement written in the language 400 can be syntactically correct, but semantically incorrect. In other words, a statement written in the language 400 can be in an acceptable form, but still convey the wrong meaning. One example of the operational semantics of the language 400 is the communication reduction rule, which is pictorially illustrated by FIGS. 9A–9B (implemented in the reaction virtual machines 302C2, 304C2). A query 902A ($Q_0$) is ready to be submitted to the database 904 (V) by the process 302B (T).

For ease of discussion, the query 902A is shown as a database form. A form contains data as well as a "hole" that can potentially be filled when the data is computed by the database 904. For example, a query can be likened to a question that has information for the question to be answered. Thus, the information is the data in the form and the answer is the data to fill the hole in the form. As another example, a form can be likened to a linear simultaneous equation that can be algebraically solved if sufficient information is available. After the submission of the query 902A to the database 904, the process continues with the execution of the process 306B (S). Mathematically, the process of submitting the form 902A to the database 904 and continuing at the process 306B can be described as follows: $V[Q_0].S$, where V represents the database 904, $Q_0$ represents the form 902A, and S represents the process 306B.

Suppose that instead of submitting the form 902A to the database 904 and continuing at the process 306B, the process submits a form 902C to the database 904 and afterward continues at the process 308B. Mathematically, this can be described as follows: $V[Q_1].R$, where V represents the database 904, $Q_1$ represents the form 902C, and T represents the process 308B.

In the presence of such a choice between executing the process $V[Q_0].S$ and executing the process $V[Q_1].R$, such a choice can be reduced to a form 906A (Q) being submitted to the database 904, and afterward both processes 306B, 308B will run in parallel. See FIG. 9B. Mathematically, this result is expressed as $V[Q].(S|R)$. The formation of the form 906A is caused by the joining of forms 902A, 904A in a way such that the query 906A is in canonical form (described below). Whereas before only one selection can be made between two alternatives ($V[Q_0].S$ or $V[Q_1].R$), with the formation of the query 906A from two separate and distinct forms 902A, 902C, a single form 906A can be submitted to the database 904 and both processes 306B, 308B become alive and execute in parallel. One way to understand this is to liken the form 902A to a first linear simultaneous equation having three terms and to liken the form 902C to a second linear simultaneous equation having three terms. From the mathematics of linear algebra, one can conclude that there is not yet a solution to the two linear simultaneous equations, but the two linear simultaneous equations can be computed to a form such that when additional data is given (another linear simultaneous equation), all terms can be solved. The form 906A represents a computation of the two forms 902A, 902C for which no further computation can be carried out without more data.

Figure 10C:
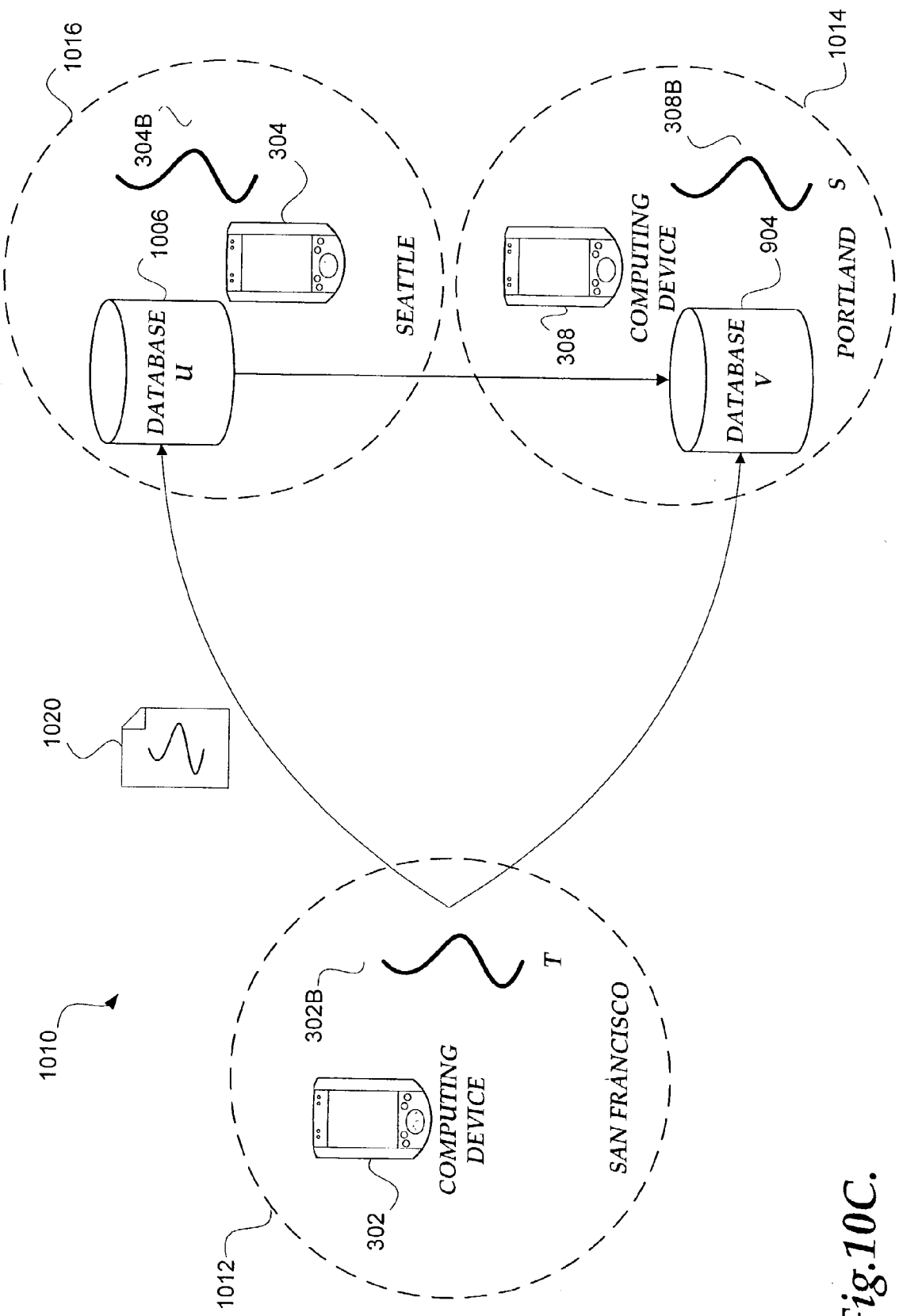

FIGS. 10A–10C pictorially illustrate another operation semantics rule for the evolution of processes, the lift rule (discussed in greater detail with reference to FIG. 11U and section 3.2 of the Appendix). As shown in FIG. 10A, the process 302B separately communicates with databases 1006, 904 to send and receive messages (or queries). The database 1006 is named "U" and the database 904 is named "V". Suppose the process 306B submits to the database 904 a query 1002A containing a binding that expresses a relationship between the name "U" and the name "V". With the submission of the query 1002A, the process 302B will realize that the names "U", "V" refer to the same database. In other words, messages that are deposited by the process 302B at the database 1006 will be forwarded to the database 904, and correspondingly, messages that are deposited at the database 904 by the process 302B will be forwarded to the database 1006. There are certain conditions that must be satisfied (discussed in detail below with reference to FIG. 11U) before the process 302B can interpret from the query 1002A that the names "U", "V" refer to the same database or that there are two separate databases that will forward messages sent by the process 302B to each other.

A system 1010 is shown in 10C showing multiple computing devices dispersed over a number of geographic areas. The process 302B is executed on the computing device 302 in the San Francisco geographic area 1012. The process 304B is executed on the computing device 304 in the Seattle geographic area 1016 and the process 308B is executed on the computing device 308 in the Portland geographic area 1014. The process 302B has obtained the help of the process 304B to perform certain tasks. Unbeknownst to the process 302B, the process 304B cannot accomplish all the tasks specified by the process 302B. Thus the process 304B has contracted the help of the process 308B to perform tasks that are not within the scope of the process 304B. With the issuance of a query, such as the query 1002A, to the database 1006, messages coming from the process 302B, such as a message 1020, to the database 1006 will be automatically forwarded to the database 904 so that the process 308B can perform required tasks. Alternatively, the process 302B can directly communicate with the database 904 to exchange messages. However, the process 302B need not do so and can continue to communicate with the database 1006.

Figure 11A:
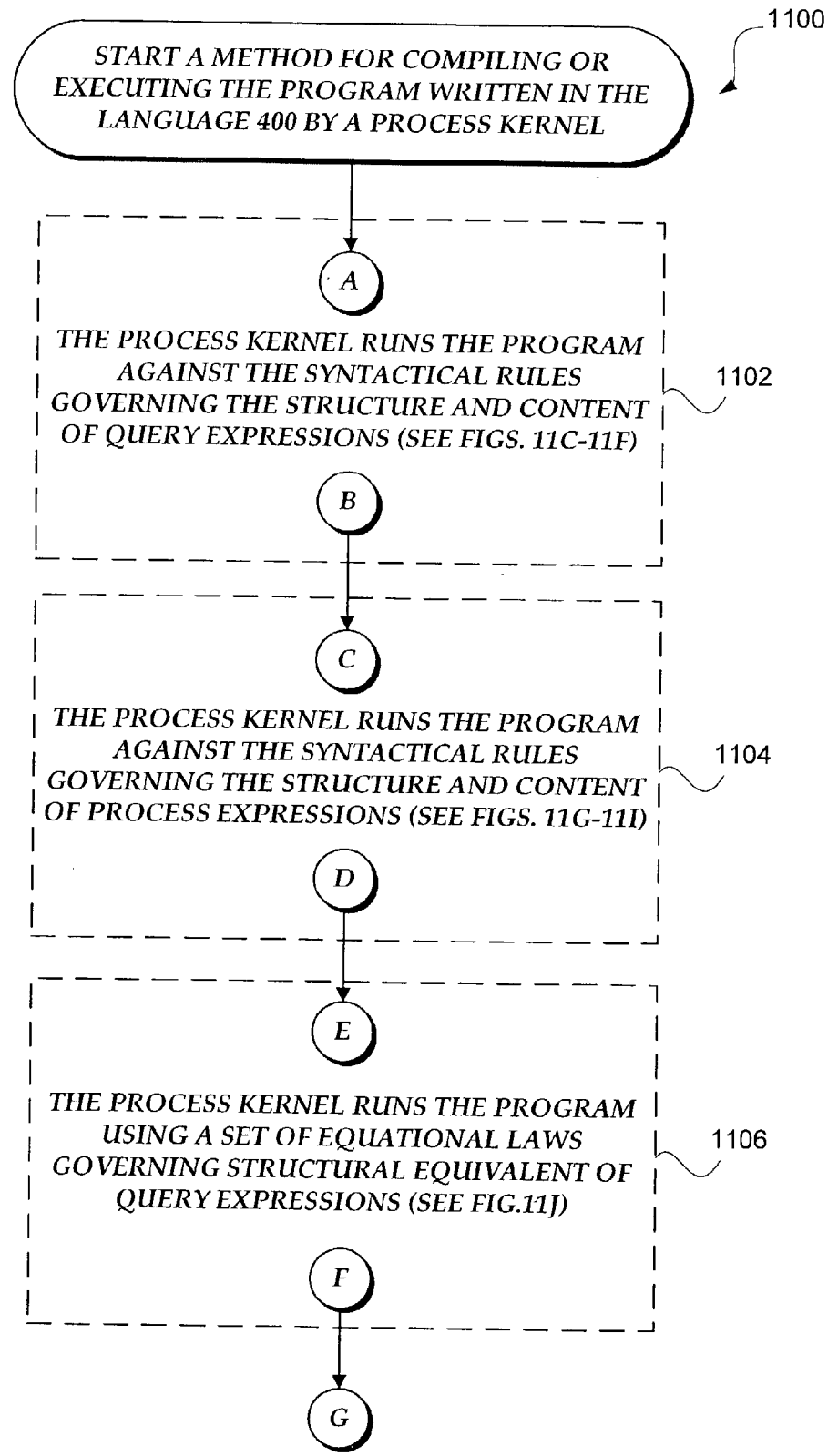
FIGS. 11A–11V are method diagrams illustrating an exemplary method formed in accordance with this invention for compiling a program via a compiler or executing a process via a process kernel.
Figure 11B:
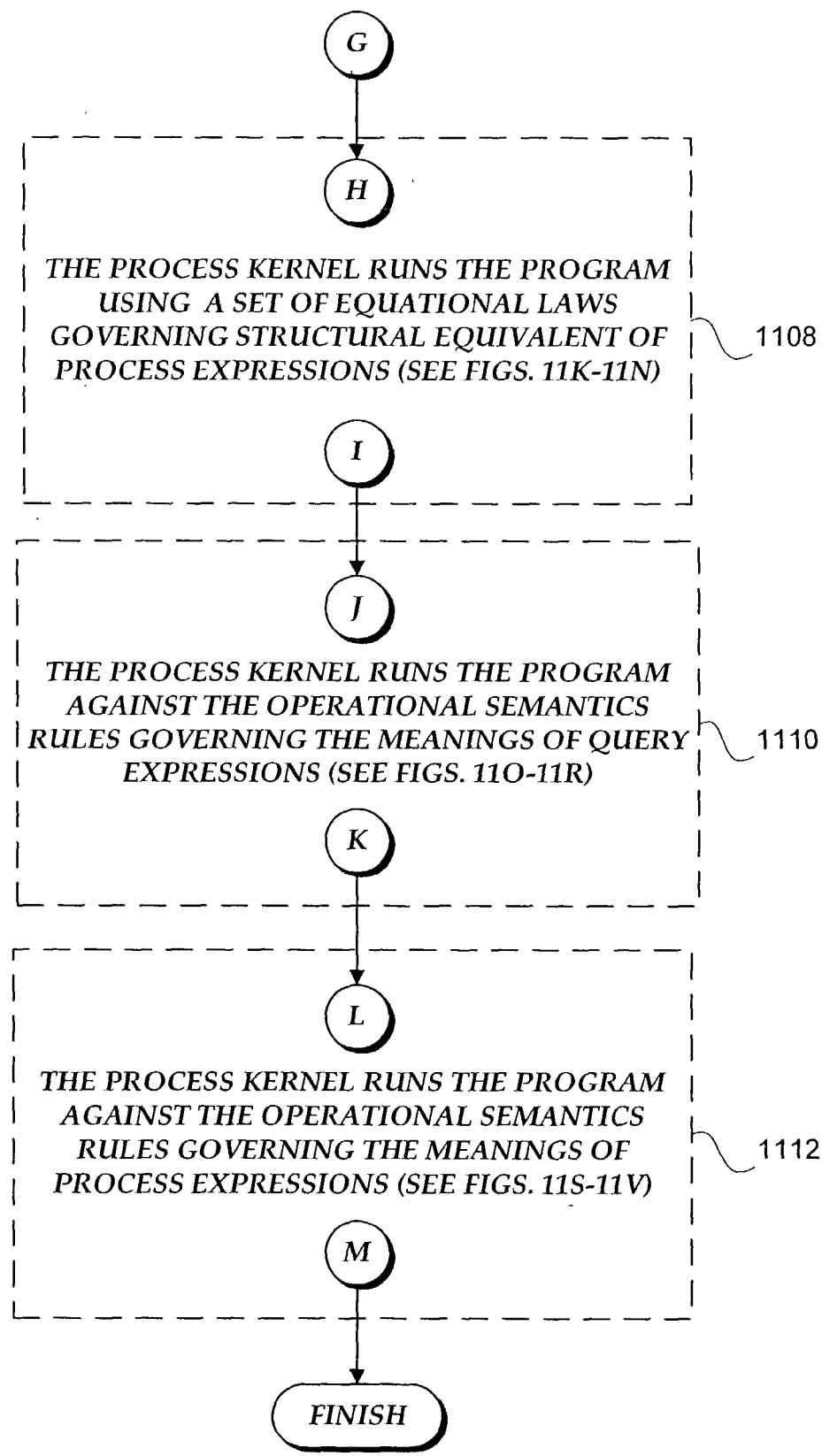
Figure 11C:
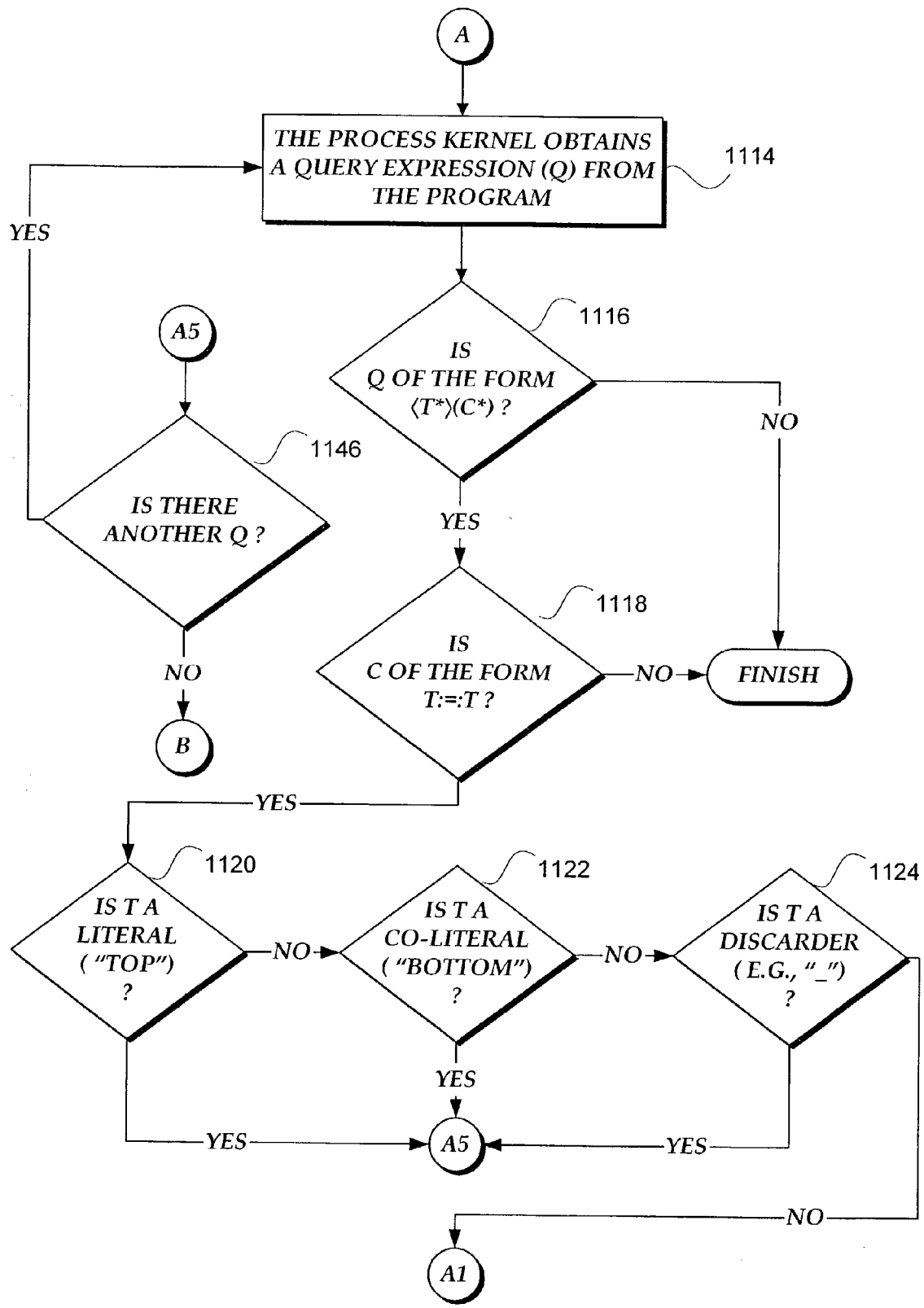
Figure 11D:
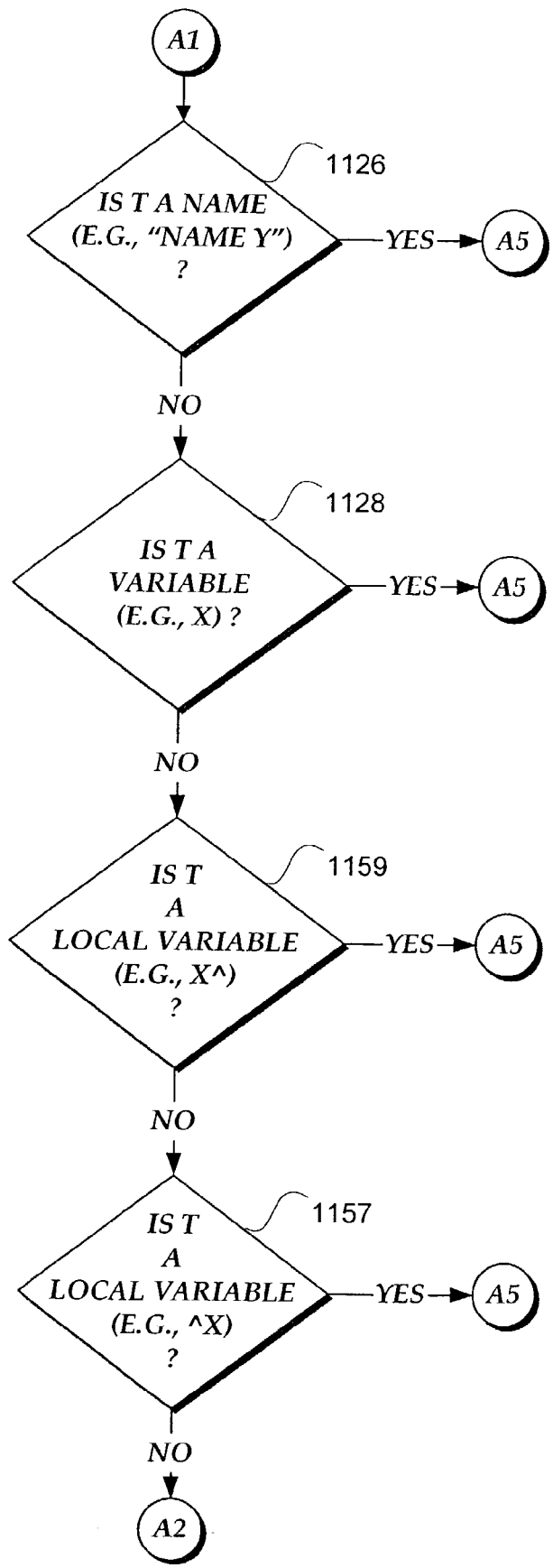
Figure 11E:
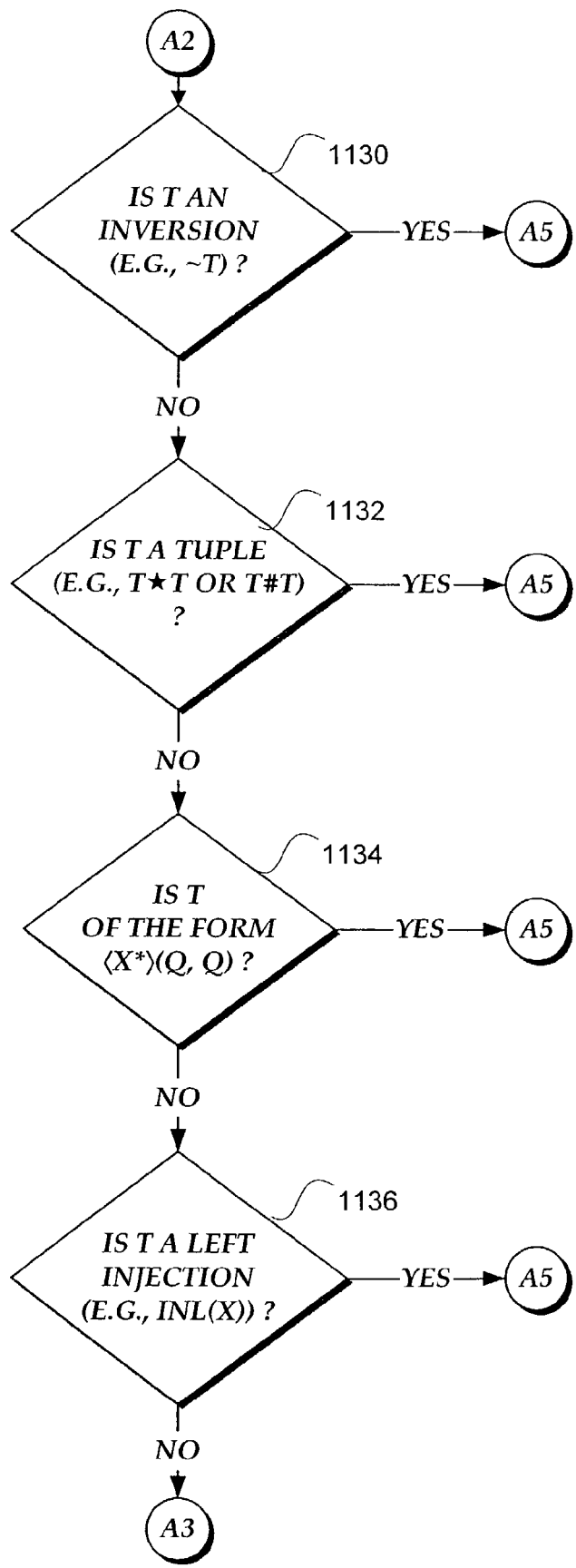
Figure 11F:
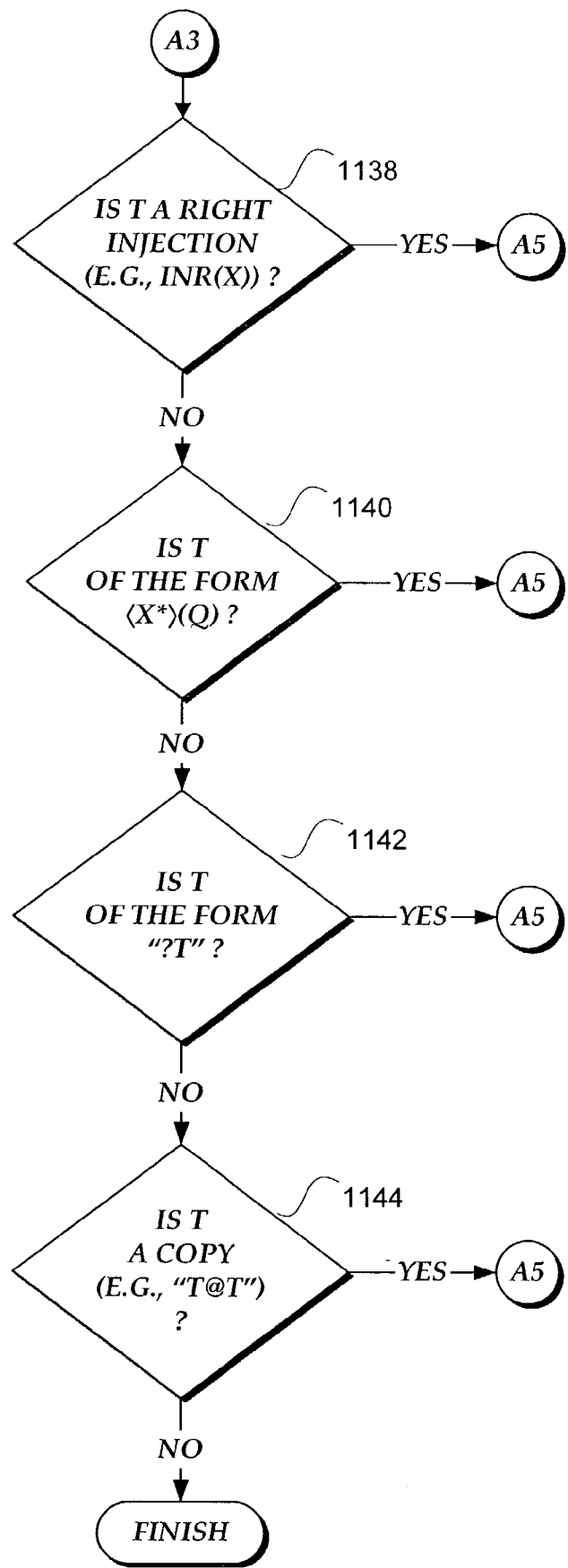
Figure 11G:
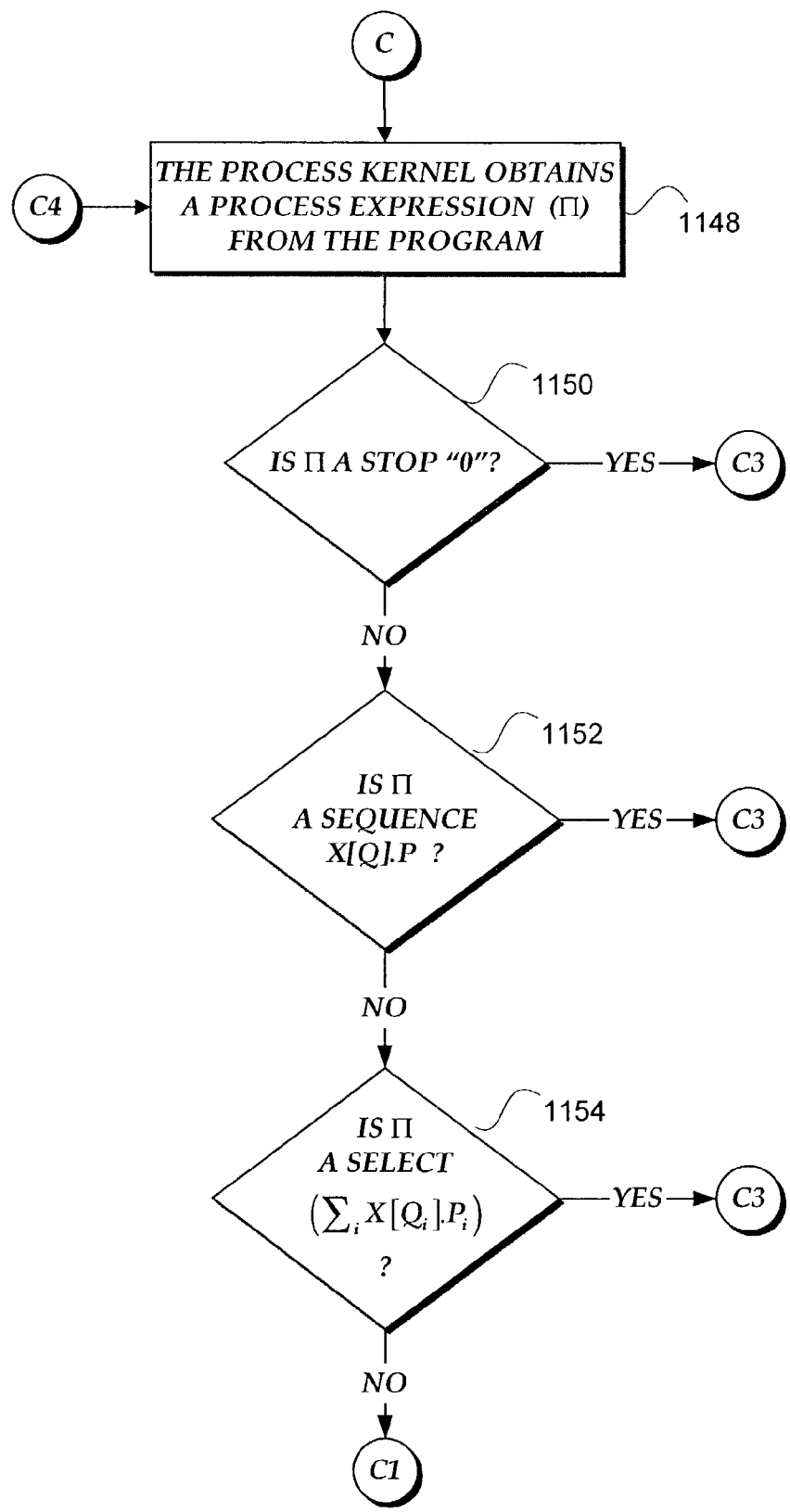
Figure 11H:
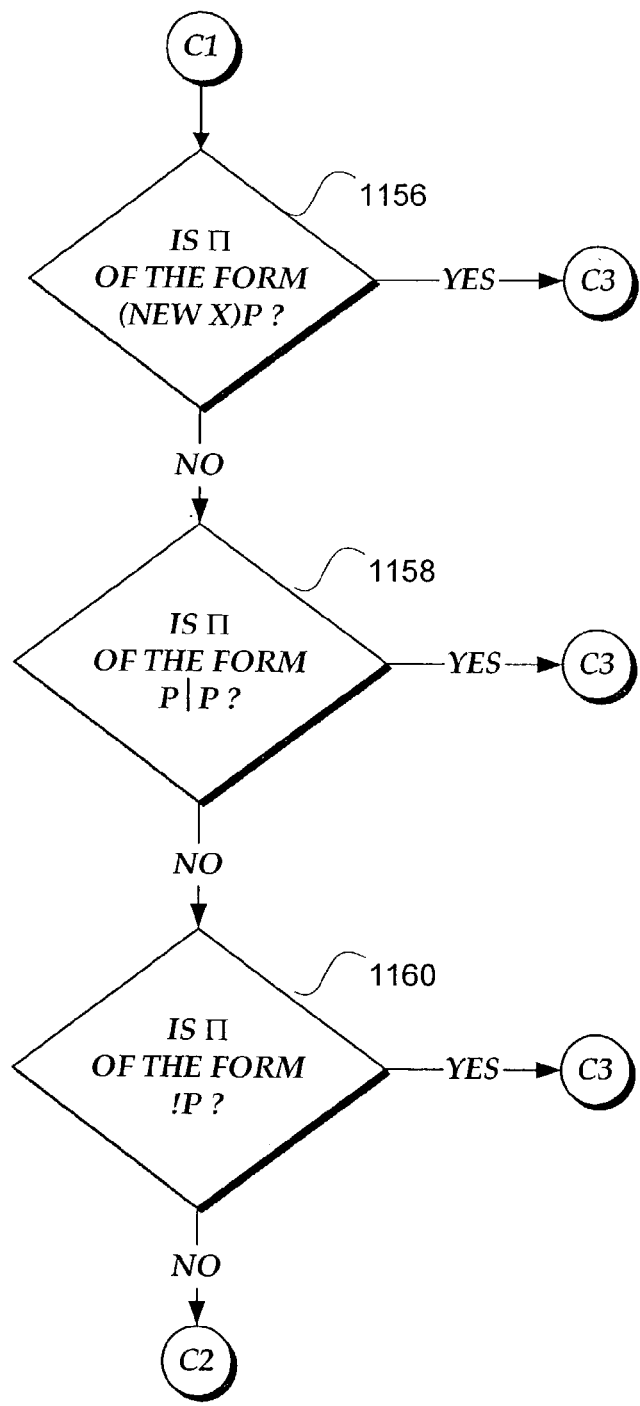
Figure 11I:
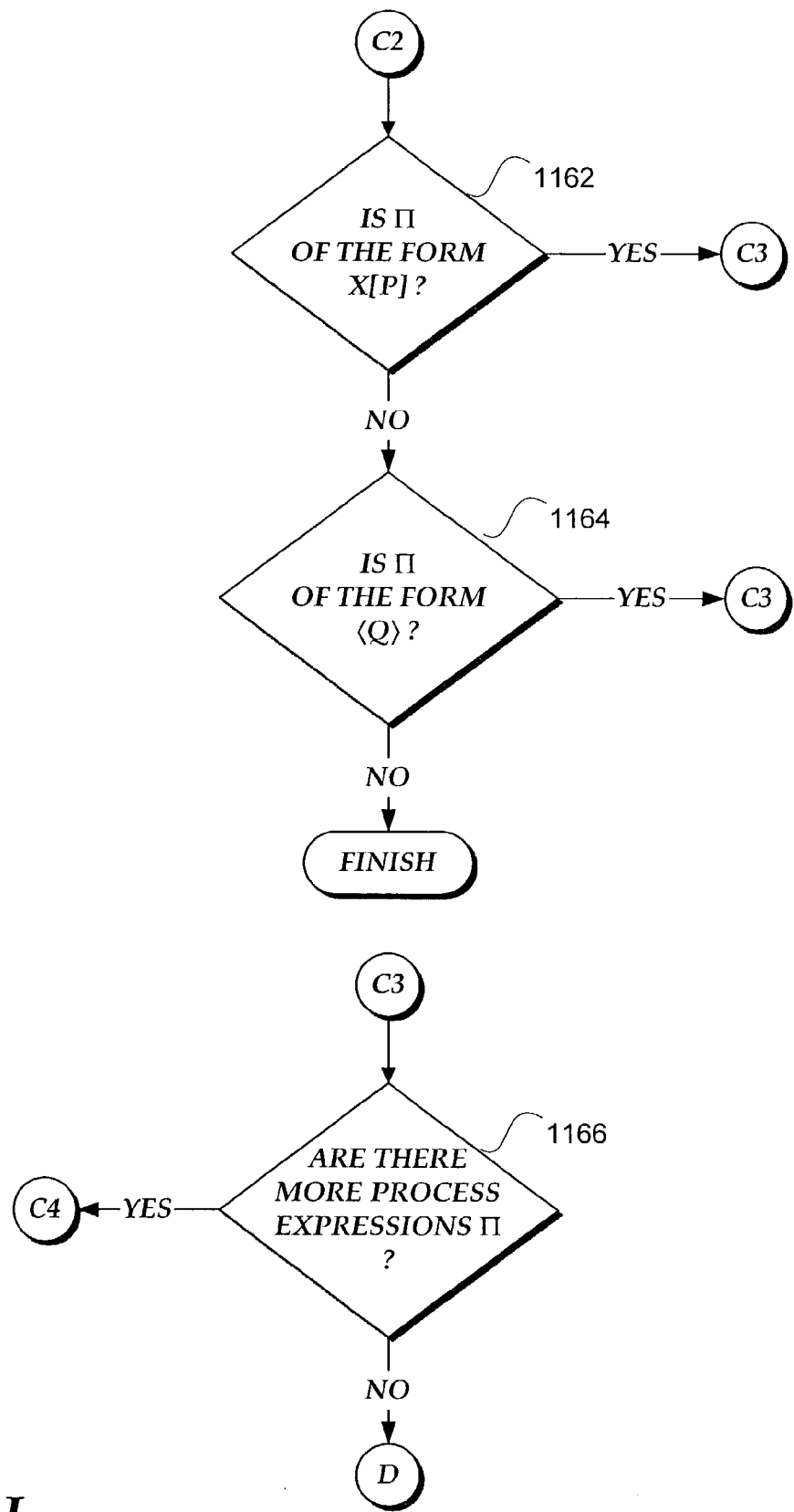
Figure 11J:
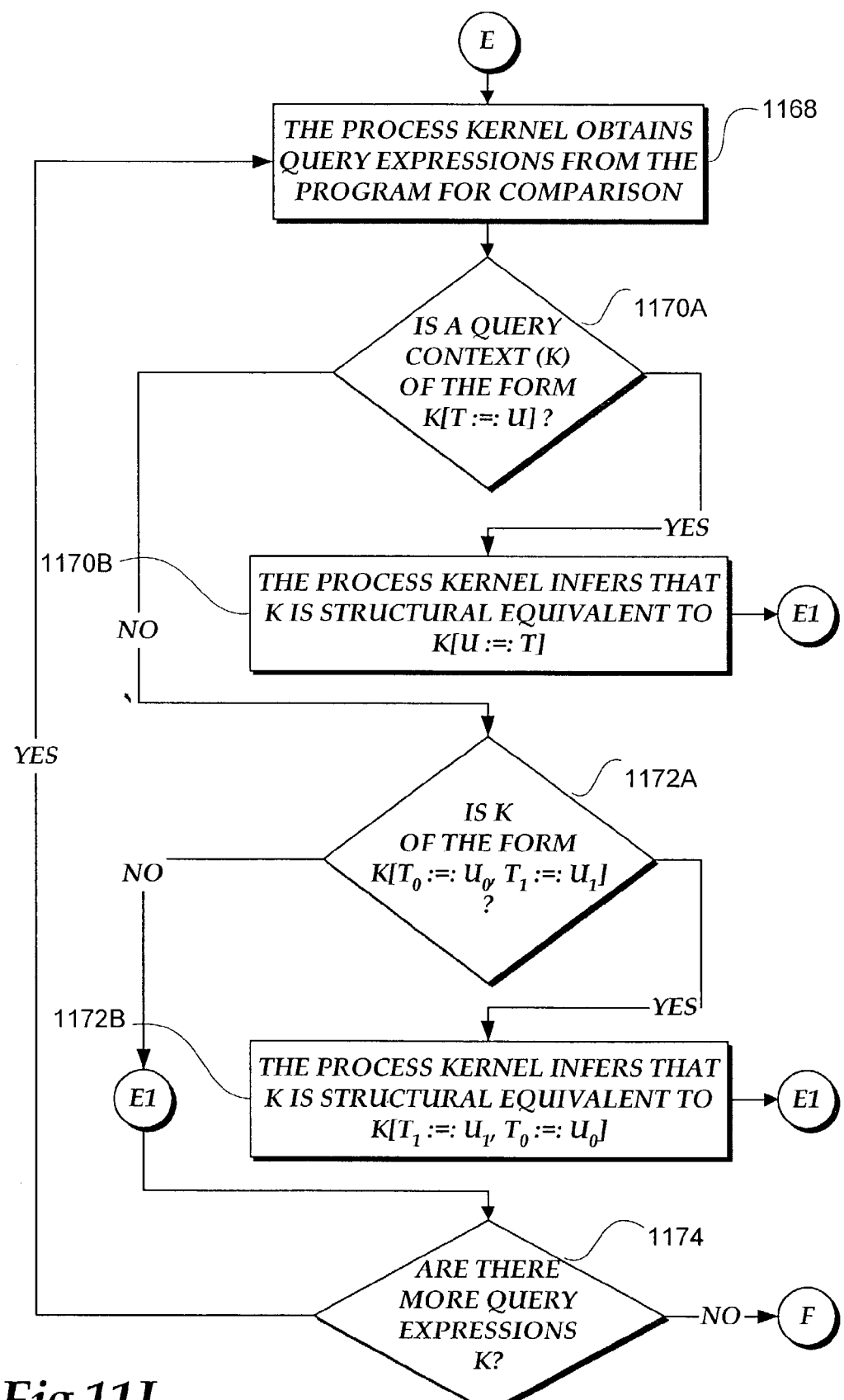
Figure 11K:
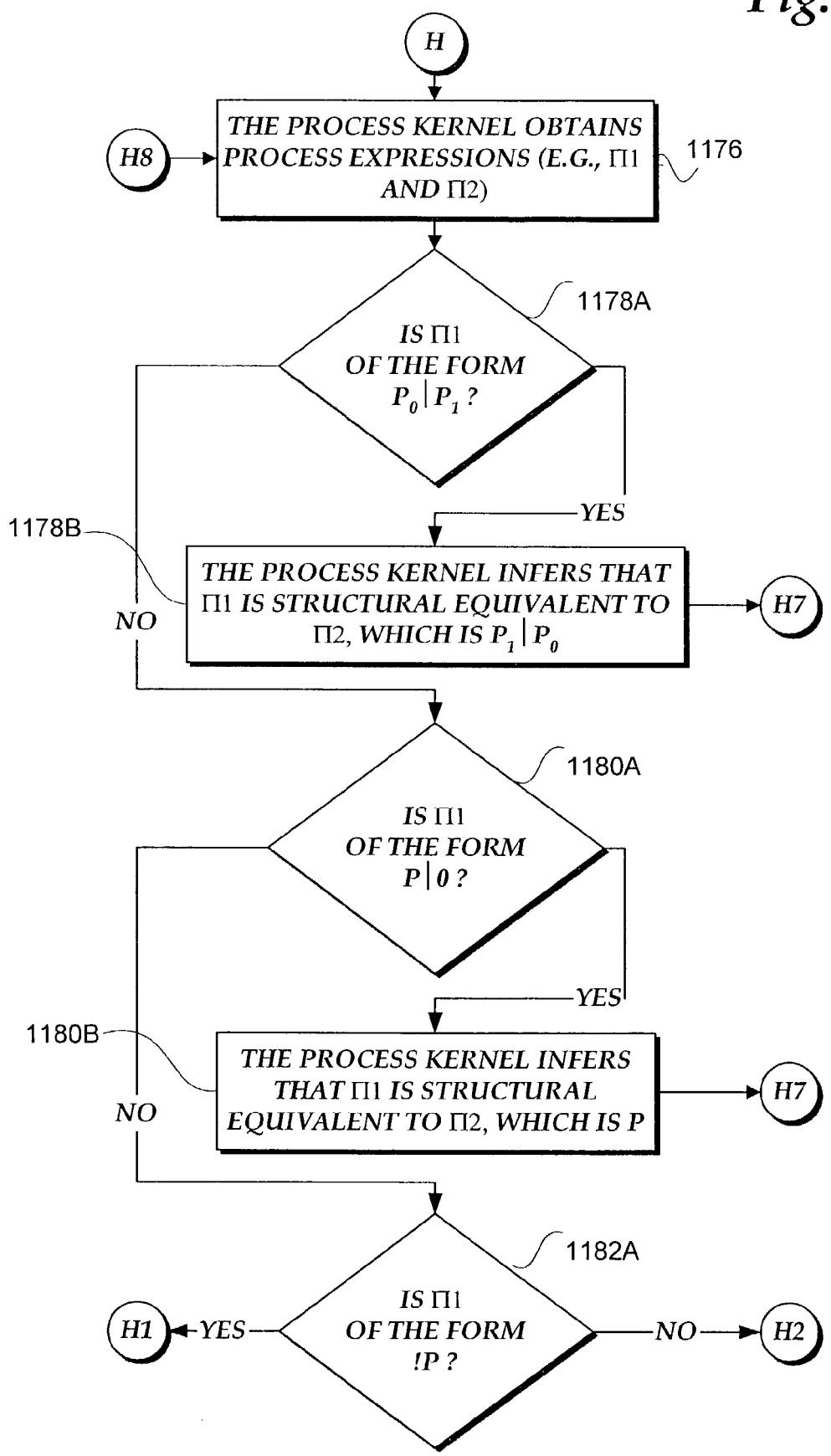
Figure 11L:
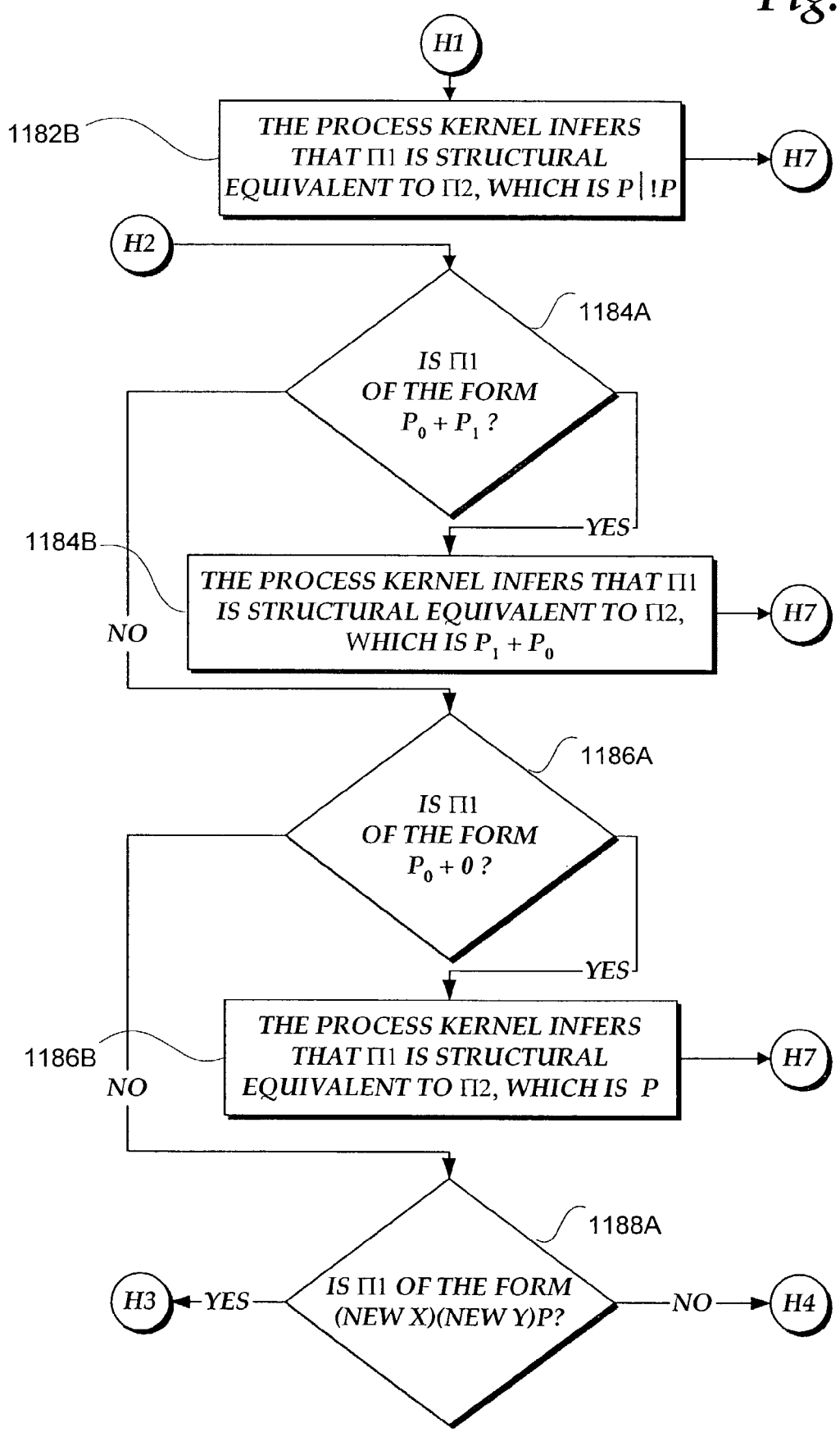
Figure 11M:
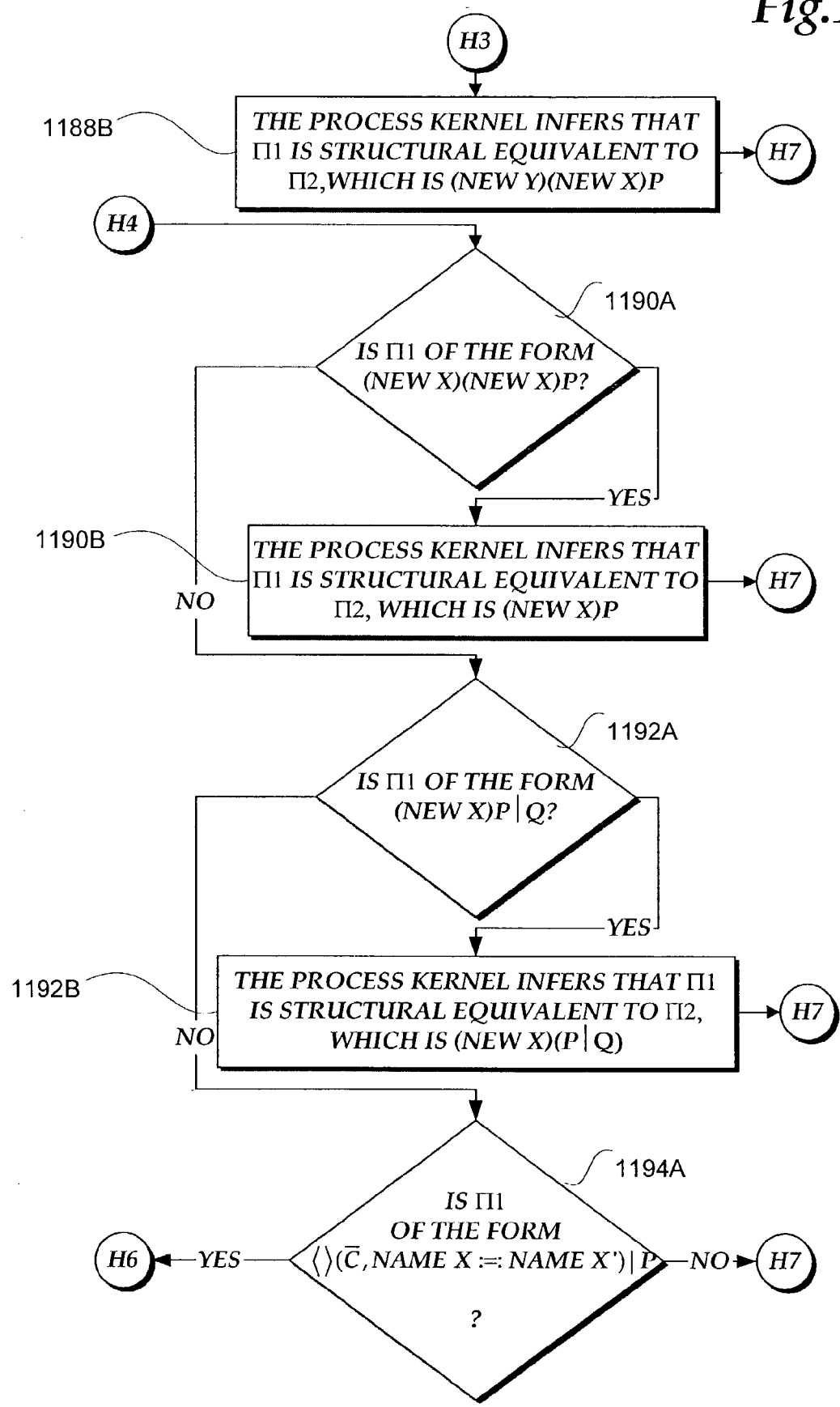
Figure 11N:
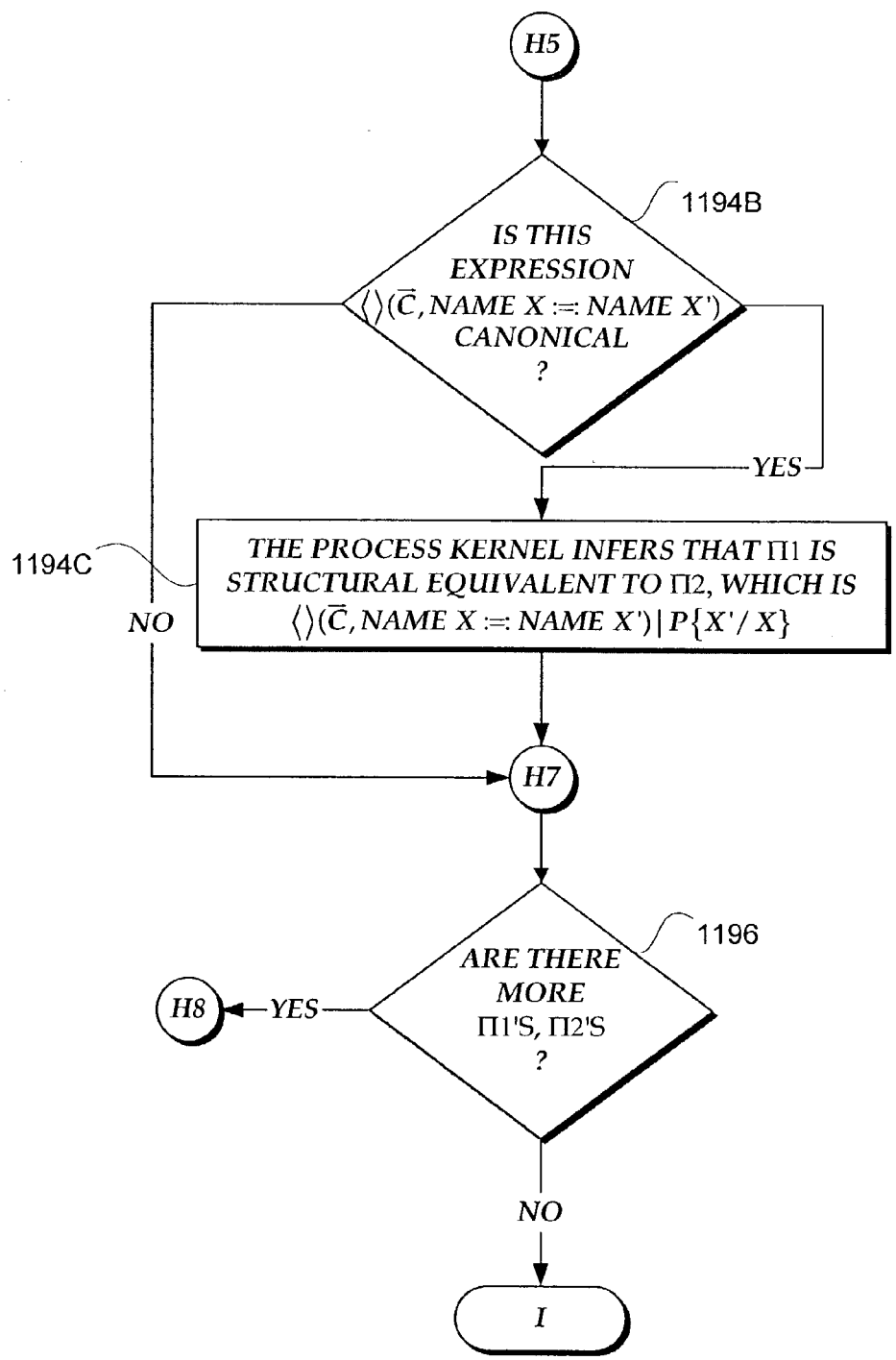
Figure 11O:
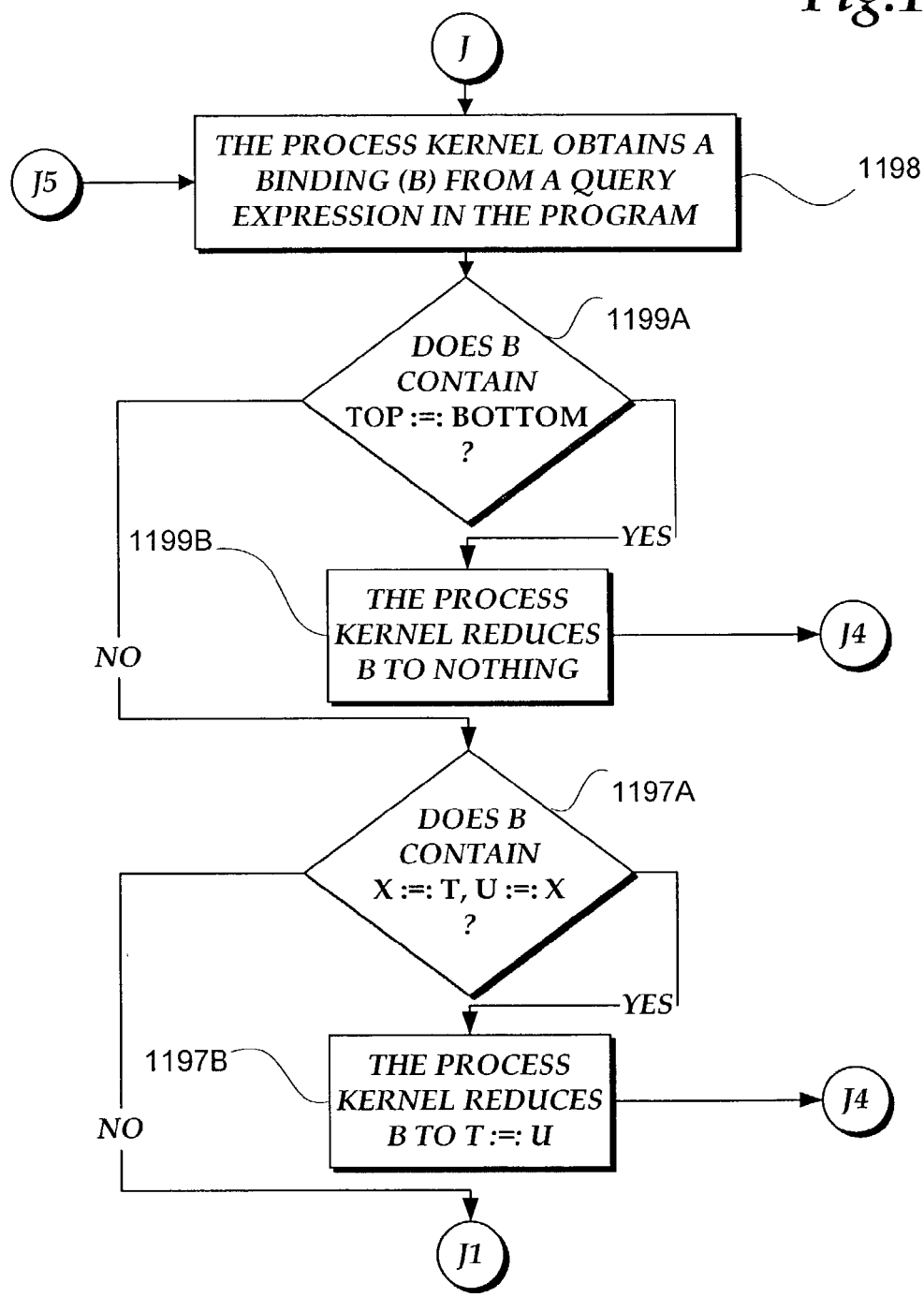
Figure 11P:
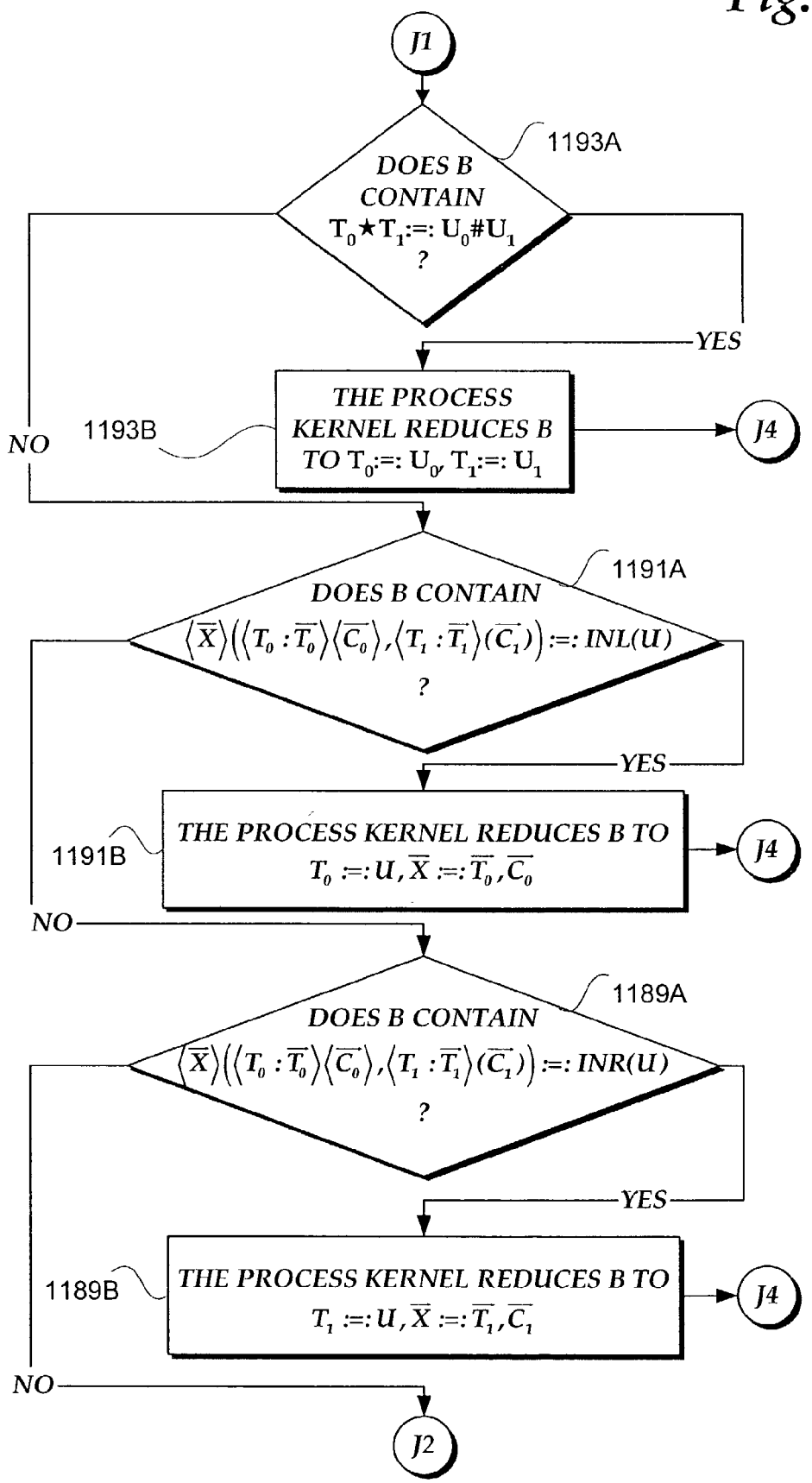
Figure 11Q:
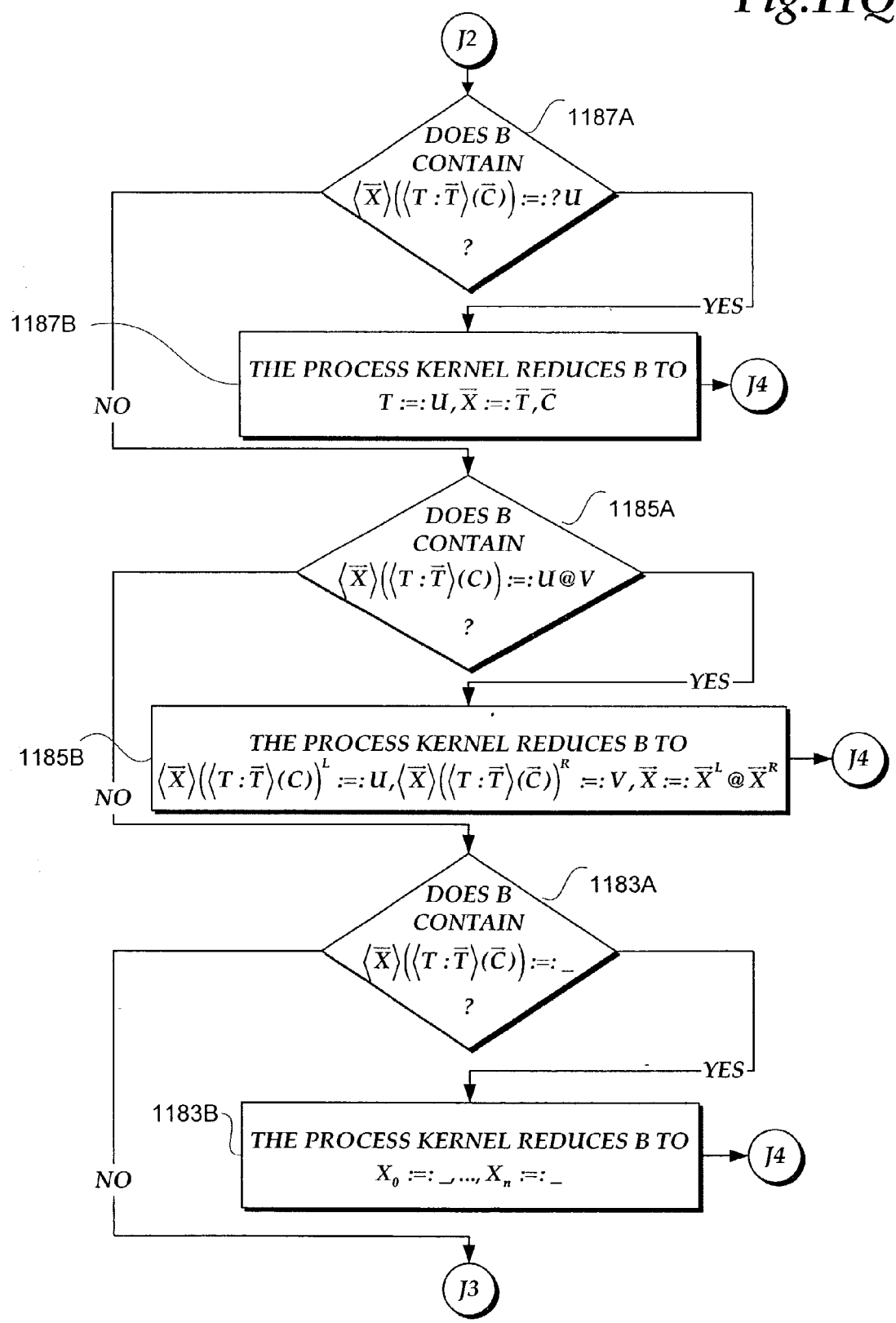
Figure 11R:
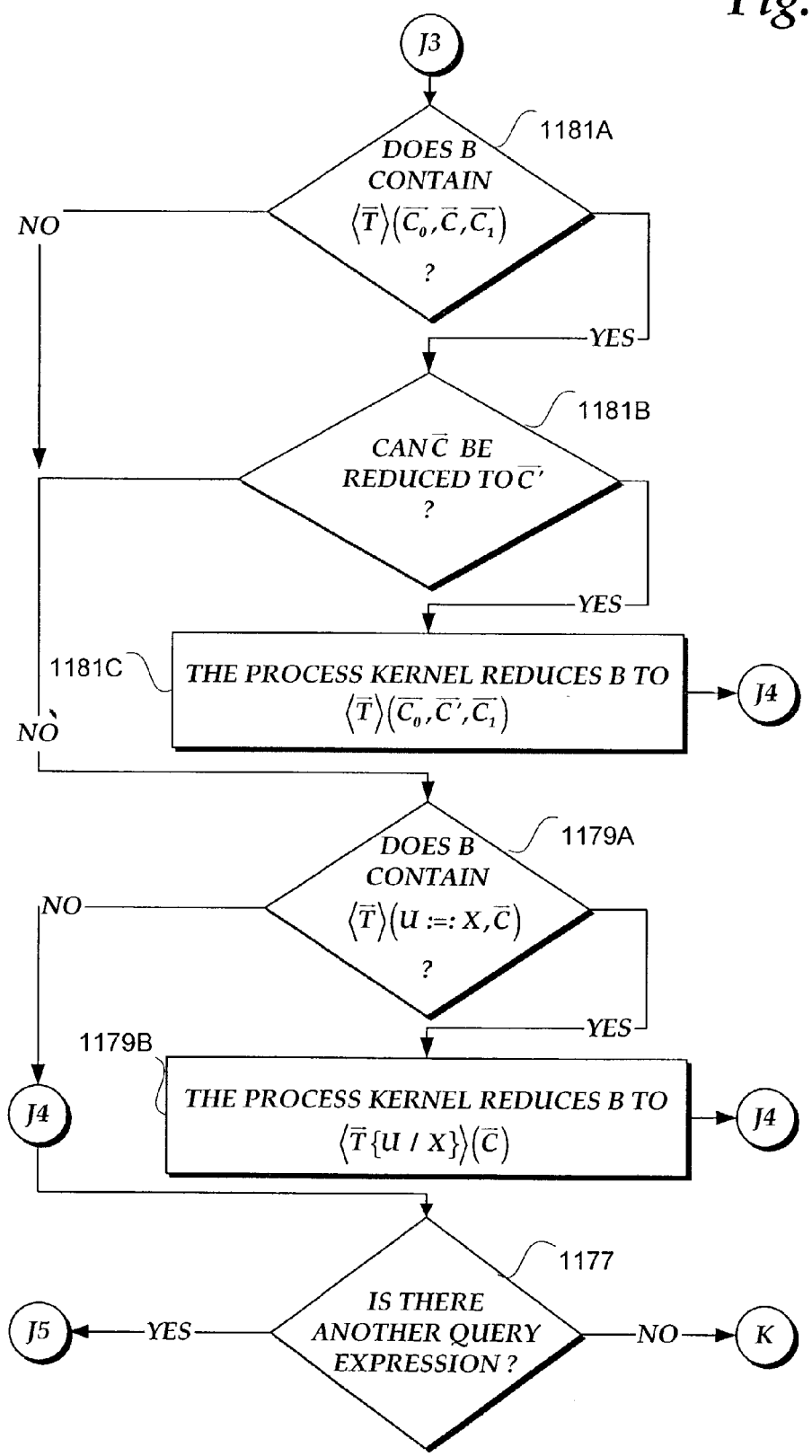
Figure 11S:
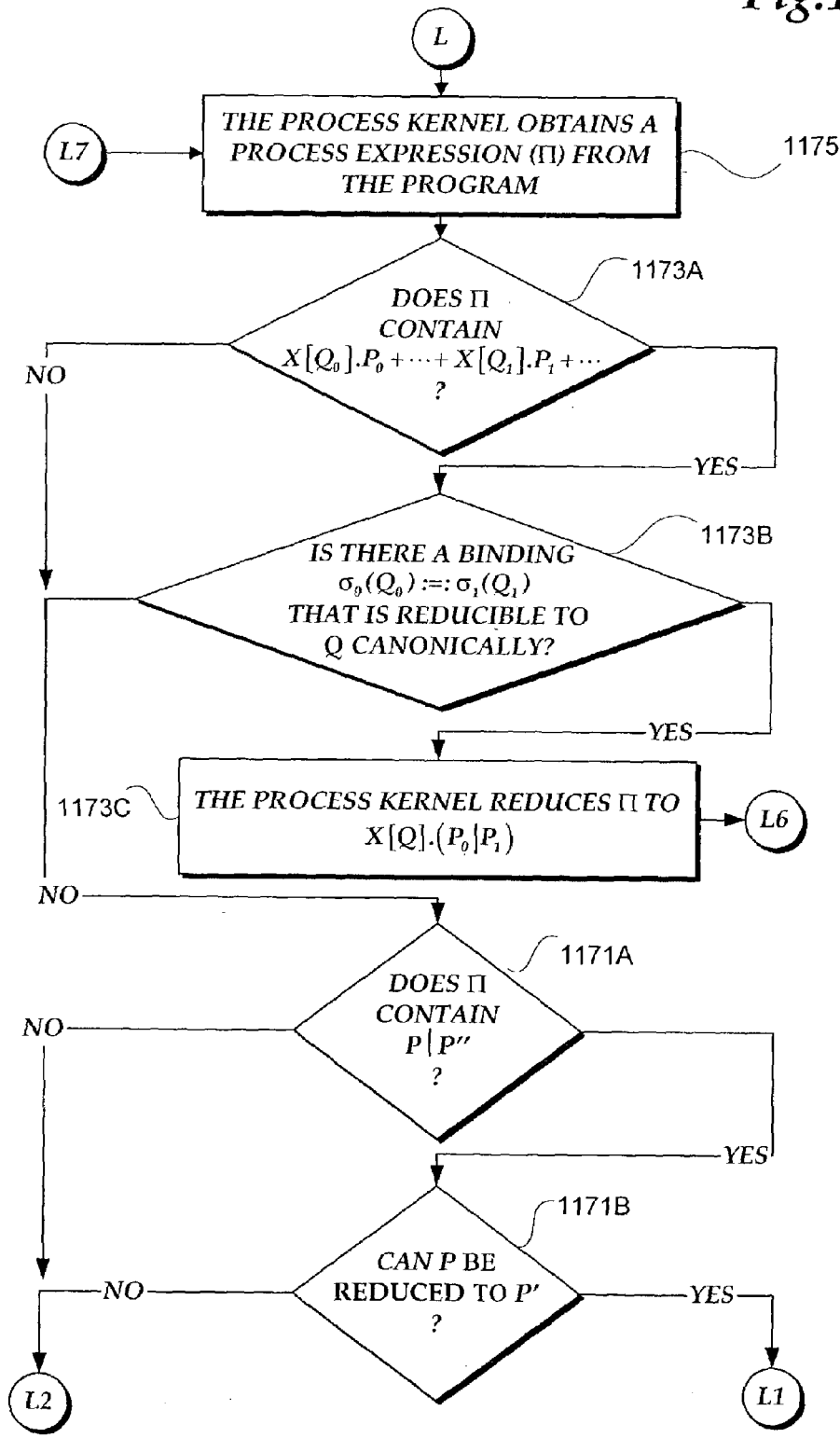
Figure 11T:
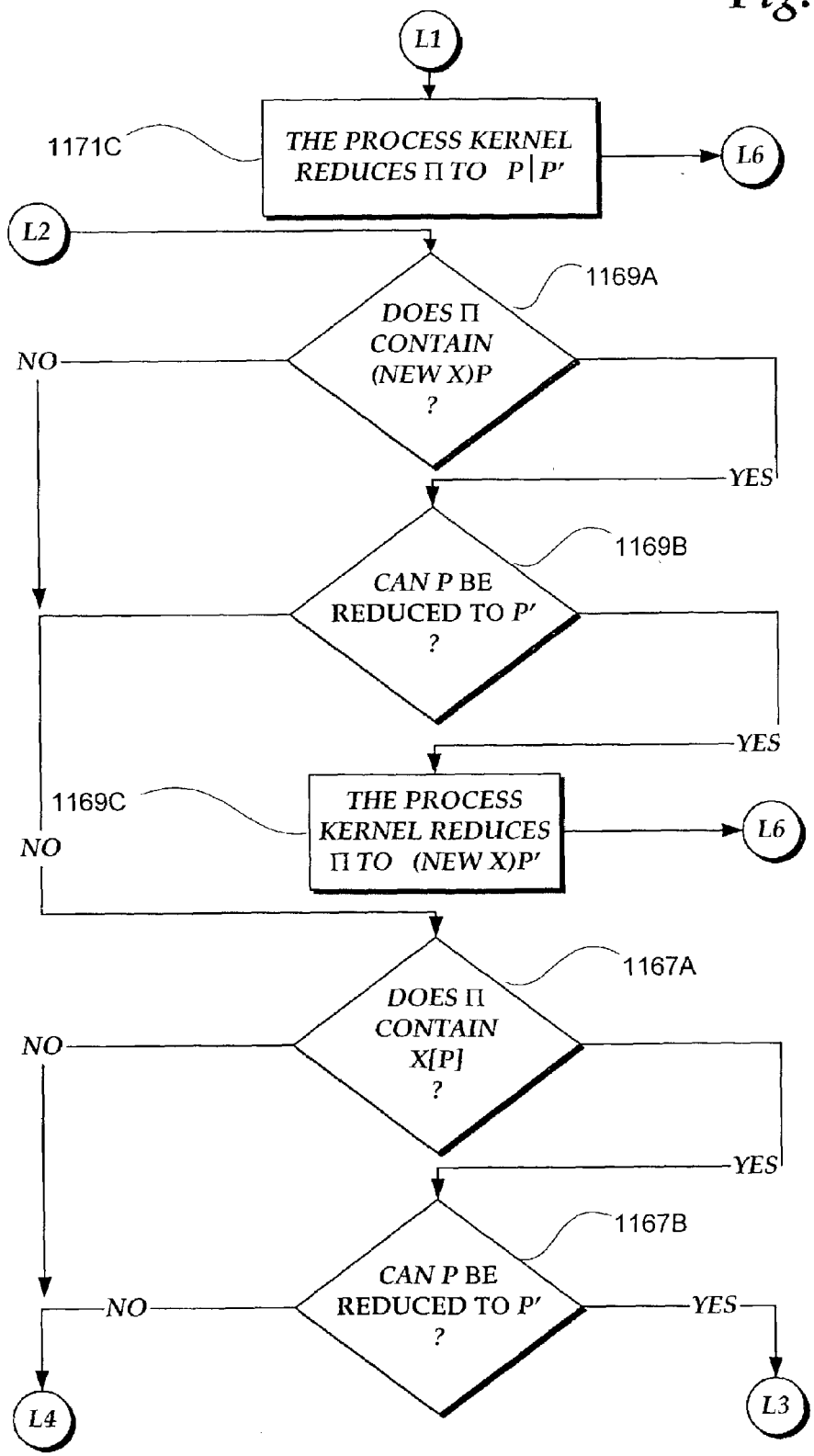
Figure 11U:
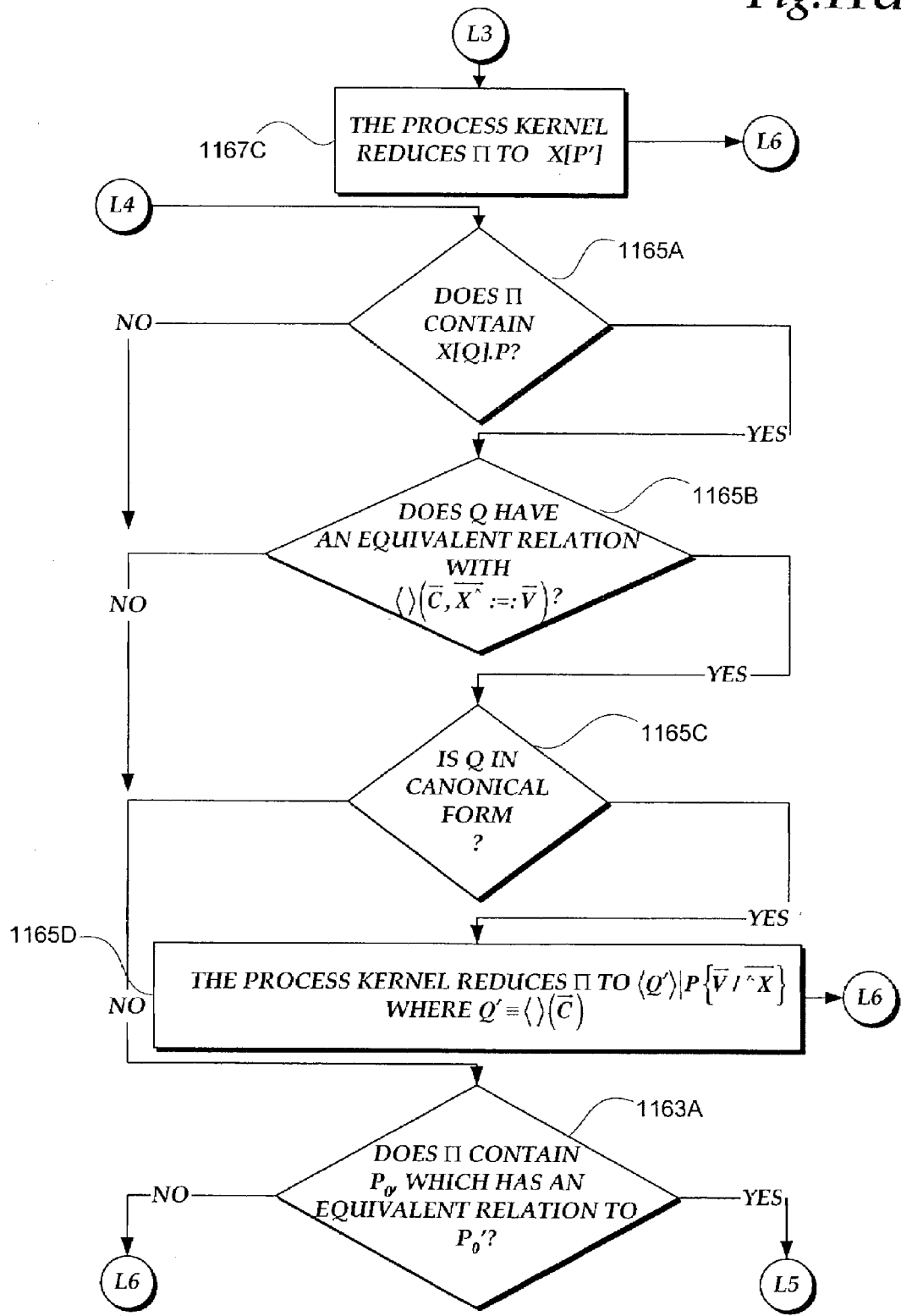
Figure 11V:
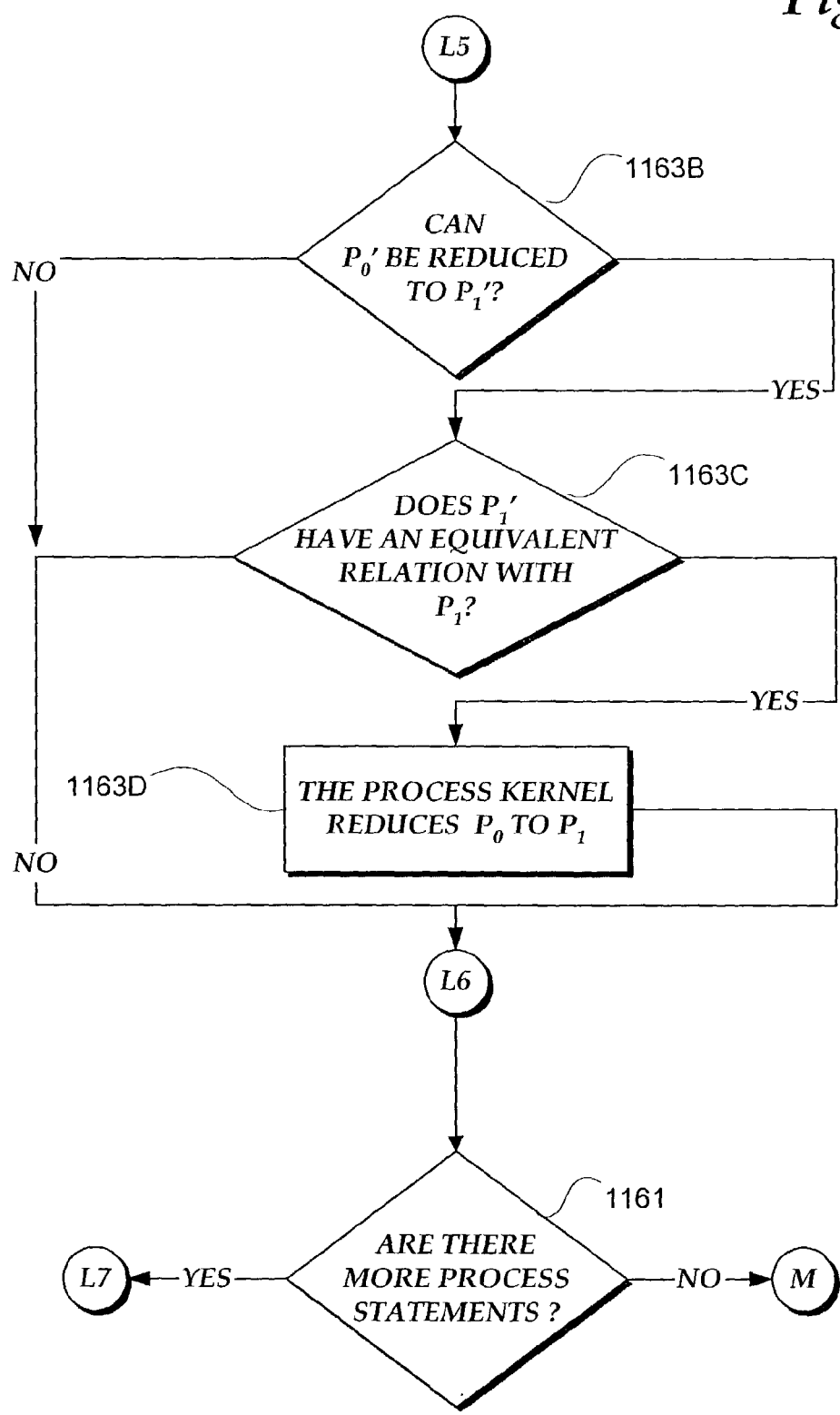

FIGS. 11A–11V illustrate a method 1100 for compiling or executing a program, such as the Web service 302A (hereinafter, "the program 302A"), by a process kernel, such as the process kernel 302C. The program 302A is written in the language 400. In the analysis of the program, the method 1100 will execute sets of syntactical rules governing the structure and content of query expressions and process expressions. Sets of equational laws governing structural equivalence of query expressions and process expressions are also executed by the process kernel 302C. The language 400 also includes sets of operational semantics rules governing the meanings of query expressions and process expressions that are correctly formed in accordance with the sets of syntactical rules of the language 400. These sets of operational semantics rules are executed by the process kernel 302C. For clarity purposes, the following description of the method 1100 makes references to various elements illustrated in connection with the system 300 shown in FIGS. 3A–3C.

From a start block, the method 1100 proceeds to a set of method steps 1102, defined between a continuation terminal ("terminal A") and an exit terminal ("terminal B"). The set of method steps 1102 runs the program against the syntactical rules governing the structure and content of query statements formed from the queue syntax 402. From terminal A (FIG. 11C), the method 1100 proceeds to a block 1114 where the process kernel 302C obtains a query expression (Q) from the program 302A. Next, at decision block 1116, the process kernel 302C decides whether the query Q expression has the syntactical form <T*>(C*).

Each query written in the language 400 has the syntactical form <T*>(C*), where the syntactical element <T*> denotes the head of the query and the syntactical element (C*) denotes the body of the query. Each query written in the language 400 has a head and a body. The head declares the number of parameters and their respective types. The body contains a set of bindings. The query can be likened to a traditional programming procedure in that a query is a named sequence of statements (although unnamed queries can be expressed using the language 400) with associated constants, data types, and variables, that usually performs a single task. For example, the head of the query is similar to the signature of a procedure whereas the body of the query is similar to the sequence of statements contained inside a procedure. Contained inside the head delimiters <> is a symbol T*, which denotes zero or more query terms (defined below). Contained inside the body delimiters ( ) is the symbol C*, which denotes zero or more constraints (described below).

If the answer is NO to the test at decision block 1116, which means that the query Q has not been written in a syntactical form recognized by the language 400, the method 1100 finishes execution and terminates. If the answer is YES, the method 1100 proceeds to another decision block 1118 where the process kernel 302C determines whether each constraint C in the body of the query has the syntactical form T:=:T, where T as described above and further described below is a query term, and the symbol :=: denotes a binding that defines a relation between two query terms. If the answer is NO, which means one constraint of the body of the query has not been written in the form acceptable to the language 400, the method 1100 finishes execution and terminates. Otherwise, the answer at decision block 1118 is YES, and the method proceeds to another decision block 1120.

At decision block 1120, the process kernel 302C determines whether the query term T is a literal (hereinafter, "TOP"). A literal is a value, used in a program that is expressed as itself rather than as a variable or the result of an expression. Examples of literals include the numbers 25 and 32.1, the character a, the string Hello, and the Boolean value TRUE. If the answer at decision block 1120 is YES, the method 1100 proceeds to another continuation terminal ("terminal A5"). From terminal A5 the method 1100 proceeds to decision block 1146 where the process kernel 302C determines whether there is another query expression to analyze. If the answer is NO, the method 1100 proceeds to another continuation terminal ("terminal B"). Otherwise, the answer at decision block 1146 is YES, and the method 1100 loops back to block 1114 to obtain another query expression from the program 302A for analysis.

At decision block 1120, if the answer is NO, the method 1100 proceeds to another decision block 1122 where the process kernel 302C determines whether the query term T is a complimentary literal (hereinafter "bottom"). Complimentary literals are inversions of literals. If the answer at decision block 1122 is YES, the method 1100 proceeds to terminal A5 (described above). If instead, the answer at decision block 1122 is NO, the method 1100 proceeds to another decision block 1124. Here, the process kernel 302C determines whether the query term T is a discarder (delimited by the symbol "_"). A discarder is a query that takes in only input parameters and provides no output parameters. If the answer at decision block 124 is YES, the method 1100 proceeds to the terminal A5 described above. At decision block 1124, if the answer is NO, the method 1100 proceeds to another continuation terminal ("terminal A1").

From terminal A1 (FIG. 11D) If the answer is NO, the method 1100 proceeds to decision block 1126 where the process kernel 302C verifies whether the query term T is a name (or a literal string, such as "hello"). Preferably, an alphabetic letter is treated syntactically by the language 400 as a variable, which is a named storage location capable of containing data that can be modified during program execution. If an alphabetic letter is preceded by a "name" in the language 400, the alphabetic letter is treated by the language 400 as a literal string instead of a variable. If the answer at decision block 1126 is YES, the method 1100 proceeds to the terminal A5 (described above). At decision block 1126, if the answer is NO, the method 1100 proceeds to another decision block 1128 where the process kernel 302C determines whether the query term T is a variable (such as X). If the answer is YES, the method 1100 proceeds to the terminal A5 (described above).

At decision block 1128, if the answer is NO, the method proceeds to decision block 1159 where the process kernel 302C determines whether the query term T is a local variable with the form "X^". The form X^ contains the term X, which denotes a variable in a program written in the language 400; the caret, which is a small, up-pointing symbol (^) typically found over the 6 key on the top row of a microcomputer keyboard, denotes that the variable X is a local variable (in the idiom of computer science, a local variable means a variable whose scope is limited to a given block of code, usually a subroutine, but in the present invention, the scope of a local variable is limited to a process); and the term X^ denotes the creation, in a process, of a local variable X, which is capable of exporting information to be consumed in a continuation process. If the answer is YES at decision block 1159, the method 1100 proceeds to the terminal A5 (described above).

At decision block 1159, if the answer is NO, the method proceeds to decision block 1157 where the process kernel 302C determines whether the query term T is a local variable with the form "^X". The form ^X contains the term X, which denotes a variable; the term ^ is a caret; and the term ^X denotes, in a process, a local variable X, which is capable of importing information (to be consumed) from the computing environment in which the process evolves. If the answer is YES at decision block 1157, the method 1100 proceeds to the terminal A5 (described above). Otherwise, the decision is NO, and the method 1100 proceeds to another continuation terminal ("terminal A2").

From the terminal A2, the method flow proceeds to decision block 1130 where the process kernel 302C checks the query term T to see whether it is an inversion (delimited by the ~ symbol). If the decision is YES, method flow proceeds to the terminal A5 (described above). Otherwise, the decision is NO, and the method 1100 enters decision block 1132. At decision block 1132, the process kernel 302C determines whether the query term T is a tuple, which is a set of ordered elements. There are two symbols in the language 400 for signifying tuples: the syntactical symbol "★" and the syntactical symbol "#". If the answer at decision block 1132 is YES, method flow proceeds to the terminal A5 (described above). Otherwise, if the decision is NO, the method 1100 proceeds to decision block 1134. Here, the process kernel 302C checks to see whether the query terminal T is of the form <X*>(Q,Q), where X* denotes one or more variables and Q denotes a query. Thus the process expression <X*>(Q,Q) denotes zero or more variables in the head of the query and two other queries in the body of the query which are separated by a comma. If the decision is YES at decision block 1134, the method flow proceeds to terminal A5 (described above). If the decision is NO, the method 1100 proceeds to decision block 1136. Here, the process kernel 302C checks whether the query term T is a left injection (INR(X)). Traditionally, the left injection operator "inl( )" is used to indicate the source of an element in a union of two sets. For example, suppose a set A is summed with a set B (which is denoted as A+B). Each element of the set A+B is, in effect, tagged with the label inl to indicate that the element originated in set A (visually because the alphabetic letter A is to the left of the set A+B). In the present invention, the constructor inl is preferably used to indicate operation (described below) on the left-sided Q of the body of the query expression <X*>(Q,Q). If the answer is YES to decision block 1136, the method flow proceeds to the terminal A5 (described above). Otherwise, the method 1100 enters another continuation terminal ("terminal A3").

From terminal A3, the method 1100 proceeds to decision block 1138 where the process kernel 302C determines whether the query term T is a right injection (INR(X)). As briefly described above, in the presence of a query of the form <X*>($Q_L Q_R$), the left injection constructor (INL(X)) allows the variable X to be bound to the constraint $Q_L$ and the right injection constructor (INR(X)) allows the variable X to be bound to the constraint $Q_R$. If the answer at decision block 1138 is YES, the method 1100 proceeds to the terminal A5 (described above). Otherwise, the method flow proceeds to decision block 1140 where the process kernel 302C determines whether the query term T is of the form <X*>(Q). The method 1100 proceeds to the terminal A5 if the answer at decision block 1140 is YES. Otherwise, another decision block 1142 is entered by the method flow. Here, the process kernel 302C determines whether the query term T is of the form ?T. See decision block 1142. The operator "?" can be considered as a read operator that binds the term T to the first term in the head of the query Q who is contained in the body of a query <X*>(Q). If the answer is YES at decision block 1142, the method flow proceeds to the terminal A5 (described above). If the answer is NO, the method determines whether the query term T is a copy operation (e.g., "T@T"). If the answer at decision block 1144 is YES, terminal A5 is entered by the method 1100 (described above). If instead the answer is NO, which means that the query Q has not been written in a syntactical form that is recognizable by the language 400, the method 1100 finishes execution and terminates.

From terminal B (FIG. 11A) the method 1100 proceeds to a set of processing steps 1104 defined between a continuation terminal ("terminal C") and an exit terminal ("terminal D"). This set of processing steps 1104 runs the program 302A against the syntactical rules governing the structure and content of process statements. From terminal C (FIG. 11G) the process kernel 302C obtains a process expression (Π) from the program 302A. See block 1148. Next, at decision block 1150, the process kernel 302C determines whether the process expression Π is a "0" which denotes a process stop or inactivity of a process. If the answer YES, the method flow proceeds to another continuation terminal ("terminal C3"). Otherwise, the method flow proceeds to another decision block 1152. The process kernel 302C decides whether the process expression Π has a form X[Q].P, where X is a variable representing a channel, a queue, a database, or other structured stores; Q denotes a query having a syntax described above and illustrated in FIGS. 11C–11F; X[Q] denotes that the query Q is submitted or deposited at X; the period "." denotes a sequence from a process X[Q] to another process P or denotes a sequence from a portion of a process X[Q] to another portion P of the same process. If the answer at decision block 1152 is YES, the method 1100 proceeds to the terminal C3. Otherwise, if the answer is NO, the method 1100 proceeds to decision block 1154. The process kernel 302C determines whether the process expression Π is a summation of a number of $X[Q_i].P_i$, such as $X[Q_0].P_0+X[Q_1].P_1$. The summation indicates that a process represented by the process expression Π can execute one of many alternatives. For example, with the summation of $X[Q_0].P_0+X[Q_1].P_1$, the process represented by Π can execute either $X[Q_0].P_0$ or $X[Q_1].P_1$. If the answer at decision block 1154 is YES, the method 1100 proceeds to the terminal C3. Otherwise, if the answer is NO, the method flow proceeds to another continuation terminal ("terminal C1").

From terminal C1 (FIG. 11H), the method 1100 proceeds to decision block 1156 where the process kernel 302C determines whether the process expression Π is of the form (NEW X)P where NEW denotes an operator in the language 400 for creating a new name which is bound to some process; (NEW X) denotes the creation of a new name X in some process; and (NEW X)P denotes that a new variable X is created and is bound to a process P. If the decision at decision block 1156 is YES, the method 1100 continues at terminal C3. If the answer is NO, decision block 1158 is entered by the method 1100. Here, the process kernel 302C determines whether the process expression Π is of the form P|P, which denotes that a process is executed in parallel with another process. If the answer is YES at decision block 1158, the method flow proceeds to the terminal C3. Otherwise, the method 1100 proceeds to decision block 1160. The process kernel 302C determines at decision block 1160 whether the process expression Π is of the form !P, where the exclamation mark "!" denotes a replication operator and !P denotes an infinite composition P|P| . . . . The replication operator ! allows a developer to express infinite behaviors of processes using the language 400. If the decision is YES at decision block 1160, the method 1100 proceeds to the terminal C3. Otherwise, the method 1100 enters another continuation terminal ("terminal C2").

From terminal C2 (FIG. 11I), the method 1100 proceeds to decision block 1162 where the process kernel 302C determines whether the process expression Π is of the form X[P]. The syntactical form X[P] indicates that a developer using the language 400 can deposit or submit a process P at X, which as described before includes channels, queues, and databases, among other structured stores. If the answer at decision block 1162 is YES, the method 1100 proceeds to the terminal C3. Otherwise, the answer is NO, and the method flow proceeds to decision block 1164. The process kernel 302C determines whether the process expression Π is of the form <Q>, which is a lifted query (described in further detail below). If the decision is YES at decision block 1164, the terminal C3 is entered by the method 1100. Otherwise, the answer is NO and the method 1100 finishes execution and terminates. The reason for the termination of the method 1100 at this point is because the process expression Π was formed in a way incompatible with the grammar of the language 400.

From terminal C3 (FIG. 11I), the method 1100 proceeds to decision block 1166 where the process kernel 302C determines whether the program 302A contains other process expressions to be checked. If the answer is NO, the method flow proceeds to another continuation terminal ("terminal D"). Otherwise, the answer is YES, and the method 1100 proceeds to another continuation terminal ("terminal C4"), which loops back to block 1148 wherein the above-described method steps are repeated.

From terminal D (FIG. 11A) the method 1100 proceeds to a group of processing steps 1106 where the method runs the program using a set of equational laws governing the structural equivalence of query expressions (see FIG. 11J). Processing steps 1106 are defined between a continuation terminal ("terminal E") and an exit terminal ("terminal F").

From terminal E (FIG. 11J) the method 1100 proceeds to block 1168 where the process kernel 302C obtains two or more query expressions for structural equivalence comparison purposes. Next, the method determines whether a query context (K) is of the form K[T:=:U]. The query context K denotes multiple queries that have holes that can be adapted to be filled by one or more constraints. If the answer at decision block 1178 is YES, the query context K is structurally equivalent to another query context K[U:=:T]. See block 1170B. Then, the method flow proceeds to another continuation terminal ("terminal E1"). Otherwise, if the decision at decision block 1170A is NO, another decision block 1172A is entered by the method 1100. Here, the process kernel 302C determines whether the query context K has the form K[$T_0$:=:$U_0$, $T_1$:=:$U_1$]. If the answer is YES to decision block 1172A, the query context K is structurally equivalent to another query context K[$T_1$:=:$U_1$, $T_0$:=:$U_0$]. See block 1172B. Next, the method flow proceeds to the terminal E1. If instead, the answer is NO at decision block 1172A, the method 1100 proceeds to the terminal E1, which proceeds to another decision block 1174. The process kernel 302C determines whether there are more query expressions in the program to analyze for structural equivalents. See block 1174. If the answer is NO, the method 1100 proceeds to the exit terminal F. Otherwise, the answer is YES, and the method 1100 loops back to block 1168 where the above-described method steps are repeated.

From terminal F (FIG. 11A), the method 1100 proceeds to another continuation terminal ("terminal G"). From terminal G (FIG. 11B), the method 1100 proceeds to a set of processing steps 1108 defined between a continuation terminal ("terminal H") and an exit terminal ("terminal I"). Among these processing steps 1108 the method runs the program using a set of equational laws governing structural equivalence of processed statements.

From terminal H (FIG. 11K) the method 1100 proceeds to block 1176 where the process kernel 302C obtains several process expressions (Π1 and Π2) from the program 302A for structural equivalence analysis. Next, the method determines whether the process expression Π1 is of the form $P_0|P_1$. See decision block 1178A. If the decision is YES, the process expression Π1 is structurally equivalent to the process expression Π2 if Π2 has the form $P_0|P_1$. See block 1178B. Next, the method 1100 proceeds to another continuation terminal ("terminal H7"). If the answer is NO at decision block 1178A, the method 1100 proceeds to another decision block 1180A where the process kernel 302C determines whether the process expression Π1 has the form P|0. If the answer is YES at decision block 1180A, the process expression Π1 is structurally equivalent to the process expression Π2 if the process expression Π2 has the form P. See block 1180B. Next, the method flow proceeds to the terminal H7. If the answer is NO at decision block 1180A, the method 1100 proceeds to another decision block 1182A. Here, the process kernel 302C determines whether the process expression Π1 has the form !P. If the answer is NO, the method 1100 proceeds to another continuation terminal ("terminal H2"). If the answer is YES at decision block 1182A, the method 1100 proceeds to yet another continuation terminal ("terminal H1").

From terminal H1 (FIG. 11L) the method 1100 proceeds to block 1182B where the process expression Π1 is determined to be structurally equivalent to the process expression Π2 if the process expression Π2 has the form P|!P. Next, the method 1100 proceeds to the terminal H7.

From terminal H2 (FIG. 11L), the method 1100 proceeds to decision block 1184A where the process kernel 302C determines whether the process expression Π1 has the form $P_0+P_1$. If the answer is YES to decision block 1184A, the process kernel 302C determines that the process expression Π1 is structurally equivalent to the process expression Π2 if the process expression Π2 has the form $P_1+P_0$. See block 1184B. Next, the method flow proceeds to the terminal H7. If instead the answer at decision block 1184A is NO, the method 1100 proceeds to another decision block 1186A. Here, the process kernel 302C determines whether the process expression Π1 has the form $P_0+0$. If the answer is YES, the method 1100 flows to block 1186B where the process kernel 302C determines that the process expression Π1 is structurally equivalent to the process expression Π2 if the process expression Π2 has the form P. Next, the method 1100 flows to the terminal H7. If the answer is NO, the method flow proceeds to another decision block 1188A. Here, the process kernel 302C determines whether the process expression Π1 has the form (NEW X)(NEW Y)P. If the answer is YES, the method 1100 proceeds to another continuation terminal ("terminal H3"). Otherwise, if the answer is NO, the method 1100 proceeds to another continuation terminal ("terminal H4").

From terminal H3 (FIG. 11M), the method 1100 proceeds to block 1188B where the process expression Π1 is determined to be structurally equivalent to the process expression Π2 if the process expression Π2 has the form (NEW Y)(NEW X)P. From terminal H4 (FIG. 11M), the method 1100 proceeds to another block 1190A where the process kernel 302C determines whether the process expression Π1 has the form (NEW X)(NEW X)P. If the answer is YES to decision block 1190A, the process expression Π1 is structurally equivalent to the process expression Π2 if the process expression Π2 has the form (NEW X)P. See block 1190B. Next, the method 1100 proceeds to the terminal H7. If the answer at decision block 1190A is NO, the method 1100 proceeds to another decision block 1192A. Here, the process kernel 302C determines whether the process expression Π1 has the form (NEW X)P|Q. If the answer is YES at decision block 1192A, the process proceeds to block 1192B where the process kernel 302C determines that the process expression Π1 is structurally equivalent to the process expression Π2 if the process expression Π2 has the form (NEW X)(P|Q). The name X is preferably a free name in the process Q. In other words, the name X is not bound to the process Q. Next, method 1100 proceeds to the terminal H7.

If the answer at decision block 1192A is NO, the method 1100 enters decision block 1194A. Here, the process kernel 302C determines whether the process expression Π1 has the form <>($\vec{C}$, NAME X:=:NAME X')|P where <> denotes the head of a query that contains nothing; $\vec{C}$ denotes a list of constraints or a set of bindings; NAME X:=:NAME X' denotes that the literal X is bound to the literal X' or that the literal X has an equivalent relation to the literal X'; and <>($\vec{C}$, NAME X:=:NAME X')|P denotes that the head of the query <>($\vec{C}$, NAME X:=:NAME X') is a query running in parallel with a process P. If the answer to the test at decision block 1194 is NO, the method 1100 proceeds to the terminal H7. If instead, the answer at decision block 1194A is YES, the method 1100 proceeds to another continuation terminal ("terminal H6").

From terminal H5 (FIG. 11N), the method 1100 proceeds to another decision block 1194B. At decision block 1194B, the process kernel 302C determines whether the query <>($\vec{C}$, NAME X:=:NAME X') is canonical. A query is said to be canonical, or alternatively, is in canonical form if and only if all of its constraints (the bindings in the body of the query) are irreducible and the query is not a failure. A constraint is irreducible in a query if and only if there exists a second query such that the query maps or reduces to the second query, and the constraint is an element of the second query. A query is said to fail if and only if the query is mapped or reduced to another query and the other query contains a failure. A constraint of the form $L_0$:=:$L_1$ is a failure if $L_0$ is not equivalent to the complement of $L_1$ where $L_0$, $L_1$ are literals.

If the answer at decision block 1194B is YES, the method 1100 proceeds to block 1194C. Here, the process kernel 302C determines that the process expression Π1 is structurally equivalent to the process constituent Π2 if the process expression Π2 has the form <>($\vec{C}$, NAME X:=:NAME X')|P{X'/X}. The process expression P{X'/X} denotes that whenever in the process P there is an occurrence of the name X, such an occurrence can be replaced with the name X'. In this regard, it should be recallable that the processing steps 1194A–1194C programmatically describe the substitution equivalent, which was discussed above in connection with FIGS. 7A–7B. Next, the method 1100 proceeds to the terminal H7.

If the answer at decision block 1194B is NO, the method 1100 proceeds to the terminal H7. From terminal H7, the method 1100 proceeds to another decision block 1196 where the process kernel 302C checks to see whether there are more process expressions for structural equivalence analysis. If the answer is NO at decision block 1196, the method flow proceeds to the exit terminal I. Otherwise, the method 1100 proceeds to a continuation terminal ("terminal H8"). From terminal H8 (FIG. 11K) the method 1100 loops back to block 1176 and the above-described method steps are repeated.

From the exit terminal I (FIG. 11B), the method 1100 proceeds to a set of processing steps 1110 where the method runs the program 302A against the operational symatics rules governing the meanings of query statements in the program 302A. The set of processing steps 1110 are defined between a continuation terminal ("terminal J") and an exit terminal ("terminal K"). In the language 400, operational symantics rules are basically a series of evolving relations of processes. A process by its nature is dynamic so that from one point in time to the next the process is continually changing or evolving. The operational symantics rules of language 400 provide a carefully guided evolution of processes expressed in the language 400. It is through the syntactical rules described above in FIGS. 11C–11I that a developer can express the nuances in which processes evolve through the operational symantics of the language 400.

From terminal J (FIG. 11O) the method 1100 proceeds to block 1198 where the process kernel 302C obtains a binding from query expressions in the program. Next, at decision block 1199A the process kernel 302C determines whether the binding B contains a binding TOP:=:BOTTOM. If the answer is YES, the process kernel 302C reduces the binding B is to nothing. See block 1199B. Next, the method flow proceeds to a continuation terminal ("terminal J4"). If instead the answer is NO, the method flow proceeds to decision block 1197A where the process kernel 302C determines whether the binding B contains bindings X:=:T, U:=:X. If the answer is YES, the process kernel 302C reduces the binding B to a binding T:=:U. See block 1197B. Next, the method flow proceeds to terminal J4. If the answer is NO, the method 1100 proceeds to another continuation terminal ("terminal J1").

From terminal J1 (FIG. 11P), the method 1100 proceeds to another decision block 1193A where the process kernel 302C determines whether the binding B contains $T_0$★$T_1$:=:$U_0$#$U_1$. If the answer is YES, the process kernel 302C reduces the binding B to $T_0$:=:$U_0$, $T_1$:=:$U_1$. See block 1193B. Next, the method flow proceeds to the terminal J4. If the answer is NO at decision block 1193A, the method 1100 proceeds to another decision block 1191A. The process kernel 302C determines whether binding B contains a binding <$\vec{X}$>(<$T_0$:$\vec{T_0}$><$\vec{C_0}$>, <$T_1$:$\vec{T_1}$>(<$\vec{C_1}$)):=:INL(U). If the answer at decision block 1191A is YES, the process kernel 302C reduces the binding B to $T_0$:=:U,$\vec{X}$:=:$\vec{T_0}$, $\vec{C_0}$. See block 1191B. Next, the method 1100 proceeds to the terminal J4. If the answer is NO to decision block 1191A, the method 1100 proceeds to another decision block 1189A.

If the answer at decision block 1191A is NO, the method 1100 proceeds to another decision block 1189A. The process kernel 302C determines whether the binding B contains $<\vec{X}>(<T_0:\vec{T_0}><\vec{C_0}>, <T_1:\vec{T_1}>(\vec{C_1})):=:INR(U)$. If the answer at decision block 1189A is YES, the method 1100 proceeds to block 1189B where the process kernel 302C reduces the binding B to $T_1:=:U, \vec{X}:=:\vec{T_1},\vec{C_1}$. Next, the method flow proceeds to the terminal J4. If the answer at decision block 1189A is NO, the method 1100 proceeds to another continuation terminal ("terminal J2").

From terminal J2, the method 1100 proceeds to another decision block 1187A. Here, the process kernel 302C determines whether the binding B contains $<\vec{X}>(<T:\vec{T}>(\vec{C})):=:?U$. If the answer is YES, the process kernel 302C reduces the binding B to $T:=:U, \vec{X}:=:\vec{T},\vec{C}$. See block 1187B. Next, the method 1100 proceeds to the terminal J4. If the answer at decision block 1187A is NO, the method 1100 proceeds to another decision block 1185A. The process kernel 302C determines whether the binding B contains $<\vec{X}>(<T:\vec{T}>(C)):=:U@V$. If the answer at decision block 1185A is YES, the process kernel 302C reduces the binding B to $<\vec{X}>(<T:\vec{T}>(C))^L:=:U, <\vec{X}>(<T:\vec{T}>(\vec{C}))^R:=:V, \vec{X}:=:\vec{X}^L@\vec{X}^R$. See block 1185B. Next, the method 1100 proceeds to the terminal J4. If the answer at decision block 1185A is NO, the method 1100 proceeds to another decision block 1183A. The process kernel 302C determines whether the binding B contains $<\vec{X}>(<T:\vec{T}>(\vec{C})):=:\_$. In other words, the query $<\vec{X}>(<T:\vec{T}>(\vec{C}))$ is bound with a discarder operator. If the answer is YES at decision block 1183A, the process kernel 302C reduces the binding B to the following bindings: $X_0:=:\_, \ldots, X_n:=:\_$. In other words, each term of the list $\vec{X}$ in the head of the query $<\vec{X}>(<T:\vec{T}>(\vec{C}))$ is bound to the discarder operator. Next, the method 1100 proceeds to the terminal J4. If the answer is NO at decision block 1183A, another continuation terminal ("terminal J3") is entered by the method flow.

From terminal J3 (FIG. 11R), the method 1100 proceeds to another decision block 1181A where the process kernel 302C determines whether the binding B has the form $<\vec{T}>(\vec{C_0},\vec{C},\vec{C_1})$. In other words, the process kernel 302C determines whether binding B is in a form of a query with the list $\vec{T}$ in the head and three constraint lists in the body, which include $\vec{C_0},\vec{C},\vec{C_1}$. If the answer at decision block 1181A is YES, the process kernel 302C further determines whether the list $\vec{C}$ can be reduced to $\vec{C'}$. See decision block 1181B. If the answer is YES to decision block 1181B, the binding B is reduced to a query $<\vec{T}>(\vec{C_0},\vec{C'},\vec{C_1})$. See block 1181C. The method flow proceeds to the terminal J4.

If the answer at decision blocks 1181A, 1181B is NO, the method 1100 proceeds to another decision block 1179A. The process kernel 302C determines whether the binding B contains the following query $<\vec{T}>(U:=:X,\vec{C})$. If the answer at decision block 1179A is YES, the binding B is reduced to a query $<\vec{T}\{U/X\}>(\vec{C})$. See block 1179B. In other words, if the name U is bound to the name X in the body of a query, everywhere in the list $\vec{T}$ where there is a name X, the name X can be replaced with the name U. Next, the method flow proceeds to the terminal J4. Otherwise, the answer at decision block 1179A is NO, and the method flow proceeds to the terminal J4, which proceeds to another decision block 1177. Here, the process kernel 302C determines whether there is another query expression to apply the semantic rules of the language 400. If the answer is NO, the method 1100 proceeds to the exit terminal K. If the answer at decision block 1177 is YES, the method 1100 proceeds to another continuation terminal ("terminal J5"). From terminal J5, the method 1100 loops back to block 1198 where the above-described method steps are repeated.

From the exit terminal K (FIG. 11B), the method 1100 proceeds to a set of processing steps 1112 where the method runs the program 302A against the operational semantics rules governing the meanings of process expressions. The set of processing steps 1112 are defined between a continuation terminal ("terminal L") and an exit terminal ("terminal M").

From terminal L (FIG. 11S), method 1100 proceeds to a block 1175 where the process kernel 302C obtains a process expression (Π) in the program 302A. Next, at decision block 1173A, the process kernel 302C determines whether the process expression Π contains a summation $X[Q_0].P_0 + \ldots + X[Q_1].P_1 + \ldots$. If the answer is YES at decision block 1173A, the method 1100 proceeds to another decision block 1173B. Here, the process kernel 302C determines whether there is a binding of a form $\sigma_0(Q_0):=:\sigma_1(Q_1)$ that is reducible to another query Q canonically. Both $\sigma_0$, $\sigma_1$ define a permutation that maps or reduces a term (see Definition 3.2.1 in Section 3.2 of the Appendix). Both $\sigma_0$, $\sigma_1$ are preferably interpreted as a database join. If the answer at decision block 1173B is YES, process kernel 302C reduces the process expression Π to a process $X[Q].(P_0|P_1)$, which denotes that the reduced query Q is submitted to a structured store X and afterward both processes $P_0$, $P_1$ execute in parallel. See block 1173C. Processing steps 1173A–1173C are discussed above in connection with FIGS. 9A–9B. Next, from block 1173C, the method 1100 proceeds to another continuation terminal ("terminal L6").

If the answer at decision blocks 1173A, 1173B is NO, the method 1100 proceeds to another decision block 1171A. The process kernel 302C determines whether the process expression Π contains P|P''. If the answer is YES, the method 1100 proceeds to another decision block 1171B where the process kernel 302C determines whether the process P can be reduced to a process P'. If the answer at decision block 1171B is YES, the method 1100 proceeds to another continuation terminal ("terminal L1"). If the answer at decision blocks 1171A, 1171B is NO, the method 1100 proceeds to another continuation terminal ("terminal L2").

From terminal L1 (FIG. 11T), the method 1100 proceeds to block 1171C where process kernel 302C reduces the process expression Π to P|P'. Next, the method flow proceeds to the terminal L6. From terminal L2 (FIG. 11T), the method 1100 proceeds to another decision block 1169A where the process kernel 302C determines whether the process expression Π contains (NEW X)P. If the answer is YES, the method flow proceeds to decision block 1169B where the process kernel 302C determines whether the process P can be reduced to P'. If the answer at decision block 1169B is YES, process kernel 302C reduces the process expression Π to (NEW X)P'. See block 1169C. Next, the method 1100 proceeds to the terminal L6. If the answer at decision blocks 1169A, 1169B is NO, the method flow proceeds to another decision block 1167A. Here the process kernel 302C determines whether the process expression Π contains X[P]. If the answer is YES, the method 1100 proceeds to another decision block 1167B. The process kernel 302C determines whether the process P can be reduced to another process P'. See decision block 1167B. If the answer at decision block 1167B is YES, the method flow proceeds to another continuation terminal ("terminal L3"). If the answer at decision blocks 1167A, 1167B is NO, the method 1100 proceeds to another continuation terminal ("terminal L4").

From terminal L3, the method 1100 proceeds to block 1167C where process kernel 302C reduces the process expression Π to X[P']. Next, the method flow proceeds to terminal L6. From terminal L4 (FIG. 11U), the method flow proceeds to another decision block 1165A, where the process kernel 302C determines whether the process expression Π contains a process X[Q].P. If the answer at decision block 1165A is YES, the process kernel 302C determines at decision block 1165B whether the query Q has an equivalent relation with another query of a form $<>(\vec{C},\vec{X}^{\wedge}:=:\vec{V})$. The term $<>(\vec{C},\vec{X}^{\wedge}:=:\vec{V})$ means a query that has nothing in its head (no terms are contained in the head of the query). Its body contains the term $\vec{C}$, which denotes a list of constraints or binding relationships (such as conditions that bind ports to ports), or the term $\vec{X}^{\wedge}:=:\vec{V}$, which denotes binding relationships among a list of local variables to a list of values associated with the list of local variables.

If the answer is YES to decision block 1165B, the process kernel 302C further determines whether the query Q is in canonical form. See decision block 1165C. If the test at decision block 1165C is YES, process kernel 302C reduces the process expression Π to a process of the form $<Q'>|P\{\vec{V}/\vec{X}\}$. See block 1165D. The term $<Q'>$ is a lifted query, which is equivalent to $<>(\vec{C})$, and was previously discussed above in FIGS. 10A–10C. A lifted query $<>(\vec{C})$ is a query that contains no terms in the head and its body contains binding relationships, which are described in the list of constraints $\vec{C}$, which are globally known. The term $P\{\vec{V}/\vec{X}\}$ is a process, which subsitutes each local variable in the list of local variables $\vec{X}$ with a corresponding value in the list of values $\vec{V}$ during the time the constraint terms in the list of contraints $\vec{C}$ are lifted. In sum, if the query Q in the process X[Q].P is equivalent to $<>(\vec{C},\vec{X}^{\wedge}:=:\vec{V})$ and additionally the query Q is in canonical form, the process X[Q].P can be evolved to a process of a form $<Q'>|P\{\vec{V}/\vec{X}\}$. Next, the method 1100 proceeds to the terminal L6.

If the answer at decision blocks 1165A–1165C is NO, another decision block 1163A is entered by the method 1100. The process kernel 302C determines whether the process expression Π contains $P_0$, which has an equivalent relation to $P_0'$. See decision block 1163A. If the answer is YES, the method 1100 proceeds to another continuation terminal ("terminal L5"). If the answer to decision block 1163A is NO, the method 1100 proceeds to the terminal L6.

From the terminal L5 (FIG. 11V), the method 1100 proceeds to decision block 1163B where the process kernel 302C determines whether $P_0'$ can be reduced to $P_1'$. If the answer is YES, the process kernel 302C determines whether the process $P_1'$ has an equivalent relation with a process $P_1$. See decision block 1163C. If the test at decision block 1163C is YES, the process kernel 302C reduces the process $P_0$ to the process $P_1$. See block 1163D. Next, the method 1100 proceeds to the terminal L6. If the answer at decision blocks 1163B, 1163C is NO, the method 1100 also proceeds to the terminal L6.

From the terminal L6 (FIG. 11V), the method 1100 proceeds to another decision block 1161 where the process kernel 302C checks to see whether there are more process expressions to be analyzed under the operational semantic rules of the language 400. If the answer is NO, the method flow proceeds to the exit terminal M. If the answer at decision block 1161 is YES, the method 1100 proceeds to another continuation terminal ("terminal L7"). From terminal L7, the method 1100 loops back to block 1175 where the method steps discussed above are repeated.

While the preferred embodiment of the invention has been illustrated and described, it will be appreciated that various changes can be made therein without departing from the spirit and scope of the invention.

APPENDIX

Semantics

The semantics for the language is presented in an SOS style set of reduction rules. For brevity, a more compact, entirely infix version of the syntax, often called a calculus, is introduced. Over this syntax a set of equivalence rules is imposed because the syntax makes distinction amongst processes that are too fine. The reduction rules are closed over this equivalence.

Calculus-style Syntax $$P ::= 0$$
$$| \quad x[Q] \cdot P$$
$$| \quad (\text{new } x)P$$
$$| \quad \sum_1 x[Q_1] \cdot P_1$$
$$| \quad P|P$$
$$| \quad !P$$
$$| \quad \langle Q \rangle$$

The correspondence between the syntax the programmmer sees (the program-level syntax) and the infix (model-level) syntax should be obvious, but is given in the following table for completeness. Note that the prefix syntax tries to work around its verbosity by providing syntactic sugar like the block form. This form allows the programmer to specify a prefix of several actions to be executed sequentially before the continuation. Rather than write out the full compilation of these forms, the table below simply provides the minimal information to infer the compilation. This choice amounts to making the left hand column be the translation of the right hand column.

| Program-level syntax | Model-level syntax |
|---|---|
| {} | 0 |
| sequence {block {x[Q];}P } | x{Q}.P |
| new (x){P} | (new x)P |
| select {case x[$Q_i$]:$P_i$} | $\sum_i x[Q_i] \cdot P_i$ |
| parallel {PP} | P\|P |
| schedule S (...){... call S(...);} | !P |

Note bene: the lifted query form is not currently made available at the user level in the prefix syntax. But, in subsequent versions it will be.

$$Q ::= \langle T^* \rangle (C^*)$$

$$C ::= T :=: T$$

$$T ::= \text{top} \mid \text{bottom} \mid \_ \mid \text{name } y$$

$$\mid x$$

$$\mid x^\wedge$$

$$\mid {}^\wedge x$$

$$\mid \sim T$$

$$\mid T \star T$$

$$\mid T \# T$$

$$\mid \langle x^* \rangle (Q, Q)$$

$$\mid inl(x)$$

$$\mid inr(x)$$

$$\mid \langle x^* \rangle (Q)$$

$$\mid ? T$$

$$\mid T @ T$$

| Program-level syntax | Model-level syntax |
|---|---|
| ( T★ ) { C★ } | <T★>(C★) |
| T :=: T; | T: =: T |
| x$^\wedge$ | x$^\wedge$ |
| x$_\wedge$ | x$_\wedge$ |
| ~T | ~T |
| T ★ T | T ★ T |
| T#T | T#T |
| ( x★ ) [ left: Q \| right: Q ] | ( x★ ) (Q,Q) |
| in (left,x) in(right,x) | inl(x) inr(x) |
| ( x★ ) [ Q ] | < x★ > (Q) |
| ?T | ?T |
| T@T | T@T |
| top / bottom / _ / port y | top\|bottom\|_\|name y |

Structural Equivalence

As mentioned before the syntax makes too many distinctions. It makes no difference, for example, on which side of the ":=:" a term appears. We introduce structural equivalence to eliminate these unnecessary distinctions.

For queries we do this using a query context, which is just a query with a place in it to insert a condition. For processes we do this explicitly.

$$K[t :=: u] \equiv K[u :=: t]$$

$$K[t_0 :=: u_0, t_1 :=: u_1] \equiv K[t_1 :=: u_1, t_0 :=: u_0]$$

$$P_0 \mid P_1 \equiv P_1 \mid P_0$$

$$P \mid 0 \equiv P$$

$$!P \equiv P \mid !P$$

$$P_0 + P_1 \equiv P_1 + P_0$$

$$P + 0 \equiv P$$

$$(\text{new } x)(\text{new } y)P \equiv (\text{new } y)(\text{new } x)P$$

$$(\text{new } x)(\text{new } x)P \equiv (\text{new } x)P$$

$$(\text{new } x)P \mid Q \equiv (\text{new } x)(P \mid Q), x \notin FN(Q)$$

For the reader familiar with process algebras, these equations are the usual suspects. The one interesting case is the one below. When a query is in canonical form, and there are conditions in its body, it will be the case that those conditions are equations between ports, or equations between local variables and their values. At the time of lifting, the local variables are substituted with their values into the continuations. The equations between ports, when present in a lifted query, act as a process that implements a kind of explicit substitution.

$$\frac{\langle\rangle(\vec{c}, \text{name } x :=: \text{name } x') \text{in canonical form}}{\langle\langle\rangle(\vec{c}, \text{name} :=: \text{name } x')\rangle \mid P \equiv \langle\langle\rangle(\vec{c}, \text{name } x :=: \text{name } x')\rangle \mid P\{x'/x\}}$$

Reduction Rules (match)    top :=: bottom →

(cut)    $x :=: t, u :=: x \rightarrow t :=: u$ (tensor-par)    $t_0 * t_1 :=: u_0 \# u_1 \rightarrow t_0 :=: u_0, t_1 :=: u$ (with-1plus)    $\langle\vec{x}\rangle(\langle t_0 : \vec{t_0}\rangle\langle\vec{c_0}\rangle, \langle t_1 : \vec{t_1}\rangle\langle\vec{c_1}\rangle) :=: inl(u) \rightarrow$ $$t_0 :=: u, \vec{x} :=: \vec{t_0}, \vec{c_0}$$

(with-rplus)    $\langle\vec{x}\rangle(\langle t_0 : \vec{t_0}\rangle\langle\vec{c_0}\rangle, \langle t_1 : \vec{t_1}\rangle\langle\vec{c_1}\rangle) :=: inr(u) \rightarrow$ $$t_1 :=: u, \vec{x} :=: \vec{t_1}, \vec{c_1}$$

(read)    $\langle\vec{x}\rangle(\langle t : \vec{t}\rangle(\vec{c})) :=: ?u \rightarrow t :=: u, \vec{x} :=: \vec{t}, \vec{c}$ (copy)    $\langle\vec{x}\rangle(\langle t : \vec{t}\rangle(\vec{c})) :=: u @ v \rightarrow$ $$\langle\vec{x}\rangle(\langle t : \vec{t}\rangle(\vec{c}))^L :=: u,$$

$$\langle\vec{x}\rangle(\langle t : \vec{t}\rangle(\vec{c}))^R :=: v,$$

$$\vec{x} :=: \vec{x}^L @ \vec{x}^R$$

(discard)    $\langle\vec{x}\rangle(\langle t : \vec{t}\rangle(\vec{c})) :=: \_ \rightarrow x_0 :=: \_, \ldots, x_n :=: \_$ -continued (context) $$\frac{\vec{c} \to \vec{c'}}{\langle \vec{t} \rangle (\overrightarrow{c_0}, \vec{c}, \overrightarrow{c_1}) \to \langle \vec{t} \rangle (\overrightarrow{c_0}, \vec{c'}, \overrightarrow{c_1})}$$

(cleanup) $\langle \vec{t} \rangle (u := x, \vec{c}) \to \langle \vec{t}\{u/x\} \rangle (\vec{c})$, $x$ not constrained by $\vec{c}$

Discussion

Match

The match rule is really a rule schema. Whenever a literal and its dual come together, they evaporate. This is interpreted as a success as no more checking is required.

Cut

An identifier may be thought of, intuitively, as a wire. When two terms occur on each end of a wire, you eliminate the wire and plug the two terms together directly. At this point it is worth calling out that the linear types ensure that in well-typed terms identifiers occur exactly twice.

Tensor-Par

When an offer of a tuple meets an [sic ] demand for a tuple, the corresponding positions get wired together.

With-Plus

When a offer of a menu (the withClaim form) meets a demand for a selection (the injectClaim form), the selection is made. This causes the selected choice to be wired to the constraints of the demand.

Read

When an offer of a recording (the ofCourseClaim) meets a demand for a replay (the whyNotClaim) the data on the recording is wired to the constraints of the demand.

Copy

When an offer of recording meets a demand for a copy (the contractClaim) separate copies are wired to the separate contraints of the demand.

Discard

When an offer of recording meets a demand to discard the recording (the "_") the recording is discarded.

Context

If a collection of conditions evolves in a certain way, then may evolve that way in the context of the body of a query.

Cleanup

When one end of a wire, i.e., one occurrence of a [sic] identifier, is occurs in (some term in) the head of a query, and the other in the body then term to which the identifier is bound in the body may be substituted into the head.

Definition 3.2.1. Let $\sigma: n \to n$ be a permutation, $<t_0, \ldots, t_n>(\vec{c})$ a query. We take $\sigma(<t_0, \ldots, t_n>(\vec{c})) = <t_{\sigma(0)}, \ldots, t_{\sigma(n)}>(\vec{c})$.

Definition 3.2.2. Let $Q_0 = <t_0, \ldots, t_n>(\vec{C_0})$ and $Q_1 = <u_0, \ldots, u_n>(\vec{C_1})$. We take $Q_0 := Q_1 = <t_1, \ldots, t_n, u_1, \ldots, u_n>(t_0 := u_0, \vec{C_0}, \vec{C_1})$.

Definition 3.2.3. A constraint of the form $l_0 := l_1$ on literals, $l_0, l_1$, is a failure if $l_0 \neq \sim l_1$.

Definition 3.2.4. A query, Q, fails iff $Q \to^* Q'$ and Q' contains a failure.

Definition 3.2.5. A constraint c is irreducible in a query Q iff $\forall Q'.Q \to^* Q'.c \in Q'$.

Definition 3.2.6. A query, Q, is canonical (alternatively, in canonical form) iff all of its constraints are irreducible and Q is not a failure.

(comm) $$\frac{\exists \sigma_0, \sigma_1 \cdot \sigma_0(Q_0) := \sigma_1(Q_1) \to *Q, Q \text{ in canonical form}}{x[Q_o] \cdot P_0 + \cdots |x[Q_1] \cdot P_1 + \cdots \to x[Q] \cdot (P_0|P_1)|}$$

(par) $$\frac{P \to P'}{P|P'' \to P'|P''}$$

(new) $$\frac{P \to P'}{(\text{new } x)P \to (\text{new } x)P'}$$

(lift) $$\frac{Q \equiv \langle\rangle(\vec{c}, \vec{x} := \vec{v}) \text{ in canonical form}, Q' \equiv \langle\rangle(\vec{c})}{x[Q] \cdot P \to \langle Q' \rangle |P\{\vec{v}/\vec{x}\}}$$

(equiv) $$\frac{P_0 \equiv P'_0, P'_0 \to P'_1, P'_1 \equiv P_1}{P_0 \to P_1}$$

Comm

If two queries have terms that match at some position in their heads, respectively, and the corresponding cut query evolves to a query that cannot make anymore progress, but is not a failure, then two processes which have placed these queries into the same queue will communicate. Their respective continuations will both wait on the completion of the reduced query.

Par

If a process can make progress on its own, then it may still make that progress in parallel composition with another process.

New

If a process can make progress on its own, then it may still make that progress if one of its ports is no longer available for outside interaction.

Lift

A query with no terms in its head only hasd conditions which bind ports to ports to ports or local variables to values, if it has any bindings at all in its body. Such a query may be lifted. At the time of lifting the local variables are substituted out of the body of the continuation.

The equations remaining, after the local variables have been substituted away, are between ports. Such a query then becomes a process that acts as a kind of explicit substitution, or a wire between equated ports.

Equiv

Evolution is closed over the equivalence relation.

The embodiments of the invention in which an exclusive property or privilege is claimed are defined as follows:

1. A computer-executable method for compiling an expression written in a process-based language, the method comprising:

parsing the expression to obtain syntactical elements that represent a queue, a set of queue delimiters, a query, a sequence delimiter, and other actions; and translating the expression in a processor as a process whose first action is submitting the query as another process to the queue and after which the process continues with other actions, the query including an organization scheme formed from a customizable, tag-based language that contains data and describes data.

2. The method of claim 1, wherein a portion of the expression that represents the query includes a head and a body, the head being delimited by first and second query head delimiters, the body being delimited by first and second query body delimiters.

3. The method of claim 2, wherein contained between the first and second query head delimiters are zero or more query terms.

4. The method of claim 2, wherein contained between the first and second query body delimiters are zero or more constraint terms.

5. The method of claim 4, wherein each constraint term is a binding that defines a relation between one query term and another query term.

6. The method of claim 5, wherein query terms include a literal.

7. The method of claim 5, wherein query terms include a complementary literal.

8. The method of claim 5, wherein query terms include a discarder.

9. The method of claim 5, wherein query terms include a name of a variable.

10. The method of claim 5, wherein query terms include a variable.

11. The method of claim 5, wherein query terms include an inversion of a query term.

12. The method of claim 5, wherein query terms include a tuple of query terms.

13. The method of claim 5, wherein query terms include a complementary tuple of query terms.

14. The method of claim 5, wherein query terms include a second query that has zero or more variables in the head and a third and a fourth query separated by a comma in the body.

15. The method of claim 14, wherein query terms include a left injector that takes a variable as an argument.

16. The method of claim 5, wherein query terms include a right injector that takes a variable as an argument.

17. The method of claim 5, wherein query terms include a fifth query that has zero or more variables in the head and a sixth query in the body.

18. The method of claim 17, wherein query terms include a read operator that operates on a query term.

19. The method of claim 17, wherein query terms include a copy operator that operates on query terms.

20. The method of claim 1, wherein the portion of the expression that represents the process includes an inactivity operator, the inactivity operator allowing an inactivity of the process to be expressed.

21. The method of claim 1, wherein the portion of the expression that represents the process includes a summation operator that sums a set of processes, the summation operator allowing the choices that the process can choose from the set of processes to proceed to be expressed.

22. The method of claim 1, wherein the portion of the expression that represents the process includes a new operator, the new operator allowing the creation of a name that is bound to the process to be expressed.

23. The method of claim 1, wherein the portion of the expression that represents the process includes a parallel operator, the parallel operator allowing two processes executing in parallel to be expressed.

24. The method of claim 1, wherein the portion of the expression that represents the process includes a replication operator, the replication operator allowing an infinite behavior of the process to be expressed.

25. The method of claim 1, wherein the portion of the expression that represents the process includes a second queue, a second set of queue delimiters, and a process.

26. The method of claim 1, wherein the portion of the expression that represents the process includes a lifted query.

27. A computer-readable medium having computer-executable storage instructions for performing a method for compiling an expression written in a process-based language, the method comprising:

parsing the expression to obtain syntactical elements that represent a queue, a set of queue delimiters, a query, a sequence delimiter, and other actions; and translating the expression in a processor as a process whose first action is submitting the query as another process to the queue and after which the process continues with other actions, the query including an organization scheme formed from a customizable, tag-based language that contains data and describes data.

28. The computer-readable storage medium of claim 27, wherein a portion of the expression that represents the query includes a head and a body, the head being delimited by first and second query head delimiters, the body being delimited by first and second query body delimiters.

29. The computer-readable storage medium of claim 28, wherein contained between the first and second query head delimiters are zero or more query terms.

30. The computer-readable storage medium of claim 28, wherein contained between the first and second query body delimiters are zero or more constraint terms.

31. The computer-readable storage medium of claim 30, wherein each constraint term is a binding that defines a relation between one query term and another query term.

32. The computer-readable storage medium of claim 31, wherein query terms include a literal.

33. The computer-readable storage medium of claim 31, wherein query terms include a complementary literal.

34. The computer-readable storage medium of claim 31, wherein query terms include a discarder.

35. The computer-readable storage medium of claim 31, wherein query terms include a name of a variable.

36. The computer-readable storage medium of claim 31, wherein query terms include a variable.

37. The computer-readable storage medium of claim 31, wherein query terms include an inversion of a query term.

38. The computer-readable storage medium of claim 31, wherein query terms include a tuple of query terms.

39. The computer-readable storage medium of claim 31, wherein query terms include a complementary tuple of query terms.

40. The computer-readable storage medium of claim 31, wherein query terms include a second query that has zero or more variables in the head and a third and a fourth query separated by a comma in the body.

41. The computer-readable storage medium of claim 40, wherein query terms include a left injector that takes a variable as an argument.

42. The computer-readable storage medium of claim 41, wherein query terms include a right injector that takes a variable as an argument.

43. The computer-readable storage medium of claim 41, wherein query terms include a fifth query that has zero or more variables in the head and a sixth query in the body.

44. The computer-readable storage medium of claim 43, wherein query terms include a read operator that operates on a query term.

45. The computer-readable storage medium of claim 43, wherein query terms include a copy operator that operates on query terms.

46. The computer-readable storage medium of claim 27, wherein the portion of the expression that represents the process includes an inactivity operator, the inactivity operator allowing an inactivity of the process to be expressed.

47. The computer-readable storage medium of claim 27, wherein the portion of the expression that represents the process includes a summation operator that sums a set of processes, the summation operator allowing the choices that the process can choose from the set of processes to proceed to be expressed.

48. The computer-readable storage medium of claim 27, wherein the portion of the expression that represents the process includes a new operator, the new operator allowing the creation of a name that is bound to the process to be expressed.

49. The computer-readable storage medium of claim 27, wherein the portion of the expression that represents the process includes a parallel operator, the parallel operator allowing two processes executing in parallel to be expressed.

50. The computer-readable storage medium of claim 27, wherein the portion of the expression that represents the process includes a replication operator, the replication operator allowing an infinite behavior of the process to be expressed.

51. The computer-readable storage medium of claim 27, wherein the portion of the expression that represents the process includes a second queue, a second set of queue delimiters, and a process.

52. The computer-readable storage medium of claim 27, wherein the portion of the expression that represents the process includes a lifted query.

* * * * *

UNITED STATES PATENT AND TRADEMARK OFFICE
CERTIFICATE OF CORRECTION

PATENT NO. : 7,055,142 B2  Page 1 of 2
APPLICATION NO. : 10/303445
DATED : May 30, 2006
INVENTOR(S) : Meredith et al.

It is certified that error appears in the above-identified patent and that said Letters Patent is hereby corrected as shown below:

On page 2, item (56), under "Other Publications", in column 1, line 5, delete "20002." and insert -- 2002. --, therefor.

In column 4, line 37, delete "TyCo," and insert -- TyCO, --, therefor.

In column 8, line 40, delete "launche" and insert -- launch --, therefor.

In column 10, line 46, delete "programatically" and insert -- programmatically --, therefor.

In column 11, line 32, delete "11C-12F" and insert -- 11C-11F --, therefor.

In column 12, line 47, delete "5001B" and insert -- 500B --, therefor.

In column 15, line 18, delete "intputting" and insert -- inputting --, therefor.

In column 18, line 39, delete "124" and insert -- 1124 --, therefor.

In column 24, line 22, delete "symatics" and insert -- symantics --, therefor.

In column 28, line 55–56, delete "programmmer" and insert -- programmer --, therefor.

In column 29, line 6, delete "x{Q}.P" and insert -- x[Q].P --, therefor.

In column 29, line 54, delete "( x* ) (Q,Q)" and insert -- < x* > (Q,Q) --, therefor.

Signed and Sealed this

Fourth Day of May, 2010

David J. Kappos
*Director of the United States Patent and Trademark Office*

CERTIFICATE OF CORRECTION (continued)
U.S. Pat. No. 7,055,142 B2

In column 30, lines 35–38, delete "$\dfrac{\langle\rangle(\vec{c},\ \text{name}\ x\ :=:\ \text{name}\ x')\text{in canonical form}}{\langle\langle\rangle(\vec{c},\ \text{name}\ :=:\ \text{name}\ x')\rangle | P \equiv \langle\langle\rangle(\vec{c},\ \text{name}\ x\ :=:\ \text{name}\ x')\rangle | P\{x'/x\}}$" and insert -- $\dfrac{\langle\rangle\left(\vec{c},\text{name}\ x\ =:\ \text{name}\ x'\right)\ \text{in canonical form}}{\langle\langle\rangle\left(\vec{c},\text{name}\ x\ =:\ \text{name}\ x'\right)\rangle | P \equiv \langle\langle\rangle\left(\vec{c},\text{name}\ x\ =:\ \text{name}\ x'\right)\rangle | P\{x'/x\}}$ --, therefor.

In column 30, line 51, delete "$\langle t_1 : \dot{t}_1 \rangle$" and insert -- $\langle t_1 : \vec{t}_1 \rangle$ --, therefor.

In column 31, line 34, after "When" delete "a" and insert -- an --, therefor.

In column 31, line 49, delete "contraints" and insert -- constraints --, therefor.

In column 31, line 59, after "then" insert -- they --.

In column 32, line 59, delete "hasd" and insert -- has --, therefor.

In column 32, line 60, after "ports to ports" delete "to ports".

In column 34, line 23, in Claim 27, after "computer-readable" insert -- storage --.

In column 34, line 24, in Claim 27, delete "storage" before "instructions".